(12) United States Patent
Uekusa et al.

(10) Patent No.: US 10,440,227 B2
(45) Date of Patent: Oct. 8, 2019

(54) IMAGE PROCESSING DEVICE IMPLEMENTS IMAGE PROCESSING METHOD TO PERFORM THINNING AND SMOOTHING PROCESS ON IMAGE DATA CONVERTED FROM FIRST RESOLUTION TO SECOND RESOLUTION

(71) Applicants: Shigeru Uekusa, Kanagawa (JP);
Hayato Fujita, Kanagawa (JP);
Muneaki Iwata, Kanagawa (JP)

(72) Inventors: Shigeru Uekusa, Kanagawa (JP);
Hayato Fujita, Kanagawa (JP);
Muneaki Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 14 days.

(21) Appl. No.: 15/581,359

(22) Filed: Apr. 28, 2017

(65) Prior Publication Data
US 2017/0339309 A1    Nov. 23, 2017

(30) Foreign Application Priority Data

May 19, 2016 (JP) ................................ 2016-100837

(51) Int. Cl.
*H04N 1/409* (2006.01)
*H04N 1/40* (2006.01)
(Continued)

(52) U.S. Cl.
CPC ......... *H04N 1/4092* (2013.01); *H04N 1/3935* (2013.01); *H04N 1/40068* (2013.01);
(Continued)

(58) Field of Classification Search
None
See application file for complete search history.

(56) References Cited

U.S. PATENT DOCUMENTS

2009/0080003 A1* 3/2009 Murakami ............... H04N 1/58
358/1.9
2012/0099165 A1 4/2012 Omori et al.
(Continued)

FOREIGN PATENT DOCUMENTS

JP    7-184043    7/1995
JP    2005-039802    2/2005
(Continued)

OTHER PUBLICATIONS

Machine Translation in English of JP Pub 2016-021664 to Iwata el al.*

(Continued)

*Primary Examiner* — Benny Q Tieu
*Assistant Examiner* — Haris Sabah
(74) *Attorney, Agent, or Firm* — Harness, Dickey & Pierce, P.L.C.

(57) ABSTRACT

An image processing device includes: a first matching circuit to determine whether an image matrix of image data of a first resolution matches a first pattern, and output a first determination result; a first converting circuit to, if the image matrix matches the first pattern, replace a target pixel of the image matrix with a first pixel pattern of a second resolution, and output first image data of the second resolution; a second converting circuit to convert the image data of the first resolution into image data of the second resolution, and output second image data of the second resolution; a detecting circuit to detect whether the target pixel is included in a fine line structure, and output a detection result; and a selecting circuit to output one of the first image data and the second image data based on the first determination result and the detection result.

20 Claims, 47 Drawing Sheets

(51) Int. Cl.
*H04N 1/393* (2006.01)
*G06K 15/02* (2006.01)
*G06K 9/44* (2006.01)
*G06K 15/12* (2006.01)

(52) U.S. Cl.
CPC ............ *G06K 9/44* (2013.01); *G06K 15/129* (2013.01); *G06K 15/1871* (2013.01); *H04N 2201/0094* (2013.01)

(56) References Cited

U.S. PATENT DOCUMENTS

| | | |
|---|---|---|
| 2012/0189328 A1 | 7/2012 | Suzuki et al. |
| 2014/0139603 A1 | 5/2014 | Fujita et al. |
| 2014/0176656 A1 | 6/2014 | Omori et al. |
| 2014/0268186 A1* | 9/2014 | Iwata ............ G06K 15/1873 358/1.2 |
| 2014/0333941 A1 | 11/2014 | Iwata et al. |
| 2014/0347708 A1 | 11/2014 | Omori et al. |
| 2015/0125171 A1 | 5/2015 | Iwata et al. |
| 2015/0156373 A1 | 6/2015 | Fujita et al. |
| 2015/0180200 A1 | 6/2015 | Fujita et al. |
| 2015/0251442 A1 | 9/2015 | Ishida et al. |
| 2015/0324671 A1* | 11/2015 | Iwata ............ G06K 15/1873 358/1.2 |
| 2015/0350491 A1 | 12/2015 | Iwata et al. |
| 2016/0012322 A1 | 1/2016 | Iwata et al. |
| 2016/0147171 A1 | 5/2016 | Ishida et al. |
| 2016/0234399 A1 | 8/2016 | Omori et al. |
| 2016/0247050 A1 | 8/2016 | Fujita et al. |
| 2016/0274521 A1 | 9/2016 | Iwata et al. |
| 2017/0017177 A1 | 1/2017 | Iwata et al. |

FOREIGN PATENT DOCUMENTS

| | | |
|---|---|---|
| JP | 2009-211546 | 9/2009 |
| JP | 2016-021664 | 2/2016 |

OTHER PUBLICATIONS

Machine Translation in English of JP Pub 2016-021664 to Iwata et al. (hereafter IwataMuneo).*

* cited by examiner

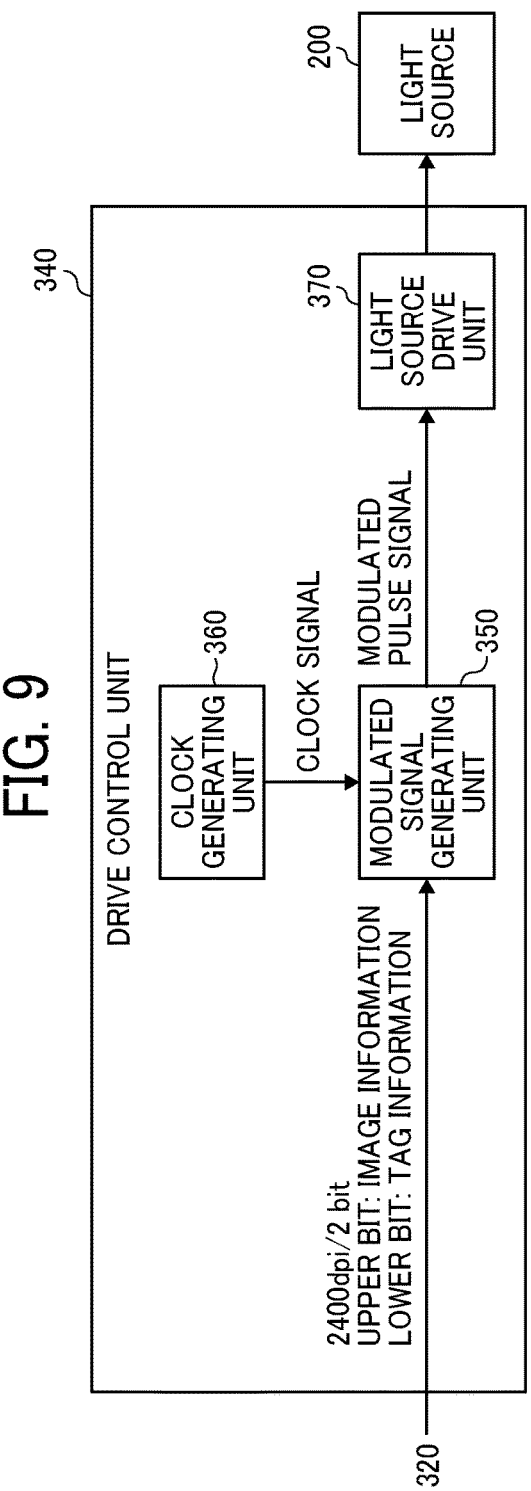
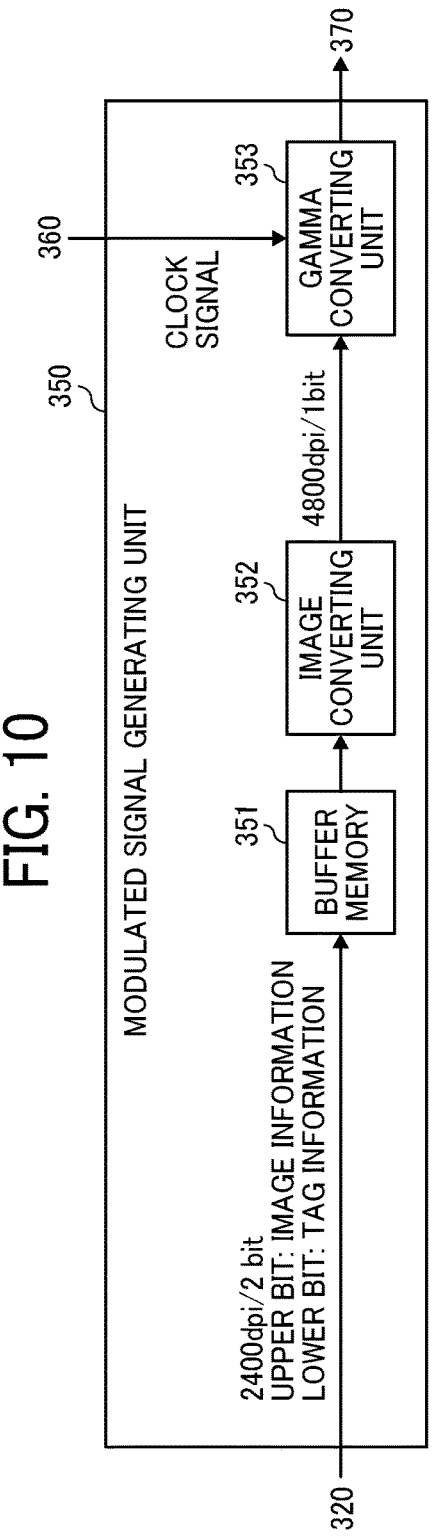

| FIG. 14A | FIG. 14B |
|---|---|
| FIG. 14C | FIG. 14D |

PHASE 10[b]

PHASE 11[b]

| FIG. 15A | FIG. 15B |
|----------|----------|
| FIG. 15C | FIG. 15D |

PHASE 10[b]

PHASE 11[b]

| FIG. 16A | FIG. 16B |
|---|---|
| FIG. 16C | FIG. 16D |

PHASE 10[b]

AW1

PHASE 11[b]

Figures 17, 17A, 17C:
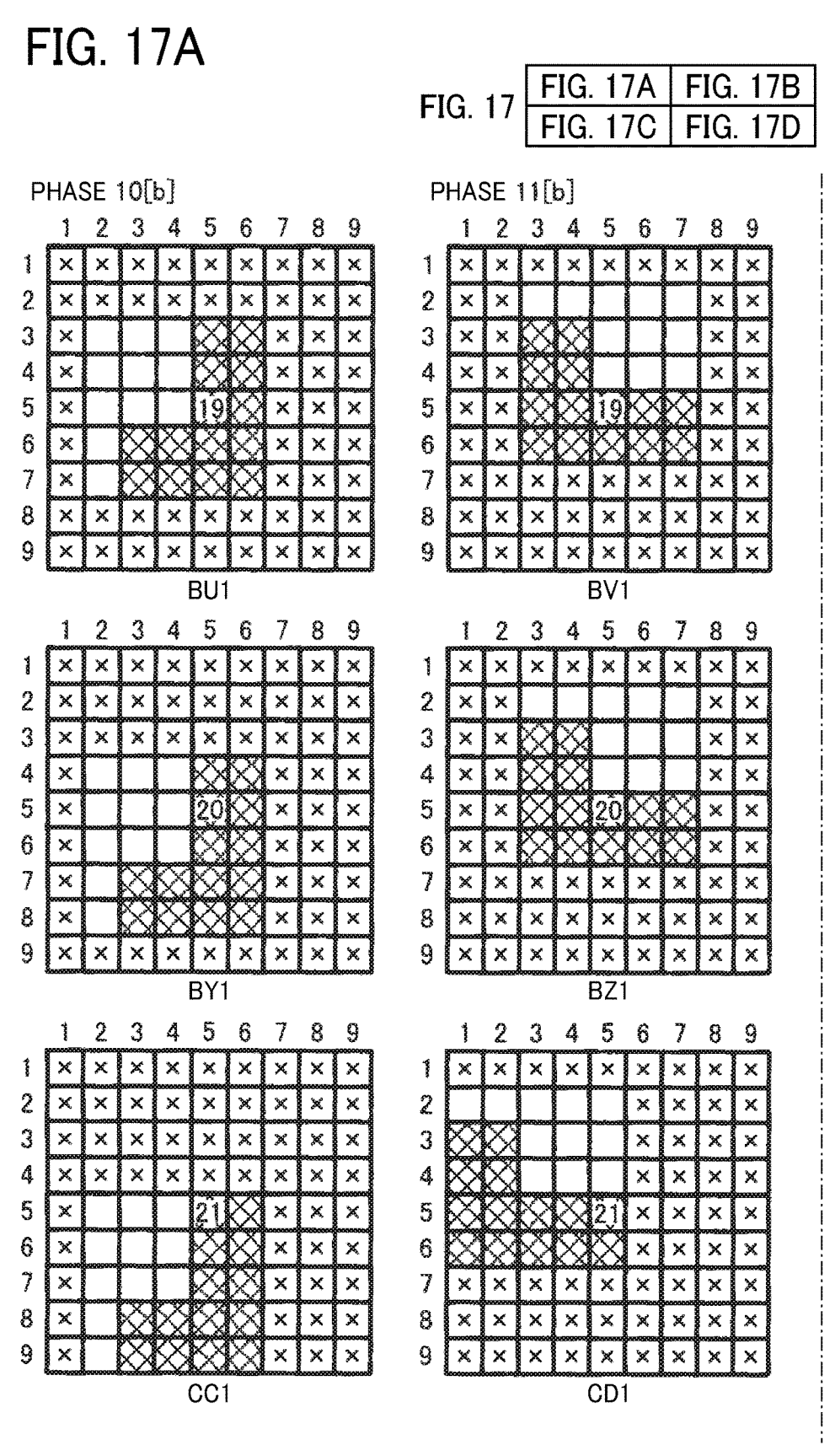

| FIG. 17 | FIG. 17A | FIG. 17B |
|---|---|---|
| | FIG. 17C | FIG. 17D |

PHASE 10[b]

BU1

PHASE 11[b]

2400dpi

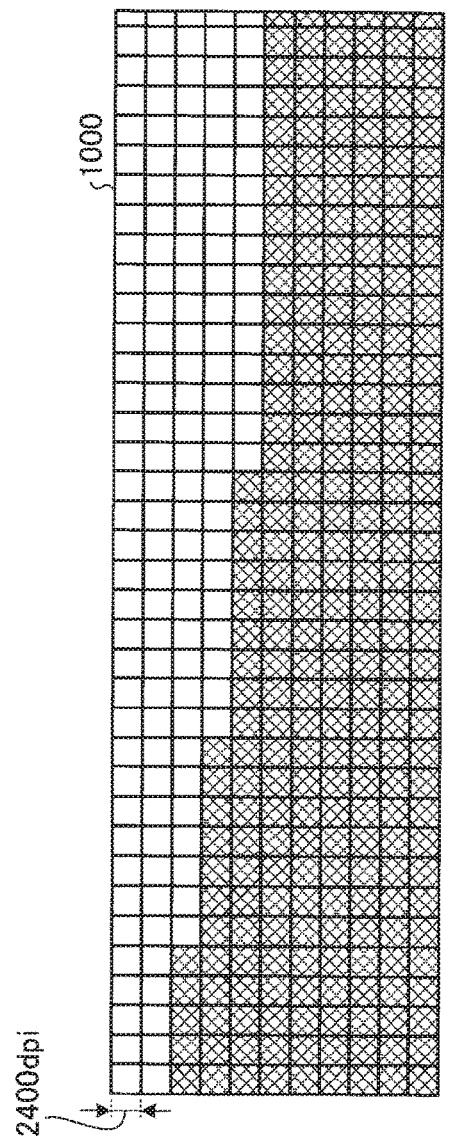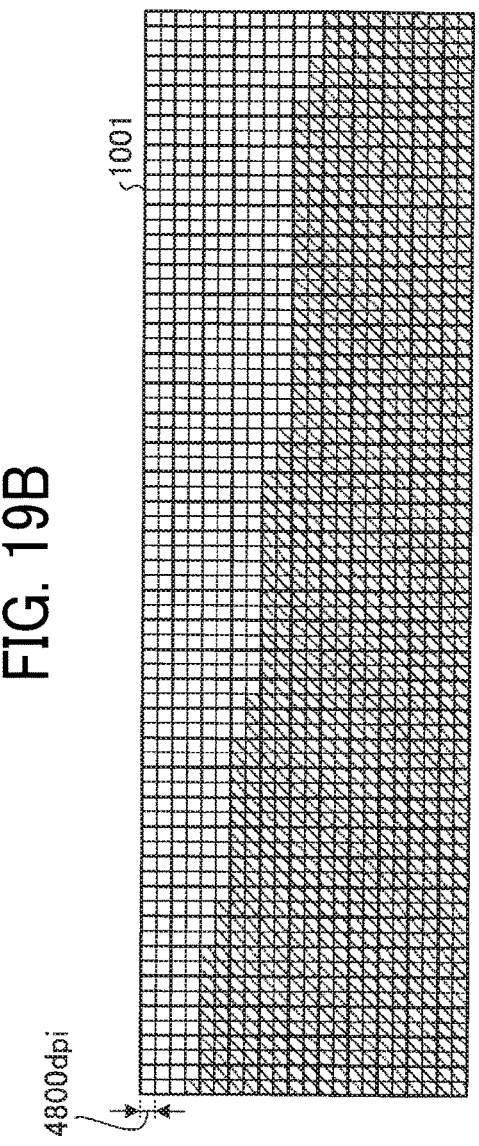

FIG. 20A
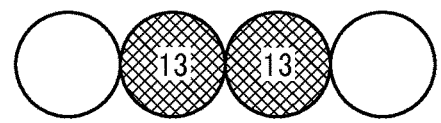
FIG. 20B
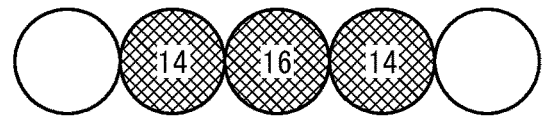
FIG. 20C
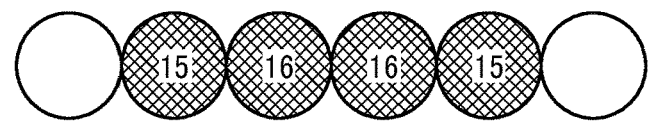
FIG. 21A   FIG. 21B   FIG. 21C
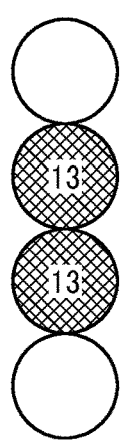 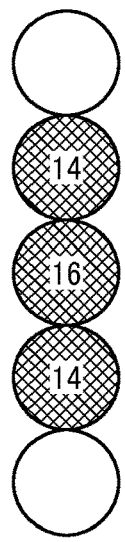 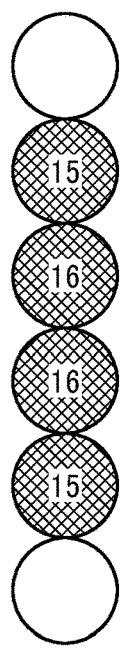

2400dpi

4800dpi

2400dpi

4800dpi

2400dpi

4800dpi

FIG. 29A
FIG. 29 | FIG. 29A
        | FIG. 29B
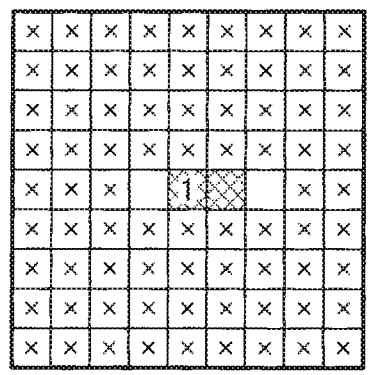
A2
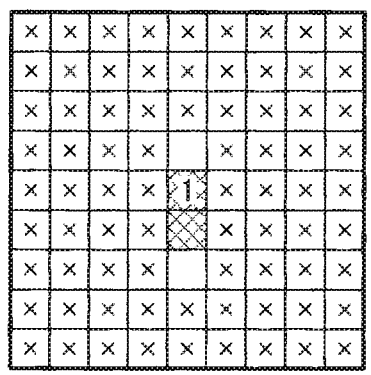
B2
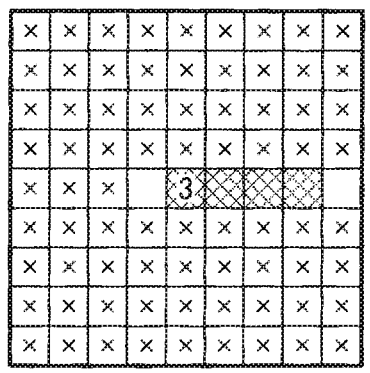
E2
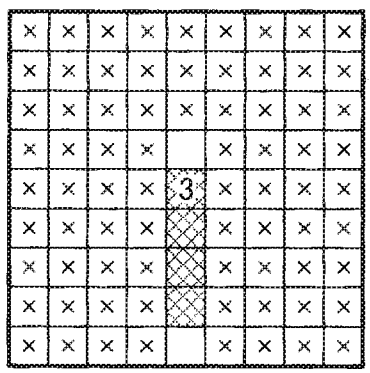
F2
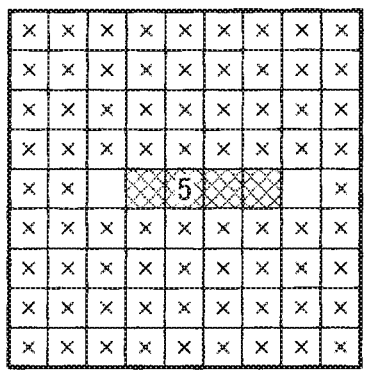
I2
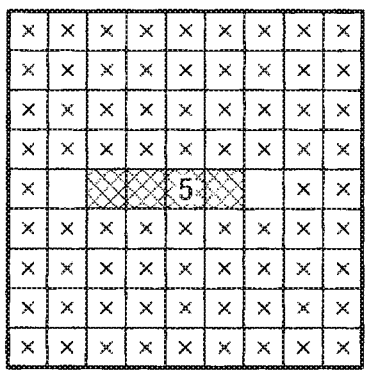
J2

FIG. 29B

FIG. 30A
FIG. 30 | FIG. 30A |
| FIG. 30B |
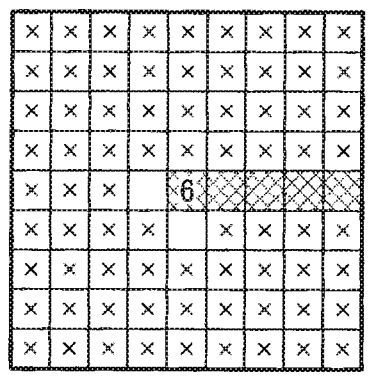
M2
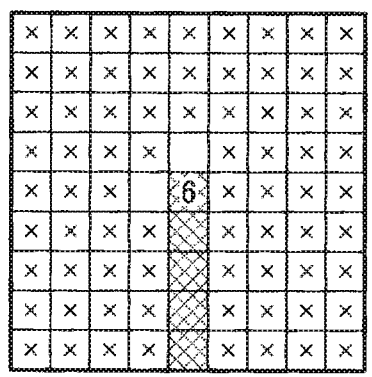
N2
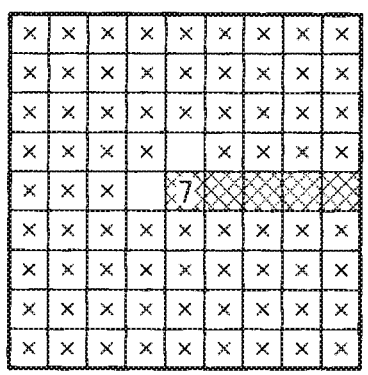
Q2
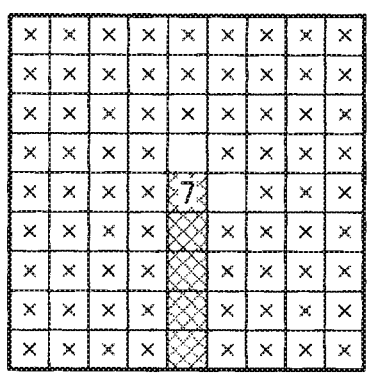
R2
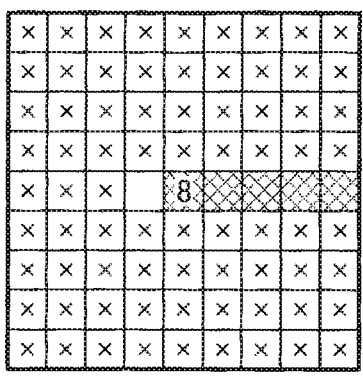
U2
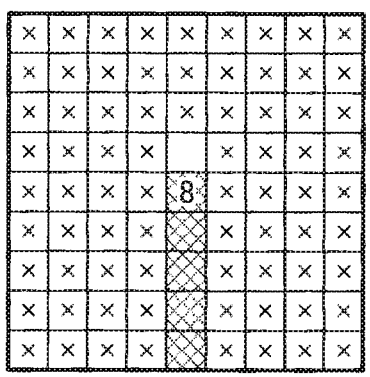
V2

FIG. 30B

FIG. 31A
FIG. 31 | FIG. 31A |
| FIG. 31B |
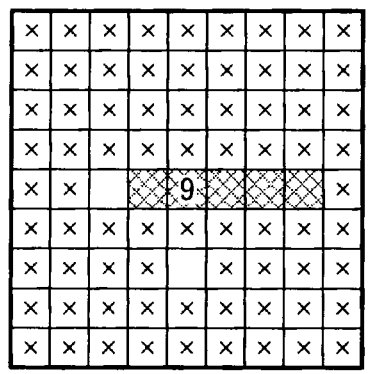
Y2
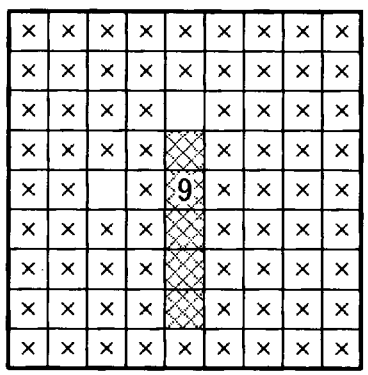
Z2
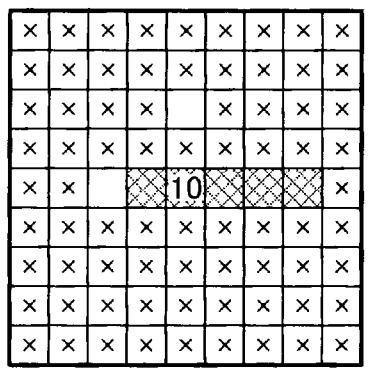
AC2
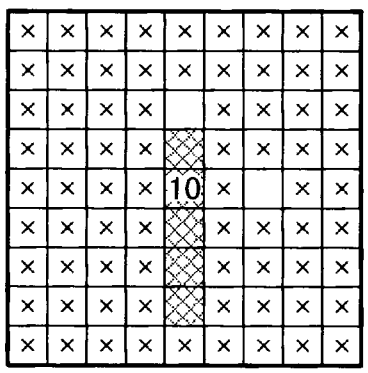
AD2
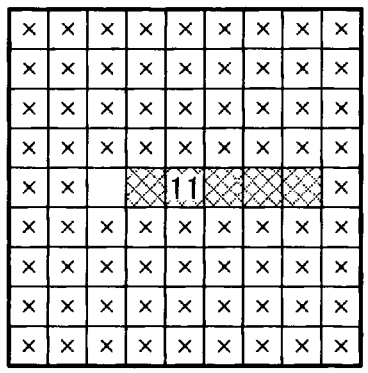
AG2
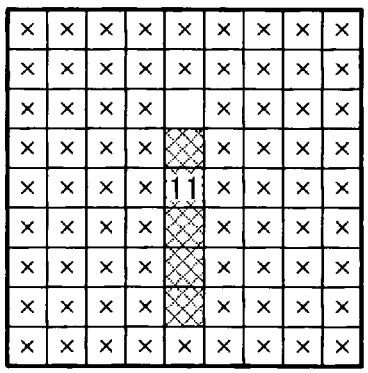
AH2

FIG. 31B
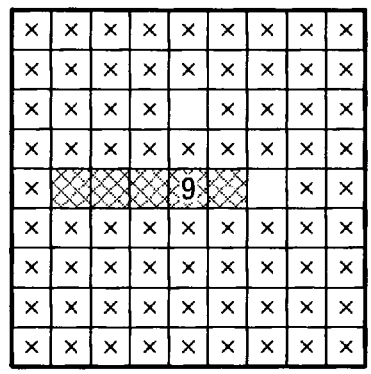
AA2
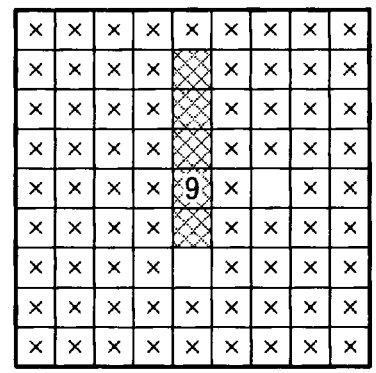
AB2
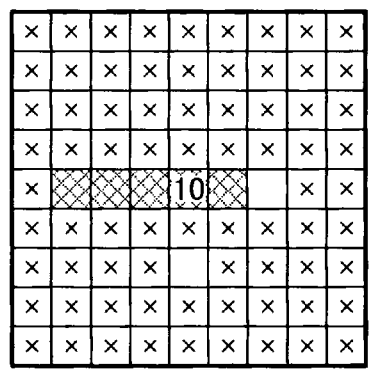
AE2
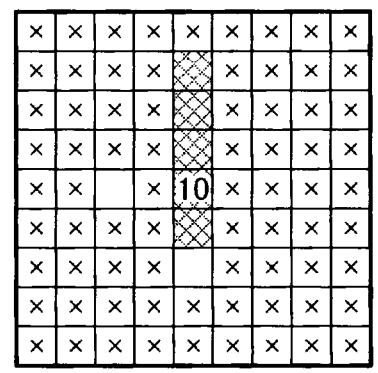
AF2
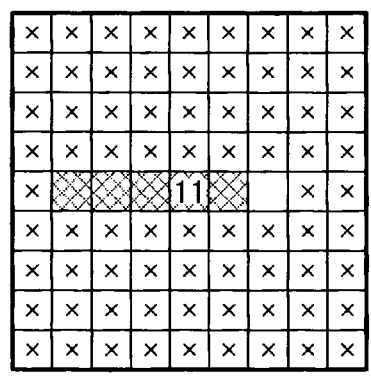
AI2
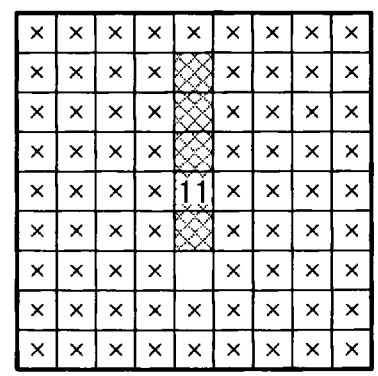
AJ2

FIG. 38A
FIG. 38 | FIG. 38A |
|---|---|
| | FIG. 38B |
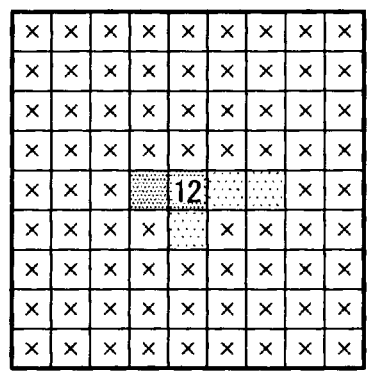
BA2
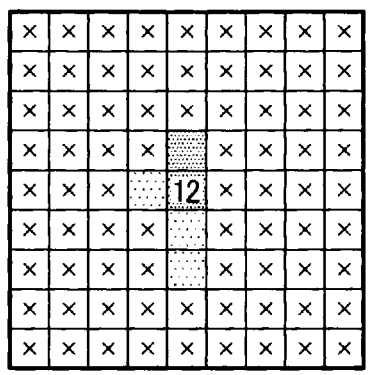
BB2
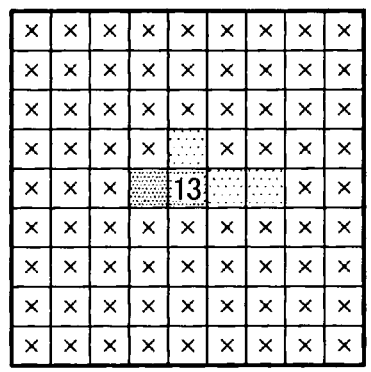
BE2
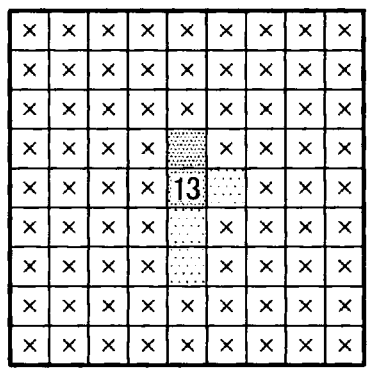
BF2
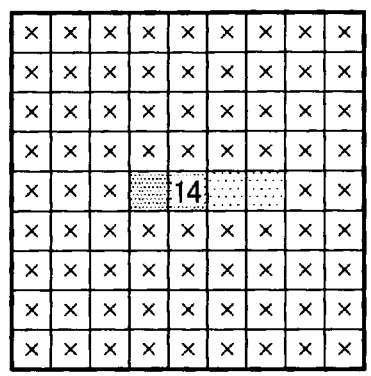
BI2
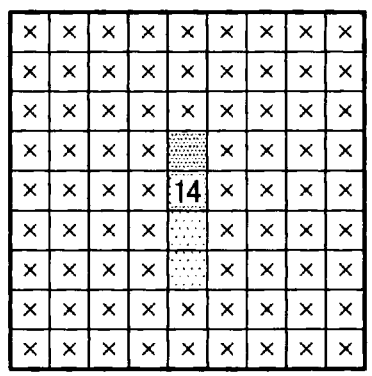
BJ2

FIG. 38B
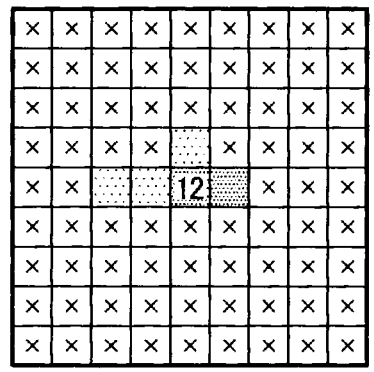
BC2
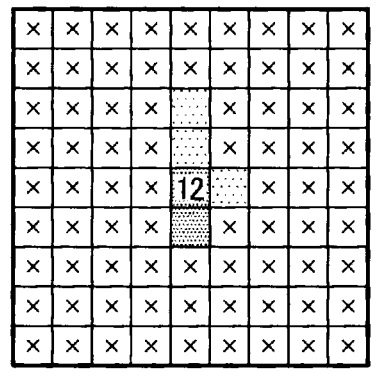
BD2
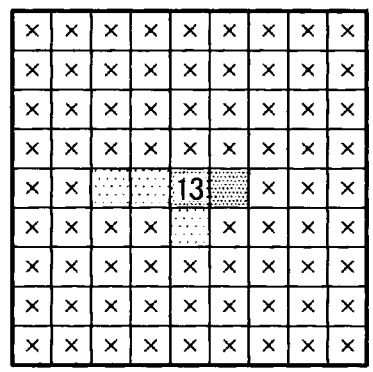
BG2
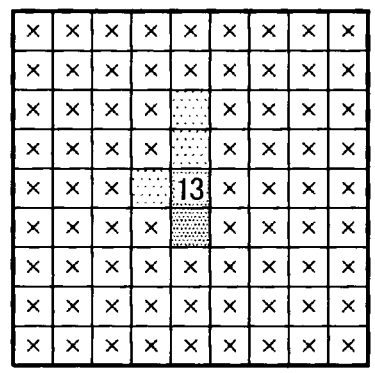
BH2
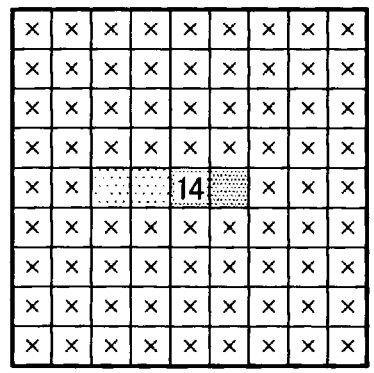
BK2
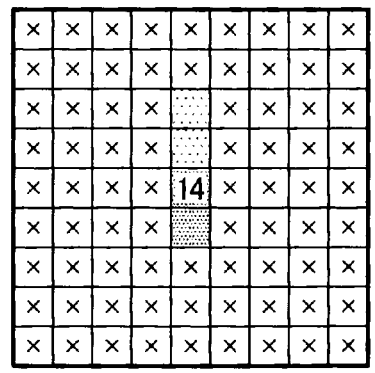
BL2

FIG. 39A
FIG. 39 | FIG. 39A |
|---|---|
| | FIG. 39B |
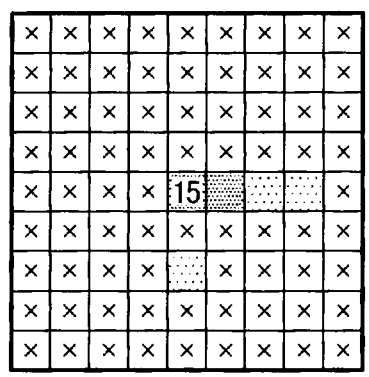
BM2
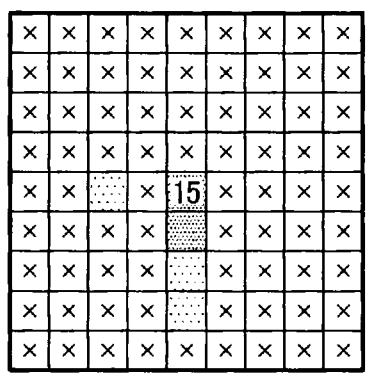
BN2
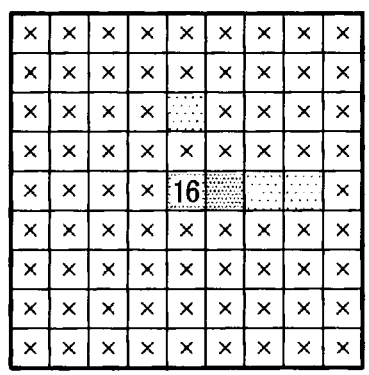
BQ2
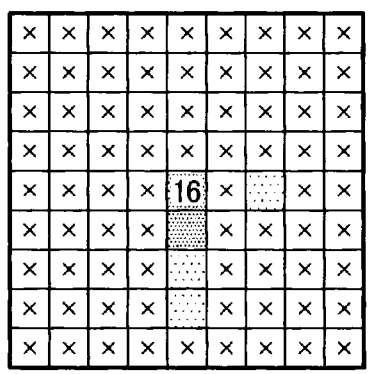
BR2
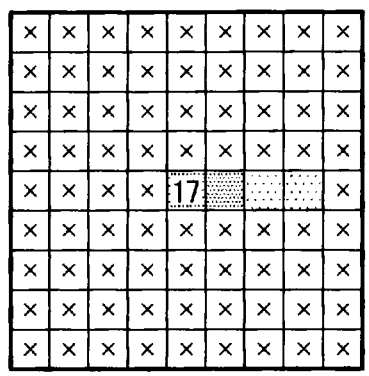
BU2
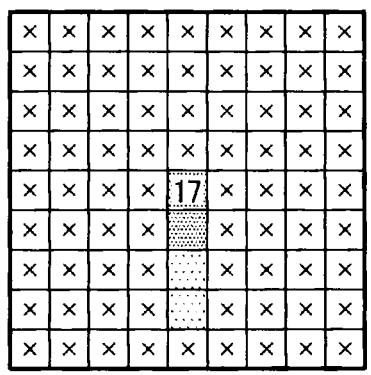
BV2

FIG. 42

PHASE DATA

IMAGE PROCESSING DEVICE IMPLEMENTS IMAGE PROCESSING METHOD TO PERFORM THINNING AND SMOOTHING PROCESS ON IMAGE DATA CONVERTED FROM FIRST RESOLUTION TO SECOND RESOLUTION

CROSS-REFERENCE TO RELATED APPLICATION

This patent application is based on and claims priority pursuant to 35 U.S.C. § 119(a) to Japanese Patent Application No. 2016-100837 filed on May 19, 2016, in the Japan Patent Office, the entire disclosure of which is hereby incorporated by reference herein.

BACKGROUND

Technical Field

The present invention relates to an image processing device, a drive control device, a light source control device, an image forming apparatus, and an image processing method.

Description of the Related Art

With a demand for improved reproducibility of fine lines and characters in an electrophotographic process, there is an image processing method of performing a thinning process and a smoothing process on black characters and black lines based on pattern matching.

Such an image processing method performed on black characters and black lines based on pattern matching includes a technique of converting an image into a higher-resolution image and performing the thinning process on the image based on pattern matching to improve the reproducibility of fine lines.

SUMMARY

In one embodiment of this invention, there is provided an improved image processing device that includes, for example, a first matching circuit, a first converting circuit, a second converting circuit, a detecting circuit, and a selecting circuit. The first matching circuit determines whether an image matrix of image data of a first resolution matches any of at least one first pattern of a stepped edge portion, and outputs a result of the determination as a first determination result. If the first matching circuit determines that the image matrix of the image data of the first resolution matches any of the at least one first pattern, the first converting circuit replaces a target pixel of the first resolution in the image matrix with a first pixel pattern of a second resolution corresponding to the any of the at least one first pattern to perform a thinning process and a smoothing process on the image data, and outputs the image data subjected to the thinning process and the smoothing process as first image data of the second resolution. The second resolution is higher than the first resolution. The second converting circuit converts the image data of the first resolution into image data of the second resolution, and outputs the converted image data as second image data of the second resolution. The detecting circuit detects whether the target pixel is included in a fine line structure based on a level setting signal, and outputs a result of the detection. The selecting circuit selects and outputs one of the first image data and the second image data based on the first determination result and the result of the detection.

In one embodiment of this invention, there is provided an improved drive control device that includes, for example, the above-described image processing device to output image data of the second resolution, a pulse generator to generate a modulated pulse signal, from the image data of the second resolution output from the image processing device to control on and off of a light source, and a light source driver to drive the light source in accordance with the modulated pulse signal generated by the pulse generator.

In one embodiment of this invention, there is provided an improved light source control device that includes, for example, an interface to acquire image data, a processor to perform image processing on the image data acquired by the interface to obtain image data of a first resolution, and the above-described drive control device to receive the image data of the first resolution subjected to the image processing by the processor.

In one embodiment of this invention, there is provided an improved image forming apparatus that includes, for example, a light source to emit light, the above-described light source control device to control driving of the light source, a photoconductor to be irradiated with the light emitted by the light source, and a latent image forming device to irradiate the photoconductor with the light emitted by the light source to form on the photoconductor a latent image corresponding to the image data of the second resolution.

In one embodiment of this invention, there is provided an improved image processing device that includes, for example, first matching means, first converting means, second converting means, detecting means, and selecting means. The first matching means determines whether an image matrix of image data of a first resolution matches any of at least one first pattern of a stepped edge portion to output a result of the determination as a first determination result. If the first matching means determines that the image matrix of the image data of the first resolution matches any of the at least one first pattern, the first converting means replaces a target pixel of the first resolution in the image matrix with a first pixel pattern of a second resolution corresponding to the any of the at least one first pattern to perform a thinning process and a smoothing process on the image data to output the image data subjected to the thinning process and the smoothing process as first image data of the second resolution. The second resolution is higher than the first resolution. The second converting means converts the image data of the first resolution into image data of the second resolution to output the converted image data as second image data of the second resolution. The detecting means detects whether the target pixel is included in a fine line structure based on a level setting signal to output a result of the detection. The selecting means selects one of the first image data and the second image data for output based on the first determination result and the result of the detection.

In one embodiment of this invention, there is provided an improved image processing method that includes, for example: determining whether an image matrix of image data of a first resolution matches any of at least one first pattern of a stepped edge portion to output a result of the determination as a first determination result; replacing, if the determining determines that the image matrix of the image data of the first resolution matches any of the at least one first pattern, a target pixel of the first resolution in the image matrix with a first pixel pattern of a second resolution corresponding to the any of the at least one first pattern to perform a thinning process and a smoothing process on the image data to output the image data subjected to the thinning process and the smoothing process as first image data of the second resolution, the second resolution being higher than the first resolution; converting the image data of the first resolution into image data of the second resolution to output the converted image data as second image data of the second resolution; detecting whether the target pixel is included in a fine line structure based on a level setting signal to output a result of the detecting; and selecting one of the first image data and the second image data for output based on the first determination result and the result of the detecting.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating a configuration example of functional blocks of a drive control unit in the light source control device according to the first embodiment in FIG. 6;

FIG. 10 is a diagram illustrating a configuration example of functional blocks of a modulated signal generating unit in the drive control unit according to the first embodiment in FIG. 9;

Figure 14B:
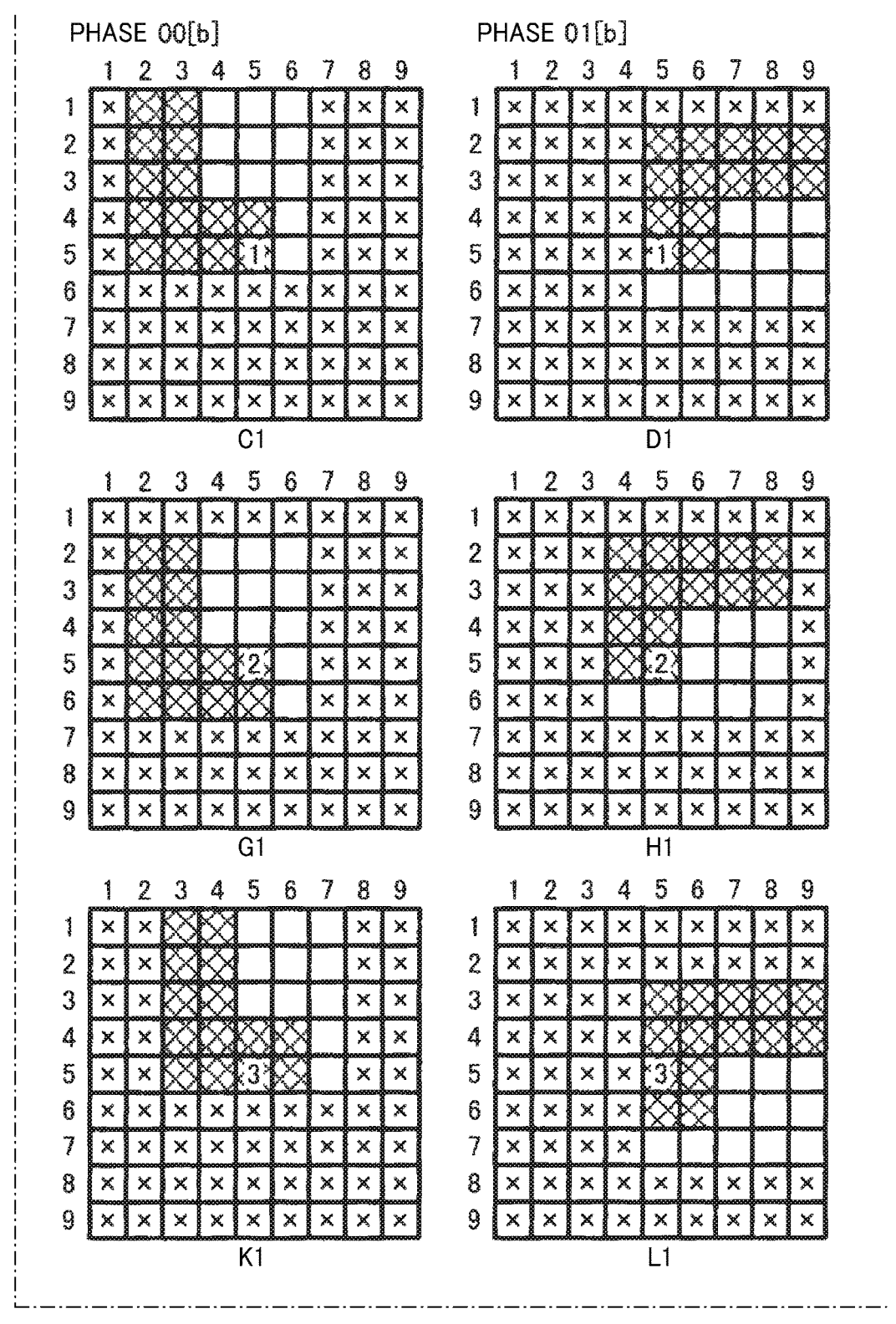
Figure 14C:
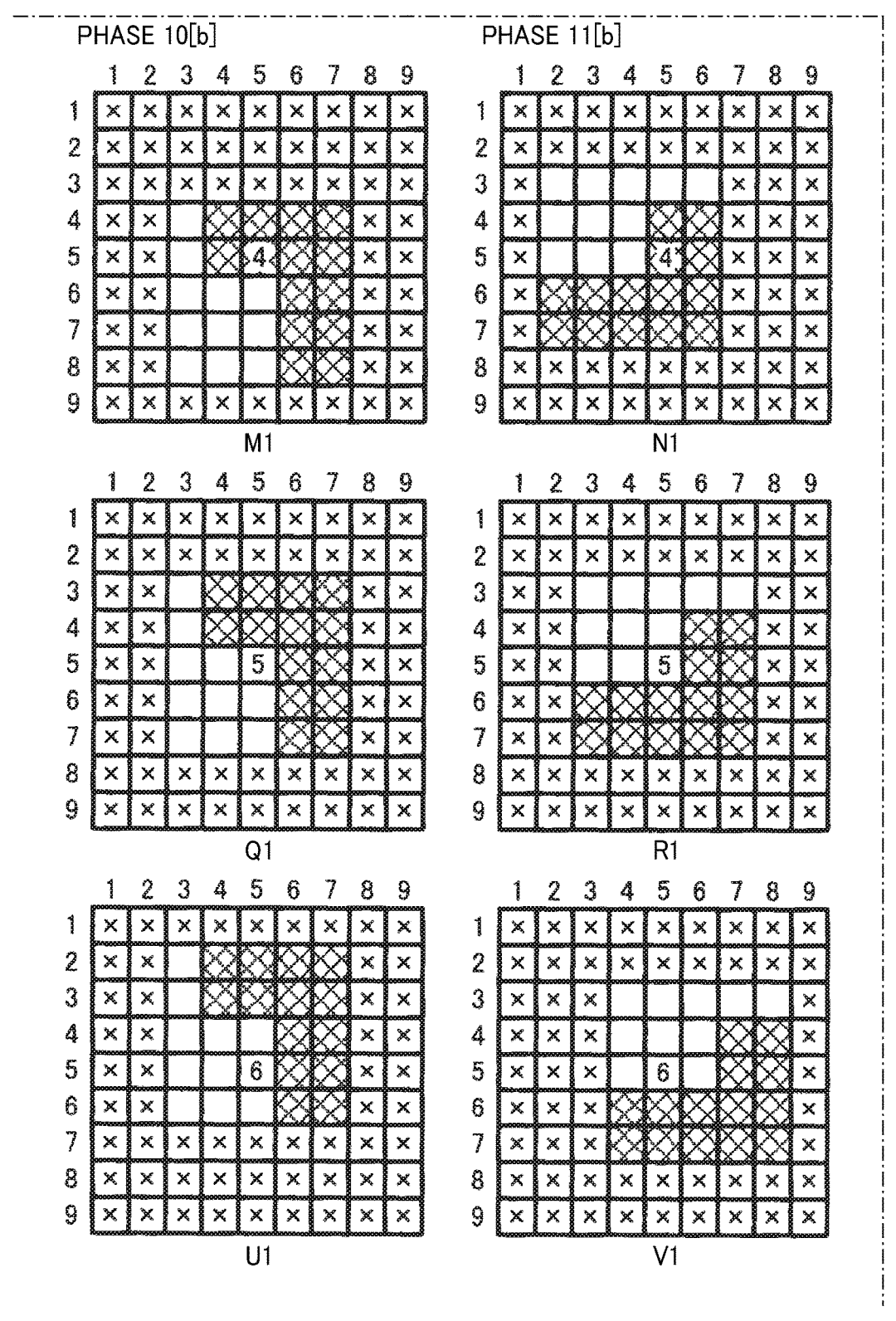
Figure 14D:
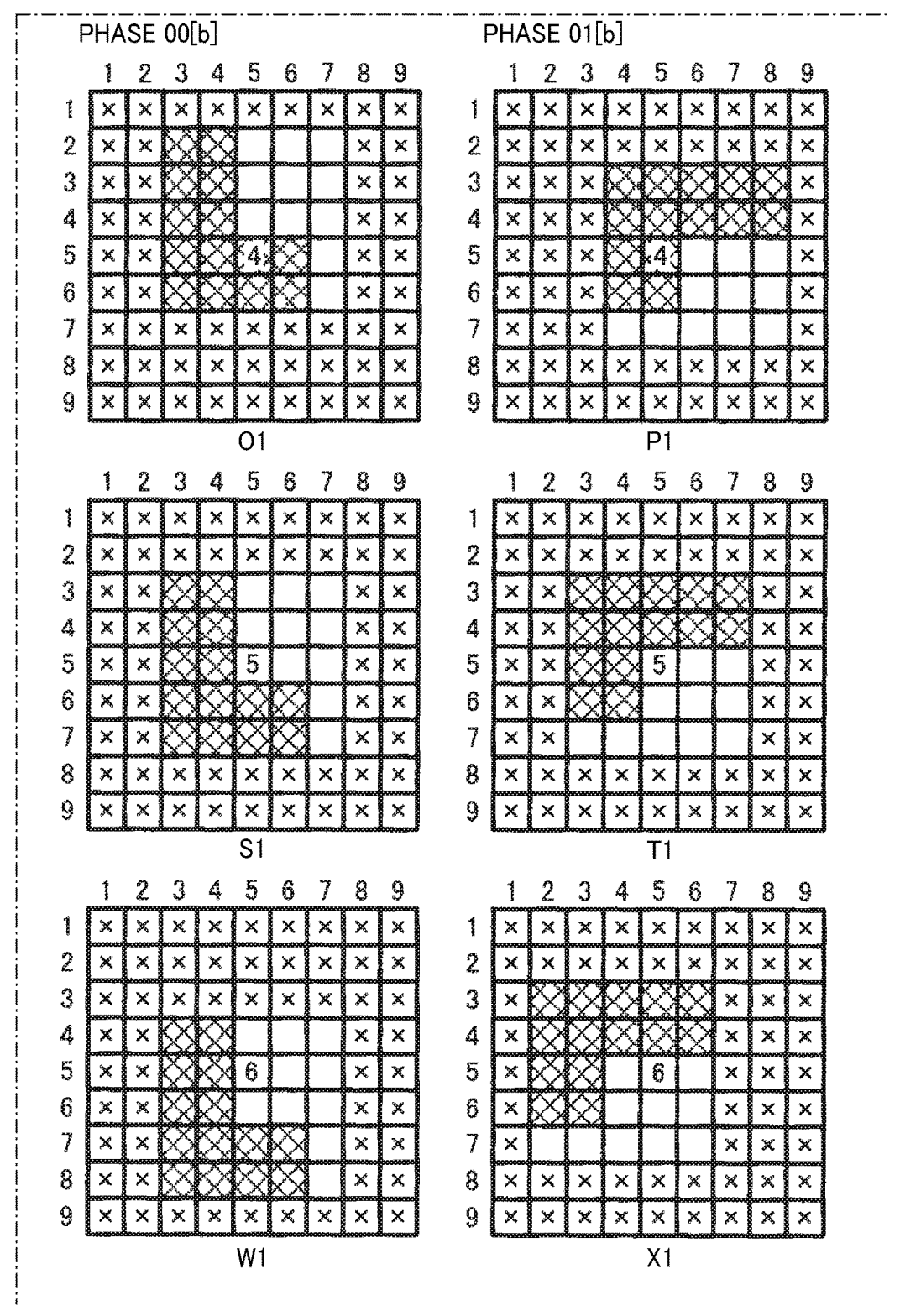
Figure 15B:
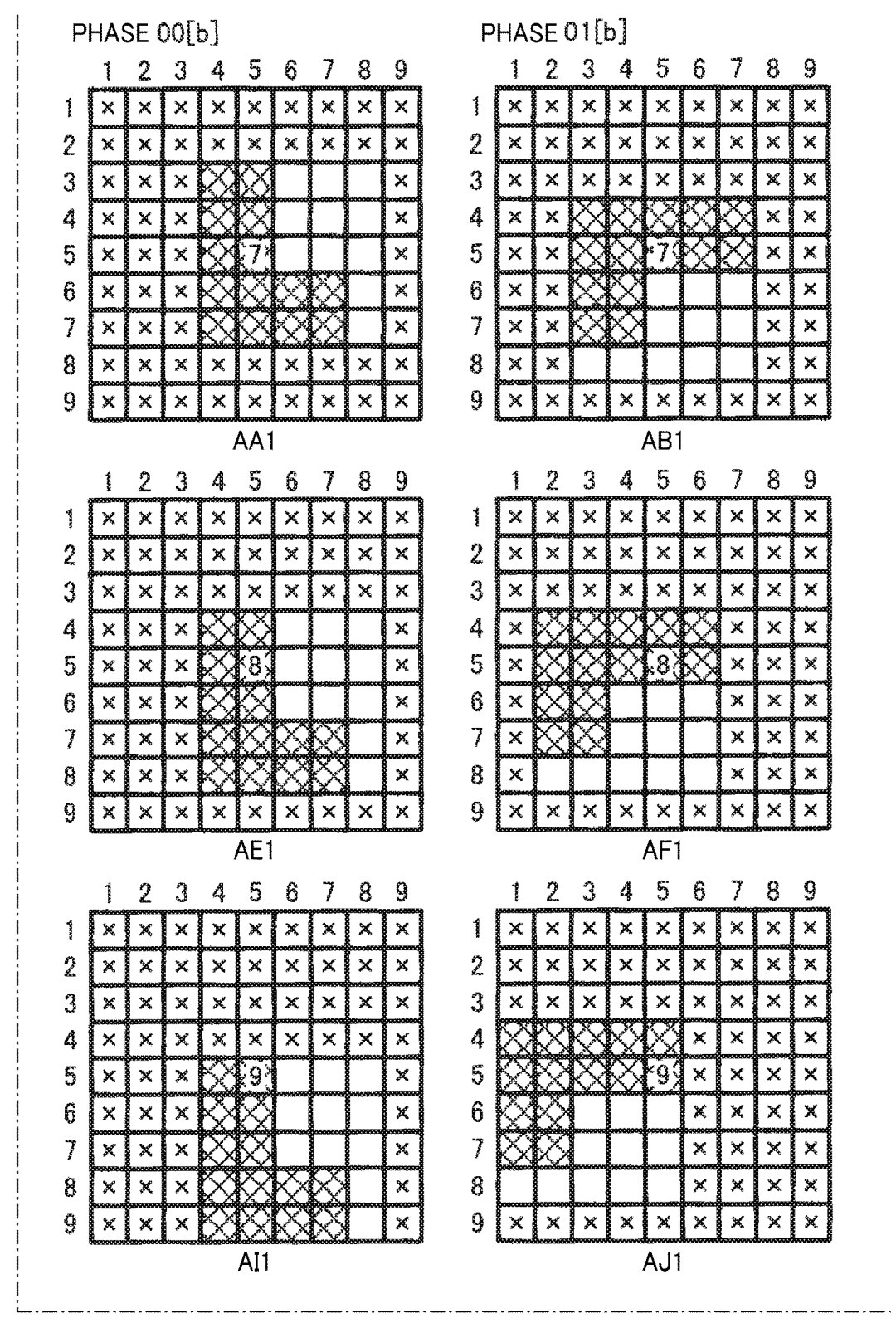
Figure 15C:
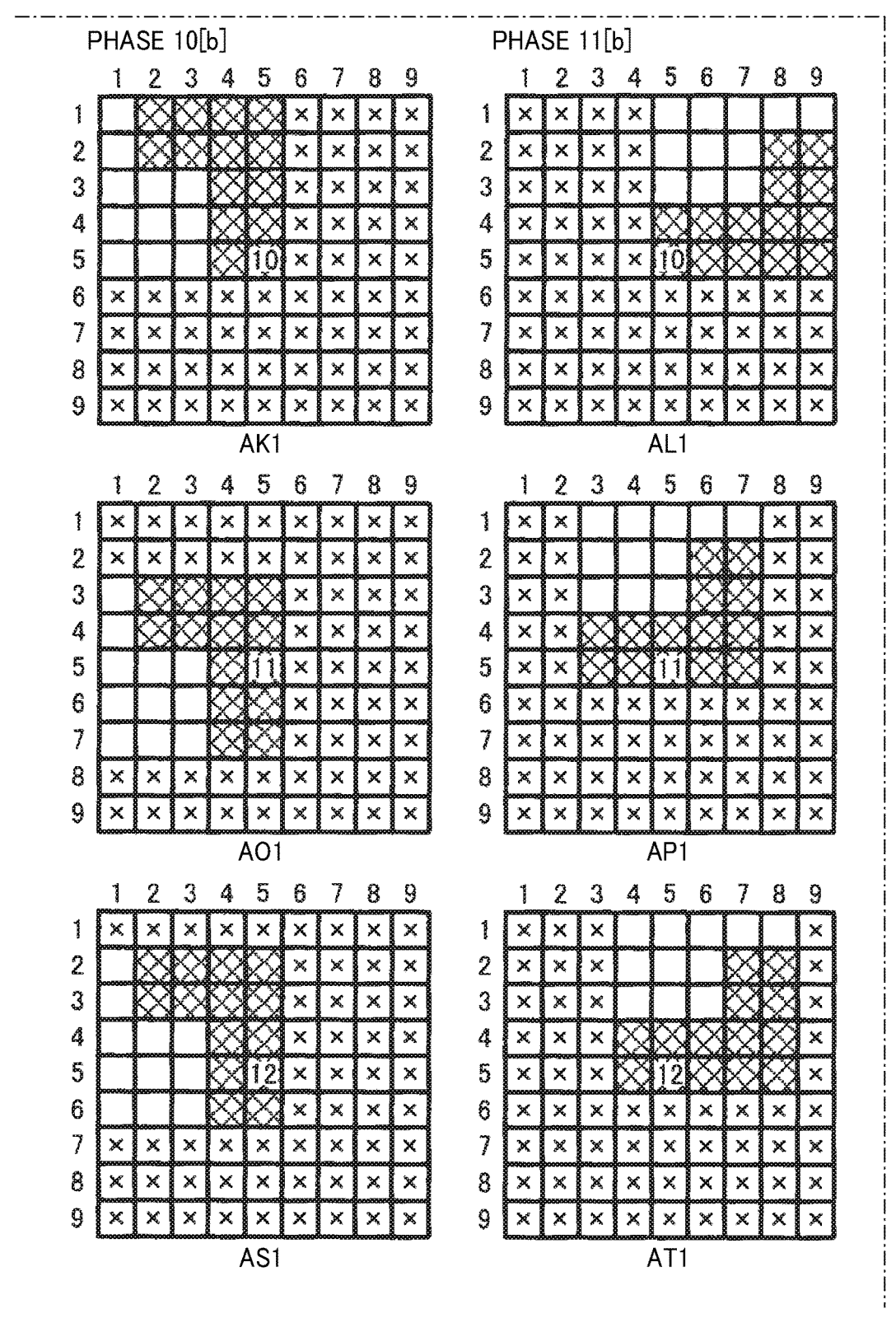
Figure 15D:
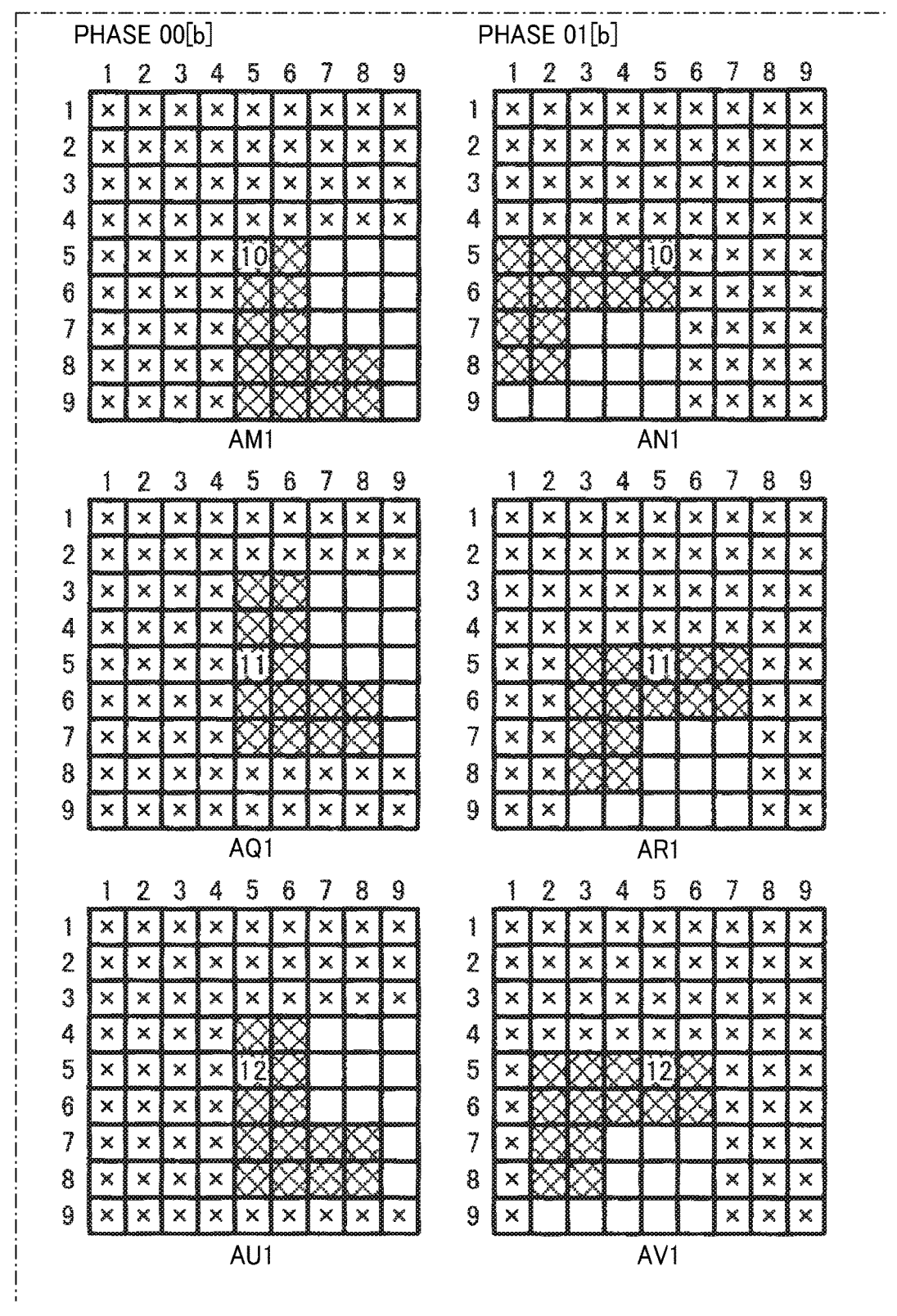
Figure 16B:
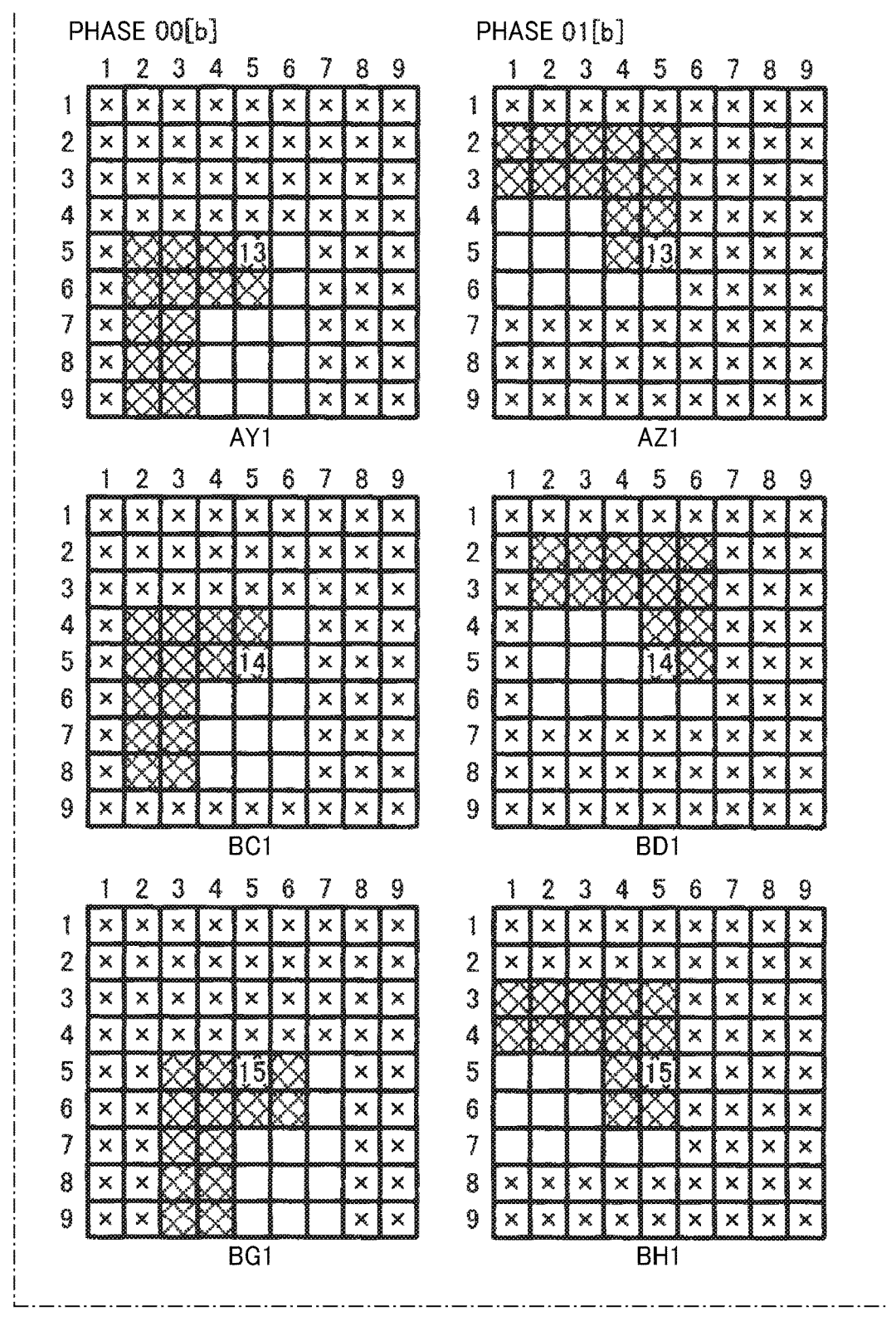
Figure 16C:
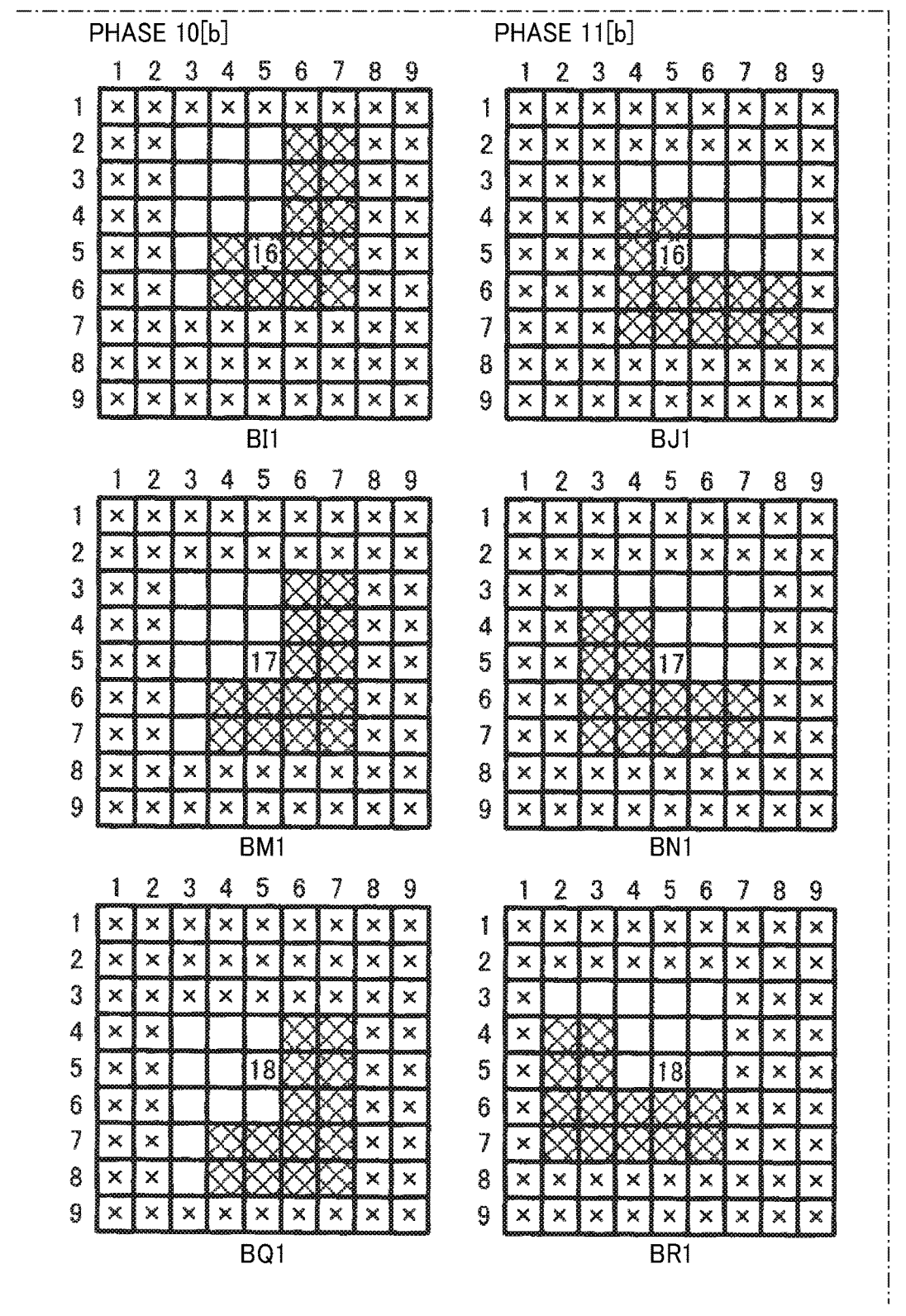
Figure 16D:
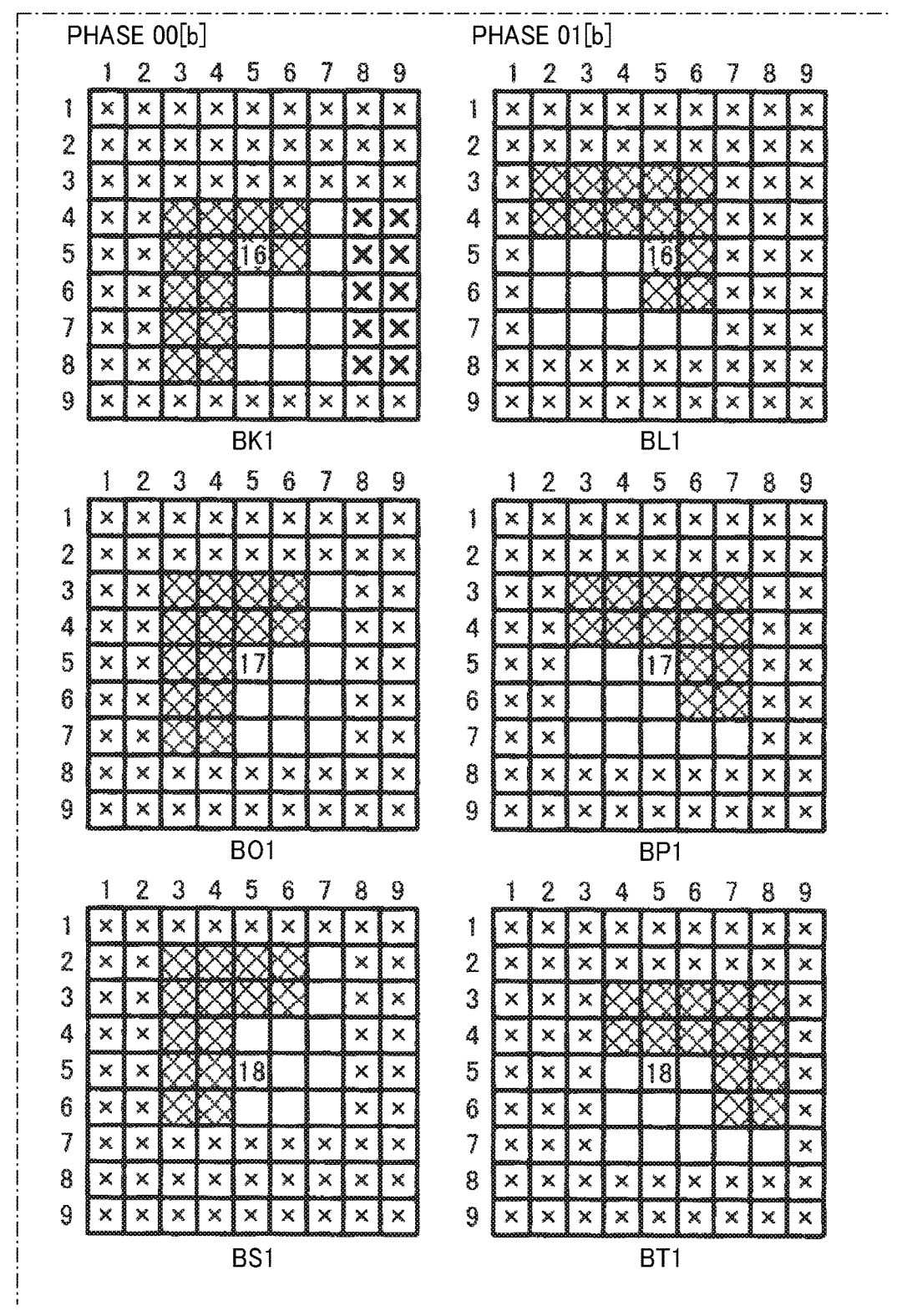

FIGS. 14A to 14D, 15A to 15D, 16A to 16D, and 17A to 17D are diagrams illustrating an example of first patterns used in a pattern matching process according to the first embodiment;

FIGS. 19A and 19B are diagrams illustrating an example of image processing performed by the image converting unit according to the first embodiment;

FIGS. 20A to 20C are diagrams illustrating examples of setting a detection level in the lateral direction of a fine line;

FIGS. 21A to 21C are diagrams illustrating examples of setting a detection level in the longitudinal direction of a fine line;

FIGS. 26A and 26B are diagrams illustrating that the first patterns used in the pattern matching process in the first embodiment are reducible in size;

FIGS. 29A to 29B, 30A to 30B, and 31A to 31B are diagrams illustrating an example of second patterns used in a pattern matching process according to the second embodiment performed before the thinning process on a black character, for example;

FIGS. 38A to 38B, and 39A to 39B are diagrams illustrating an example of second patterns used in a pattern matching process according to the second embodiment performed before the thinning process on a white character, for example;

FIG. 42 is a diagram illustrating an example of assignment of tag information.

Figure 1:
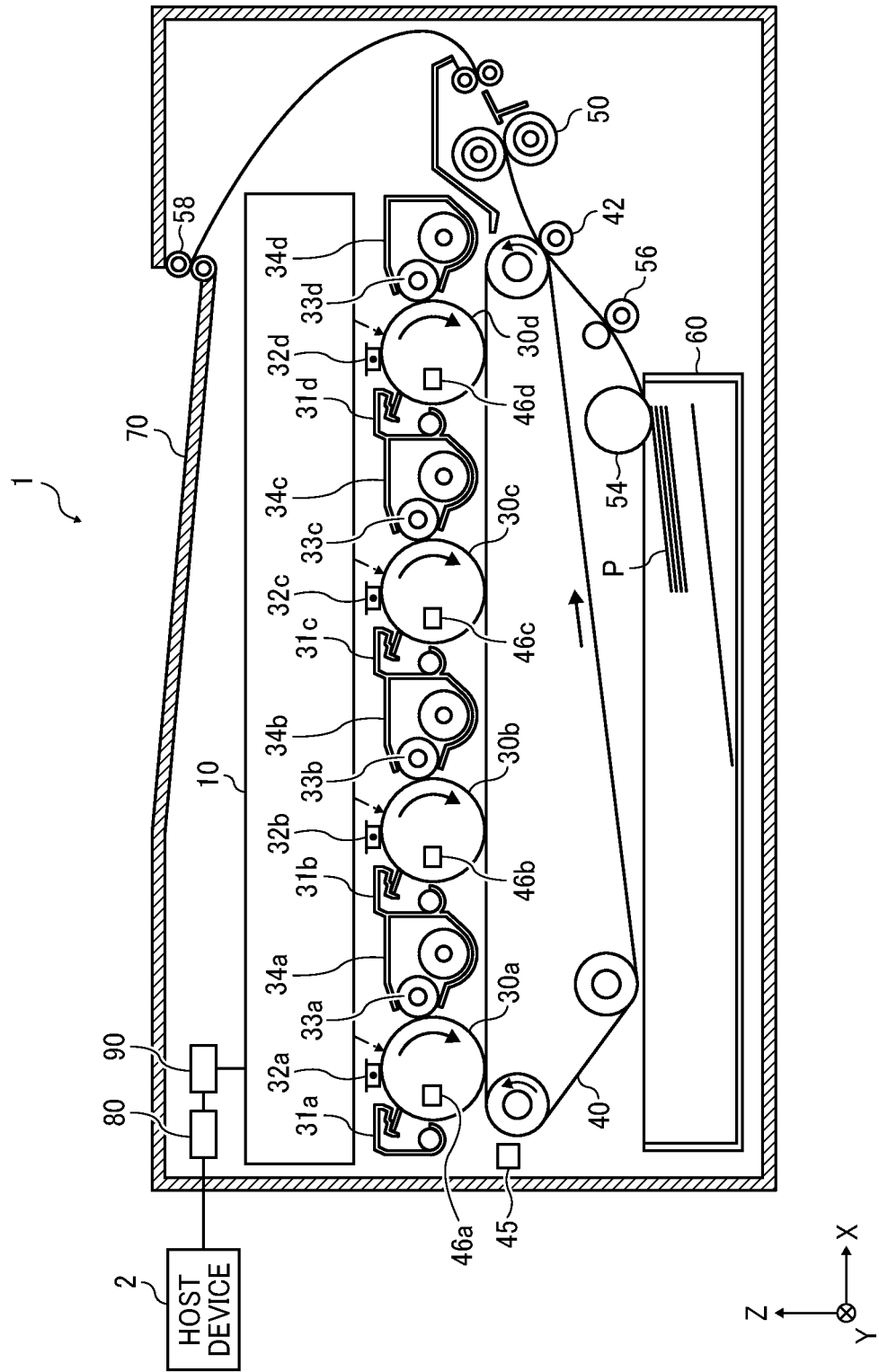
FIG. 1 is a diagram illustrating a schematic configuration of an image forming apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the accompanying drawings of FIGS. 1 to 42, wherein like reference numerals designate identical or corresponding parts throughout the views, an image processing device, a drive control device, a light source control device, an image forming apparatus, and an image processing method according to embodiments of the present invention will be described in detail.

An image forming apparatus according to an embodiment of the present invention is applicable to a multifunction peripheral (MFP) having at least two of a copier function, a printer function, a scanner function, and a facsimile machine function and other image forming apparatuses such as a copier and a printer.

A first embodiment of the present invention will now be described.

A schematic configuration of an image forming apparatus 1 according to the first embodiment will first be described with reference to FIG. 1.

FIG. 1 is a diagram illustrating the schematic configuration of the image forming apparatus 1 according to the first embodiment. The image forming apparatus 1 illustrated in FIG. 1 transfers toner onto a recording sheet P (i.e., a target object) to form a printed material. The image forming apparatus 1 employs a tandem system to superimpose four colors: cyan, magenta, yellow, and black, upon one another to form a full-color image.

As illustrated in FIG. 1, the image forming apparatus 1 includes an optical scanning device 10 (i.e., a latent image forming device), four photoconductor drums 30a, 30b, 30c, and 30d, four cleaning units 31a, 31b, 31c, and 31d, four charging devices 32a, 32b, 32c, and 32d, four developing rollers 33a, 33b, 33c, and 33d, four toner cartridges 34a, 34b, 34c, and 34d, a transfer belt 40, a transfer roller 42, a density detector 45, four home position sensors 46a, 46b, 46c, and 46d, a fixing roller 50, a sheet feeding roller 54, a registration roller pair 56, a sheet ejection roller 58, a sheet feeding tray 60, a sheet ejection tray 70, a communication control device 80, and a printer control device 90.

The photoconductor drum 30a, the cleaning unit 31a, the charging device 32a, the developing roller 33a, and the toner cartridge 34a are used as one set, and form an image forming station that forms a black (K) image (also referred to as the K station).

The photoconductor drum 30b, the cleaning unit 31b, the charging device 32b, the developing roller 33b, and the toner cartridge 34b are used as one set, and form an image forming station that forms a cyan (C) image (also referred to as the C station).

The photoconductor drum 30c, the cleaning unit 31c, the charging device 32c, the developing roller 33c, and the toner cartridge 34c are used as one set, and form an image forming station that forms a magenta (M) image (also referred to as the M station).

The photoconductor drum 30d, the cleaning unit 31d, the charging device 32d, the developing roller 33d, and the toner cartridge 34d are used as one set, and form an image forming station that forms a yellow (Y) image (also referred to as the Y station).

In the following, a given one of the photoconductor drums 30a, 30b, 30c, and 30d may simply be referred to as the photoconductor drum 30, and the photoconductor drums 30a, 30b, 30c, and 30d may collectively be referred to as the photoconductor drums 30. The same applies to the cleaning units 31a, 31b, 31c, and 31d, the charging devices 32a, 32b, 32c, and 32d, the developing rollers 33a, 33b, 33c, and 33d, the toner cartridges 34a, 34b, 34c, and 34d, and the home position sensors 46a, 46b, 46c, and 46d.

The optical scanning device 10 irradiates a charged outer circumferential surface of each of the photoconductor drums 30 with laser light modulated for the color corresponding to the photoconductor drum 30 based on the corresponding image data (i.e., cyan image data, magenta image data, yellow image data, or black image data). Thereby, electric charge disappears in light-irradiated portions of the outer circumferential surface of the photoconductor drum 30, and a latent image corresponding to the image data is formed on the outer circumferential surface of the photoconductor drum 30. With the rotation of the photoconductor drum 30, the latent image formed on the outer circumferential surface of the photoconductor drum 30 moves to the corresponding developing roller 33. Details of the configuration of the optical scanning device 10 will be described later.

The photoconductor drum 30 is an example of a latent image bearer, and includes a photosensitive layer forming the outer circumferential surface thereof. That is, the outer circumferential surface of the photoconductor drum 30 serves as a scanned surface that is scanned by the optical scanning device 10. The photoconductor drums 30a, 30b, 30c, and 30d are aligned with the respective rotation axes thereof being parallel to one another, for example, and rotate in the same direction, such as the direction as indicated by the corresponding arrows in FIG. 1, for example.

The following description will be given with reference to a three-dimensional XYZ orthogonal coordinate system, in which the Y-axis direction is parallel to the respective central axes (i.e., rotation axes) of the photoconductor drums 30, and the X-axis direction corresponds to the direction along which the photoconductor drums 30 are aligned.

The cleaning unit 31 removes residual toner remaining on the outer circumferential surface of the corresponding photoconductor drum 30. After the removal of the residual toner, the outer circumferential surface of the photoconductor drum 30 returns to the previous position facing the corresponding charging device 32.

The charging device 32 uniformly charges the outer circumferential surface of the corresponding photoconductor drum 30.

When the developing roller 33 rotates, toner in the corresponding toner cartridge 34 is thinly applied to an outer circumferential surface of the developing roller 33. Then, the toner on the outer circumferential surface of the developing roller 33 comes into contact with the outer circumferential surface of the corresponding photoconductor drum 30, and adheres to the light-irradiated portions of the outer circumferential surface of the photoconductor drum 30. That is, the developing roller 33 causes the toner to adhere to the latent image formed on the outer circumferential surface of the corresponding photoconductor drum 30, to thereby render the latent image visible as a toner image.

The toner cartridge 34a supplies black toner to the developing roller 33a, and the toner cartridge 34b supplies cyan toner to the developing roller 33b. The toner cartridge 34c supplies magenta toner to the developing roller 33c, and the toner cartridge 34d supplies yellow toner to the developing roller 33d.

The transfer belt 40 is stretched around a belt rotating mechanism to rotate in one direction. The transfer belt 40 has an outer circumferential surface that contacts the respective outer circumferential surfaces of the photoconductor drums 30 at positions away from the optical scanning device 10. The toner images on the photoconductor drums 30 are sequentially superimposed and transferred onto the transfer belt 40, thereby forming a color toner image on the transfer belt 40. The outer circumferential surface of the transfer belt 40 further contacts the transfer roller 42.

The transfer roller 42 contacts the outer circumferential surface of the transfer belt 40 with the recording sheet P from the sheet feeding tray 60 interposed between the transfer roller 42 and transfer belt 40. Thereby, the color toner image formed on the transfer belt 40 is transferred onto the recording sheet P.

The density detector 45 is a sensor disposed on the −X side (i.e., the left side in FIG. 1) of the transfer belt 40 at a position upstream of the fixing roller 50 and downstream of the four photoconductor drums 30 in the moving direction of the transfer belt 40 to detect the toner density of the color toner image formed on the transfer belt 40.

The home position sensor 46 detects the home position (i.e., in-situ position) of the corresponding photoconductor drum 30 that rotates.

The fixing roller 50 applies heat and pressure to the recording sheet P to fix the toners on the recording sheet P. The recording sheet P having the toners fixed thereon is transported to and ejected onto the sheet ejection tray 70 via the sheet ejection roller 58.

The sheet feeding roller 54 is a member disposed near the sheet feeding tray 60 to feed recording sheets P one by one from the sheet feeding tray 60 and transport each of the recording sheets P to the registration roller pair 56.

The registration roller pair 56 transports the recording sheet P toward a gap between the transfer belt 40 and the transfer roller 42 at a predetermined time. Thereby, the color toner image on the transfer belt 40 is transferred onto the recording sheet P. The recording sheet P having the color toner image transferred thereto is then transported to the fixing roller 50.

The sheet ejection roller 58 ejects, to the sheet ejection tray 70, the recording sheet P having the color toner image transferred thereto and sent out of the fixing roller 50.

The sheet feeding tray 60 stores the recording sheets P. The sheet ejection tray 70 receives a stack of the recording sheets P having color toner images transferred thereto and sequentially ejected by the sheet ejection roller 58.

The communication control device 80 controls bidirectional communication between the image forming apparatus 1 and a host device 2 (e.g., a computer) via a network, for example.

The printer control device 90 performs overall control of devices included in the image forming apparatus 1. The printer control device 90 includes a central processing unit (CPU), a read-only memory (ROM) that stores programs described in code and executed by the CPU and various data used in the execution of the programs, a random access memory (RAM) serving as a working memory, and an analog-digital (AD) converter circuit that converts analog data into digital data. The printer control device 90 controls the devices of the image forming apparatus 1 in response to a request from the host device 2, and transmits image data from the host device 2 to the optical scanning device 10.

With reference to FIGS. 2 to 5, a configuration and operation of the optical scanning device 10 will now be described.

Figure 2:
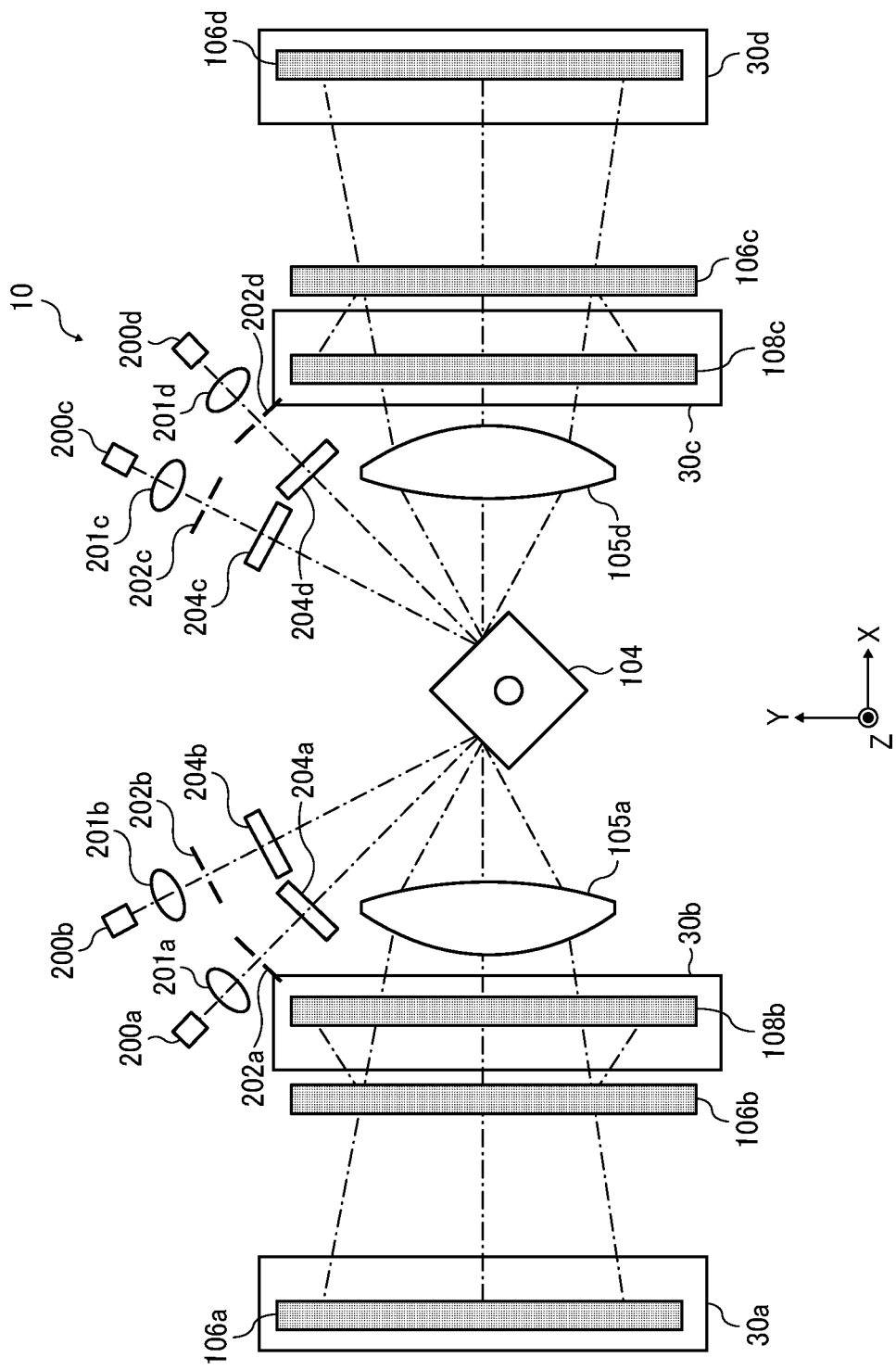
FIG. 2 is a diagram illustrating a configuration of an optical system of an optical scanning device in the image forming apparatus according to the first embodiment in FIG. 1.
Figure 3:
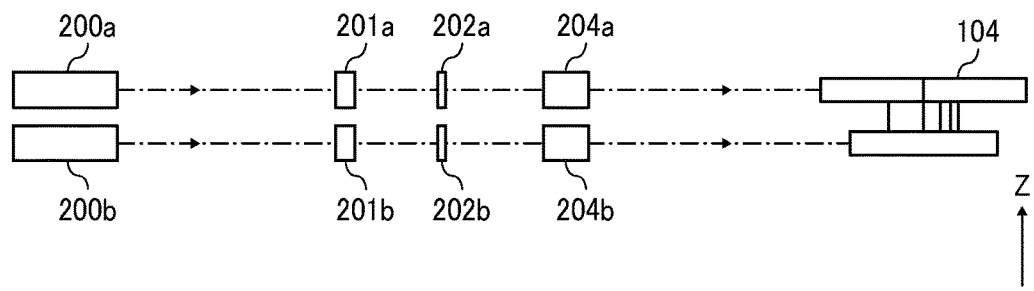
FIGS. 3 and 4 are diagrams illustrating an example of optical paths from light sources to a polygon mirror in the optical scanning device in FIG. 2.
Figure 4:
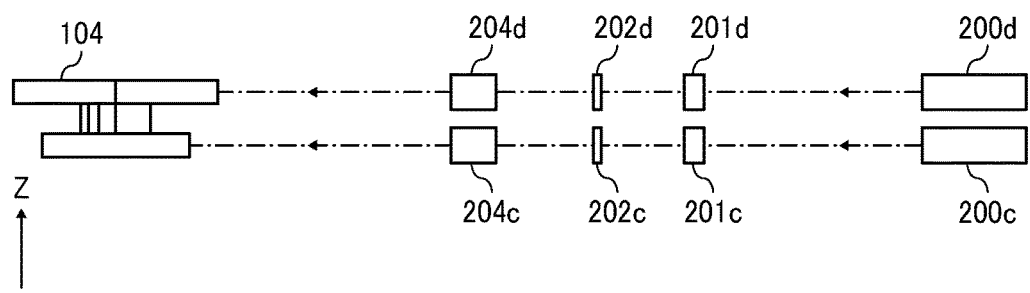
Figure 5:
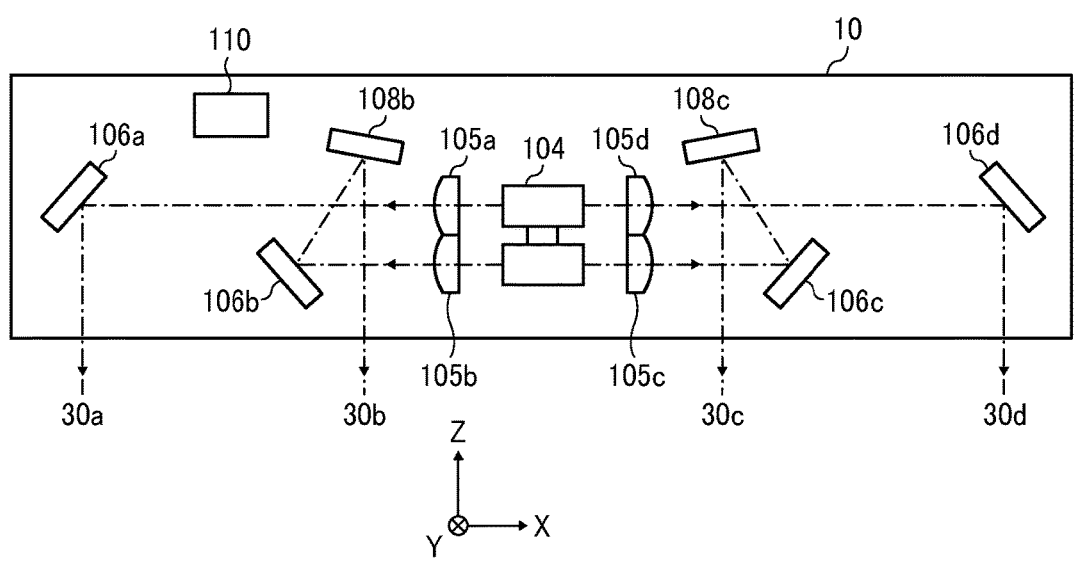
FIG. 5 is a diagram illustrating an example of optical paths from the polygon mirror to photoconductor drums in the image forming apparatus in FIG. 1.

FIG. 2 is a diagram illustrating a configuration of an optical system of the optical scanning device 10 according to the first embodiment. FIGS. 3 and 4 are diagrams illustrating an example of optical paths from light sources to a polygon mirror in the optical scanning device 10. FIG. 5 is a diagram illustrating an example of optical paths from the polygon mirror to the photoconductor drums 30.

As illustrated in FIGS. 2 to 5, the optical scanning device 10 has an optical system including four light sources 200a, 200b, 200c, and 200d, four coupling lenses 201a, 201b, 201c, and 201d, four aperture plates 202a, 202b, 202c, and 202d, and four cylindrical lenses 204a, 204b, 204c, and 204d, and an optical system including a polygon mirror 104, four scanning lenses 105a, 105b, 105c, and 105d, six reflecting mirrors 106a, 106b, 106c, 106d, 108b, and 108c. These optical members are installed at respective predetermined positions in an optical housing of the optical scanning device 10. As illustrated in FIG. 5, the optical scanning device 10 further includes a light source control device 110, which is an electric circuit. Details of the light source control device 110 will be described later with reference to FIGS. 6 to 11.

In the following, a given one of the light sources 200a, 200b, 200c, and 200d may simply be referred to as the light source 200, and the light sources 200a, 200b, 200c, and 200d may collectively be referred to as the light sources 200. The same applies to the coupling lenses 201a, 201b, 201c, and 201d, the aperture plates 202a, 202b, 202c, and 202d, the cylindrical lenses 204a, 204b, 204c, and 204d, and the scanning lenses 105a, 105b, 105c, and 105d.

The light source 200 is a laser light source including a surface-emitting laser array having a plurality of two-dimensionally arrayed light emitting units. The plurality of light emitting units of the surface-emitting laser array are disposed such that the intervals between the light-emitting units are equal when the light emitting units are all orthographically projected on a virtual line extending in the sub-scanning direction. The light source 200 is a vertical cavity surface emitting laser (VCSEL), for example. However, the light source 200 is not limited thereto, and may be a single laser diode (LD) or a laser diode array (LDA), for example.

The coupling lens 201 is disposed on the optical path of a beam emitted from the corresponding light source 200 to convert the beam passing through the coupling lens 201 into a substantially parallel beam.

The aperture plate 202 is a member having an aperture to shape the beam having passed through the corresponding coupling lens 201.

The cylindrical lens 204 images the beam having passed through the aperture of the corresponding aperture plate 202, specifically images the beam near deflective reflection surfaces of the polygon mirror 104 with respective to the Z-axis.

The coupling lens 201a, the aperture plate 202a, and the cylindrical lens 204a cooperate as a pre-deflector optical system for the K station, and the coupling lens 201b, the aperture plate 202b, and the cylindrical lens 204b cooperate as a pre-deflector optical system for the C station. The coupling lens 201c, the aperture plate 202c, and the cylindrical lens 204c cooperate as a pre-deflector optical system for the M station, and the coupling lens 201d, the aperture plate 202d, and the cylindrical lens 204d cooperate as a pre-deflector optical system for the Y station.

The polygon mirror 104 is an optical member including a two-stage, four-surface mirror that rotates around an axis parallel to the Z-axis, with each of the four surfaces of the mirror functioning as a deflective reflection surface. The polygon mirror 104 is disposed such that the first stage (i.e., lower stage) of the four-surface mirror deflects the beam from the cylindrical lens 204b and the beam from the cylindrical lens 204c, and that the second stage (i.e., upper stage) of the four-face mirror deflects the beam from the cylindrical lens 204a and the beam from the cylindrical lens 204d. The beam from the cylindrical lens 204a and the beam from the cylindrical lens 204b are deflected to the −X side of the polygon mirror 104 (i.e., the left side in FIG. 2), and the beam from the cylindrical lens 204c and the beam from the cylindrical lens 204d are deflected to the +X side of the polygon mirror 104 (i.e., the right side in FIG. 2).

The scanning lens 105 has optical power for condensing a beam to the vicinity of the corresponding photoconductor drum 30 and optical power for moving an optical spot on the outer circumferential surface of the corresponding photoconductor drum 30 at uniform velocity in the main scanning direction with the rotation of the polygon mirror 104.

The scanning lenses 105a and 105b are disposed on the −X side of the polygon mirror 104, and are stacked upon each other in the Z-axis direction, as illustrated in FIG. 5. The scanning lens 105b and the scanning lens 105a face the first stage and the second stage, respectively, of the four-surface mirror (i.e., the polygon mirror 104).

The scanning lenses 105c and 105d are disposed on the +X side of the polygon mirror 104, and are stacked upon each other in the Z-axis direction. The scanning lens 105c and the scanning lens 105d face the first stage and the second stage, respectively, of the four-surface mirror (i.e., the polygon mirror 104).

The beam having passed through the cylindrical lens 204a is deflected by the polygon mirror 104, passes through the scanning lens 105a, and is reflected by the reflecting mirror 106a to irradiate the photoconductor drum 30a with the beam and form an optical spot on the photoconductor drum 30a. With the rotation of the polygon mirror 104, the optical spot moves in the longitudinal direction of the photoconductor drum 30a, i.e., the optical spot scans the outer circumferential surface of the photoconductor drum 30a. In this case, the moving direction of the optical spot corresponds to the main scanning direction of the photoconductor drum 30a, and the rotation direction of the photoconductor drum 30a corresponds to the sub-scanning direction of the photoconductor drum 30a.

The beam having passed through the cylindrical lens 204b is deflected by the polygon mirror 104, passes through the scanning lens 105b, and is reflected by the reflecting mirrors 106b and 108b to irradiate the photoconductor drum 30b with the beam and form an optical spot on the photoconductor drum 30b. With the rotation of the polygon mirror 104, the optical spot moves in the longitudinal direction of the photoconductor drum 30b, i.e., the optical spot scans the outer circumferential surface of the photoconductor drum 30b. In this case, the moving direction of the optical spot corresponds to the main scanning direction of the photoconductor drum 30b, and the rotation direction of the photoconductor drum 30b corresponds to the sub-scanning direction of the photoconductor drum 30b.

The beam having passed through the cylindrical lens 204c is deflected by the polygon mirror 104, passes through the scanning lens 105c, and is reflected by the reflecting mirrors 106c and 108c to irradiate the photoconductor drum 30c with the beam and form an optical spot on the photoconductor drum 30c. With the rotation of the polygon mirror 104, the optical spot moves in the longitudinal direction of the photoconductor drum 30c, i.e., the optical spot scans the outer circumferential surface of the photoconductor drum 30c. In this case, the moving direction of the optical spot corresponds to the main scanning direction of the photoconductor drum 30c, and the rotation direction of the photoconductor drum 30c corresponds to the sub-scanning direction of the photoconductor drum 30c.

The beam having passed through the cylindrical lens 204d is deflected by the polygon mirror 104, passes through the scanning lens 105d, and is reflected by the reflecting mirror 106d to irradiate the photoconductor drum 30d with the beam and form an optical spot on the photoconductor drum 30d. With the rotation of the polygon mirror 104, the optical spot moves in the longitudinal direction of the photoconductor drum 30d, i.e., the optical spot scans the outer circumferential surface of the photoconductor drum 30d. In this case, the moving direction of the optical spot corresponds to the main scanning direction of the photoconductor drum 30d, and the rotation direction of the photoconductor drum 30d corresponds to the sub-scanning direction of the photoconductor drum 30d.

The reflecting mirrors 106a, 106b, 106c, 106d, 108b, and 108c are disposed such that the optical paths from the polygon mirror 104 to the respective photoconductor drums 30 have the same length, and that the respective beams incident on the photoconductor drums 30 have the same position of incidence and the same angle of incidence.

An optical system disposed on the optical path between the polygon mirror 104 and each of the photoconductor drums 30 is also referred to as a scanning optical system. The scanning lens 105a and the reflecting mirror 106a cooperate as a scanning optical system for the K station, and the scanning lens 105b and the two reflecting mirrors 106b and 108b cooperate as a scanning optical system for the C station. The scanning lens 105c and the two reflecting mirrors 106c and 108c cooperate as a scanning optical system for the M station, and the scanning lens 105d and the reflecting mirror 106d cooperate as a scanning optical system for the Y station. In each of these scanning optical systems, the scanning lens 105 may include a plurality of lenses.

Figure 6:
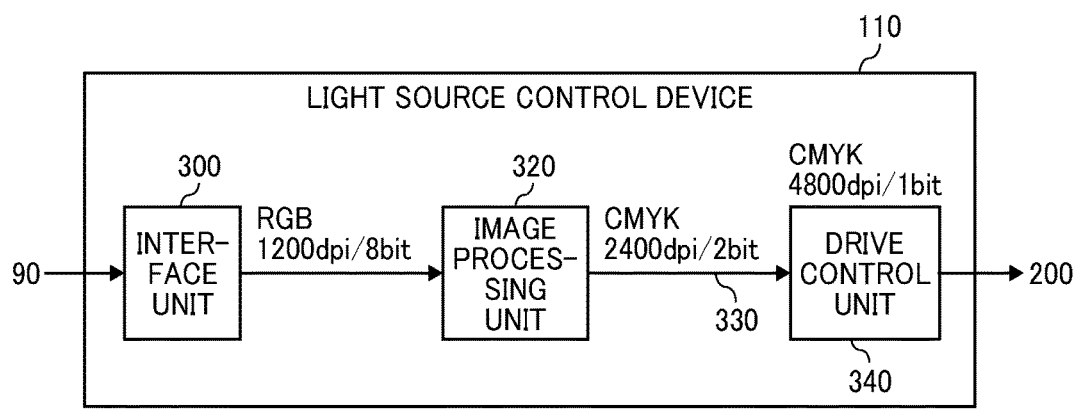
FIG. 6 is a diagram illustrating a configuration example of functional blocks of a light source control device in the optical scanning device according to the first embodiment in FIG. 2.

With reference to FIG. 6, a configuration of functional blocks of the light source control device 110 according to the first embodiment will be described.

FIG. 6 is a diagram illustrating a configuration example of the functional blocks of the light source control device 110 according to the first embodiment. As illustrated in FIG. 6, the light source control device 110 includes an interface unit 300 (i.e., an interface), an image processing unit 320 (i.e., a processor), and a drive control unit 340 (i.e., a drive control device).

The interface unit 300 acquires, from the printer control device 90, the image data transferred from the host device 2 (e.g., a computer), and transmits the acquired image data to the subsequent image processing unit 320. A specific hardware configuration of the interface unit 300 will be described later with reference to FIG. 7.

The image processing unit 320 performs a variety of image processing on 8-bit, red-green-blue (RGB)-formatted image data having a resolution of 1200 dots per inch (dpi), for example. The image processing unit 320 converts the image data input from the interface unit 300 (e.g., image data in the RGB format) into color image data compatible with the printing system employed by the image forming apparatus 1 (e.g., image data in a cyan-magenta-yellow-black (CMYK) format).

The drive control unit 340 receives the processed image data from the image processing unit 320, generates a modulated pulse signal for driving the corresponding light source 200, and drives the light source 200 to emit light with a drive signal corresponding to the modulated pulse signal.

The drive control unit 340 is implemented by, for example, a single one-chip integrated device, such as an application specific integrated circuit (ASIC), provided near the light source 200. As illustrated in FIG. 6, the drive control unit 340 is connected to the image processing unit 320 with a cable 330, for example.

Figure 7:
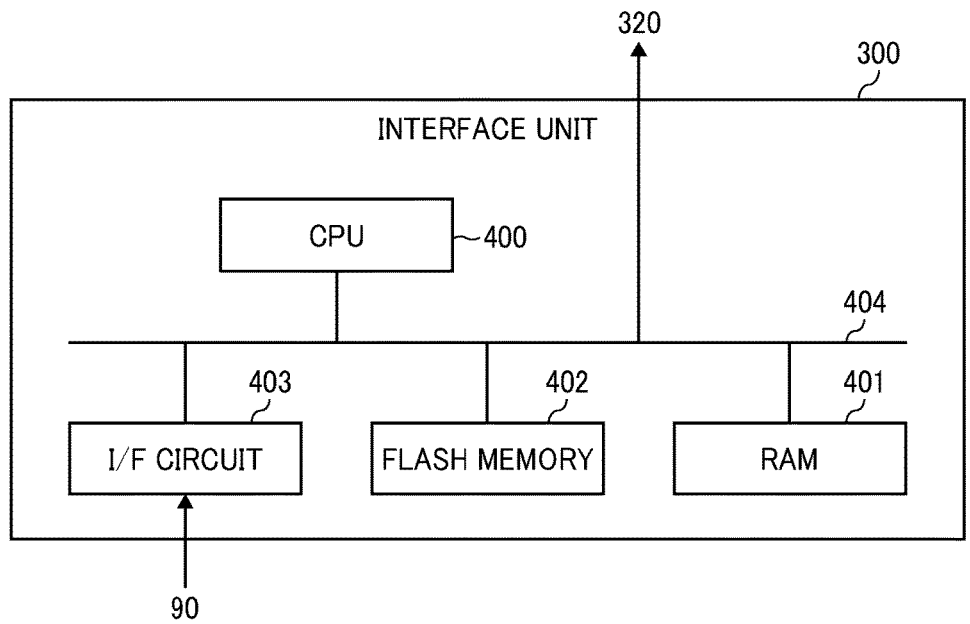
FIG. 7 is a diagram illustrating an example of the hardware configuration of an interface unit in the light source control device according to the first embodiment in FIG. 6.

With reference to FIG. 7, a hardware configuration of the interface unit 300 according to the first embodiment will be described.

FIG. 7 is a diagram illustrating an example of the hardware configuration of the interface unit 300 in the light source control device 110 according to the first embodiment. As illustrated in FIG. 7, the interface unit 300 includes a CPU 400, a RAM 401, a flash memory 402, and an interface (I/F) circuit 403.

The CPU 400 is an arithmetic device that operates in accordance with programs stored in the flash memory 402, and controls the entire optical scanning device 10. The RAM 401 is a volatile storage device used as a work area for the CPU 400. The flash memory 402 is a non-volatile storage device that stores a variety of programs executed by the CPU 400 and a variety of data for used in the execution of these programs. The I/F circuit 403 is a communication interface that performs bidirectional communication with the printer control device 90. For example, the I/F circuit 403 receives a printer control signal from the printer control device 90. The image data from the host device 2 is input to the light source control device 110 via the I/F circuit 403.

As illustrated in FIG. 7, a bus 404 serves as an address bus and a data bus for connecting the CPU 400, the RAM 401, the flash memory 402, and the I/F circuit 403 to allow communication thereamong.

Figure 8:
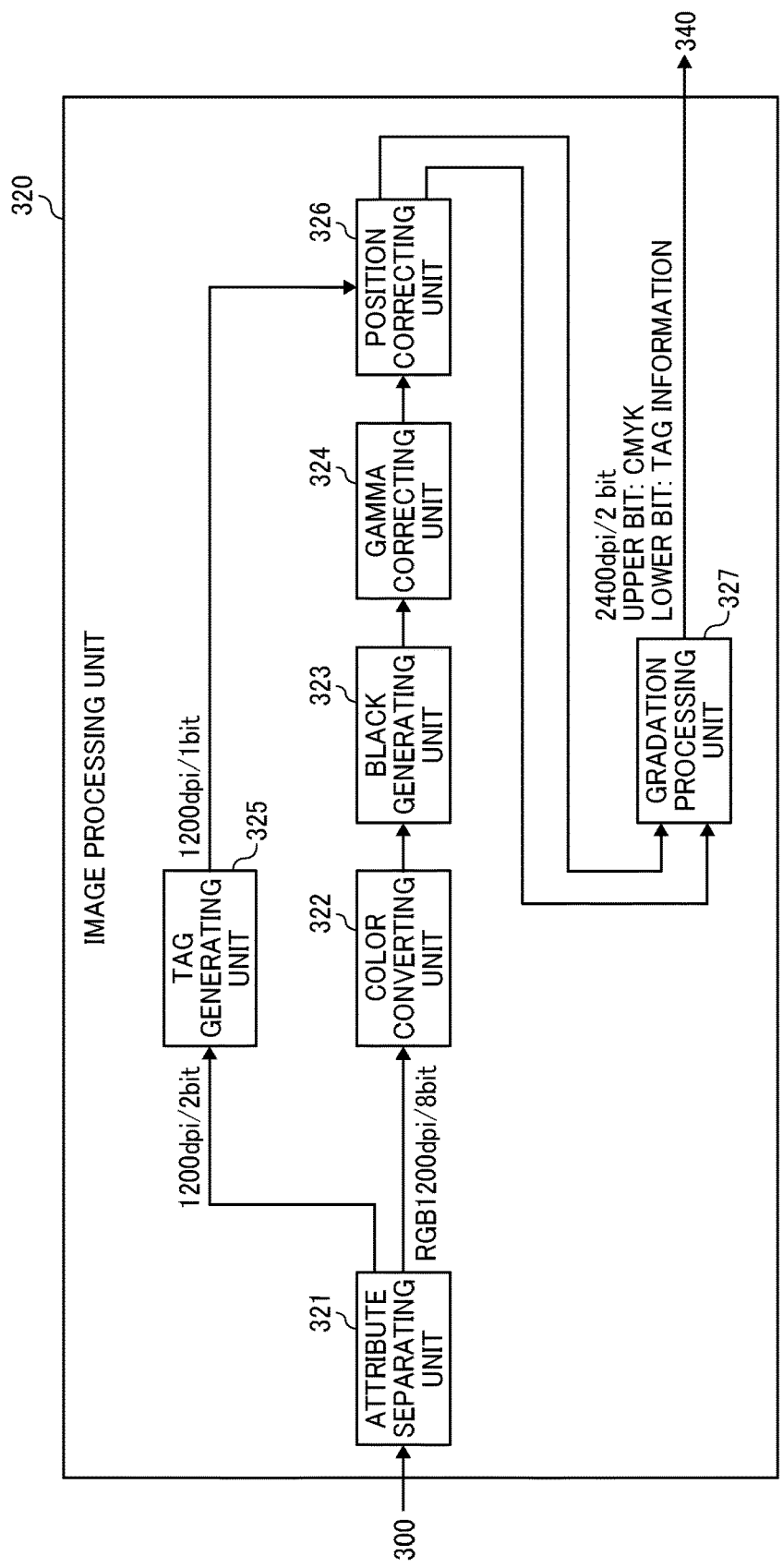
FIG. 8 is a diagram illustrating a configuration example of functional blocks of an image processing unit in the light source control device according to the first embodiment in FIG. 6.

With reference to FIG. 8, a configuration of functional blocks of the image processing unit 320 according to the first embodiment will be described.

FIG. 8 is a diagram illustrating a configuration example of the functional blocks of the image processing unit 320 in the light source control device 110 according to the first embodiment. As illustrated in FIG. 8, the image processing unit 320 includes an attribute separating unit 321, a color converting unit 322, a black generating unit 323, a gamma correcting unit 324, a tag generating unit 325, a position correcting unit 326, and a gradation processing unit 327.

The attribute separating unit 321 separates attribute information from the image data input from the interface unit 300. The attribute information indicates the type of an object serving as the source of the corresponding area (i.e., pixel). For example, if the pixel is a part of a character, the attribute information of the pixel indicates the attribute of character. If the pixel is a part of a line, the attribute information of the pixel indicates the attribute of line. If the pixel is a part of a figure, the attribute information of the pixel indicates the attribute of figure. If the pixel is a part of a photograph, the attribute information of the pixel indicates the attribute of photograph. The attribute separating unit 321 transmits the separated attribute information (e.g., 2-bit data having the same resolution of 1200 dpi as that of the image data) to the tag generating unit 325. The attribute separating unit 321 further transmits the separated image data (e.g., 1200-dpi, 8-bit data in the RGB format) to the color converting unit 322.

The color converting unit 322 converts the 8-bit image data in the RGB format into 8-bit image data in a CMY format for reproducing the colors cyan (C), magenta (M), and yellow (Y) with an image forming apparatus such as a printer. The color converting unit 322 transmits the CMY-formatted image data to the black generating unit 323.

The black generating unit 323 extracts a black component from the CMY-formatted image data, determines the CMY colors, and ultimately converts the image data into the CMYK format. The black generating unit 323 transmits the CMYK-formatted image data to the gamma correcting unit 324.

The gamma correcting unit 324 corrects the respective levels of the colors of the CMYK-formatted image data through linear conversion using a table, for example. The gamma correcting unit 324 transmits the corrected image data to the position correcting unit 326.

The tag generating unit 325 generates tag information that indicates whether each of the pixels of the 1200-dpi image data forms a character or a line. For example, the tag generating unit 325 generates the tag information based on the attribute information. The tag information indicating a character or a background, for example, is thus associated with each of the pixels of the image data, thereby making it possible to perform image processing on the pixel corresponding to the tag information in accordance with the contents of the tag information. The tag information may be formed of multiple bits and indicate a plurality of attributes. In the following description, however, it is assumed that the tag information is formed of 1 bit. It is also assumed that tag information with a pixel value "1" indicates that the corresponding pixel forms a character or a line, and that tag information with a pixel value "0" indicates that the corresponding pixel forms an object other than the character and the line, such as a background, for example.

The tag generating unit 325 transmits the tag information, which is practically 1200-dpi, 1-bit data, to the position correcting unit 326.

The position correcting unit 326 receives the image data from the gamma correcting unit 324 and removes noise or distortion from the image data. The position correcting unit 326 further corrects the position of the image through a change in magnification or a shift in position of the image, for example, and converts the resolution of the image data from 1200 dpi to 2400 dpi. The position correcting unit 326 then generates CMYK-formatted image data having a resolution of 2400 dpi (hereinafter referred to as the first resolution), with each of the pixels of the image data represented by multiple bits (8 bits in the present example), and transmits the generated image data to the gradation processing unit 327.

The tag information generated by the tag generating unit 325 is transmitted to the drive control unit 340 via the position correcting unit 326 and the gradation processing unit 327. The position correcting unit 326 performs the same processes as the above-described processes, i.e., the process of enhancing the resolution of the image data from 1200 dpi to 2400 dpi and the process of correcting the position of the image data, on the tag information. Thereby, the position correcting unit 326 also enhances the resolution of the tag information from 1200 dpi to 2400 dpi, and assigns the tag information to each of the pixels subjected to the resolution enhancement.

The gradation processing unit 327 combines the 1-bit image data (i.e., image information) of the first resolution of 2400 dpi and the 1-bit tag information of the first resolution of 2400 dpi received from the position correcting unit 326 to form 2-bit image data of the first resolution of 2400 dpi having an upper bit representing the CMYK image information and a lower bit representing the tag information, for example, and transmits the 2-bit image data of the first resolution of 2400 dpi to the drive control unit 340. It is assumed here that the image data added with the tag information by the gradation processing unit 327 includes 2-bit information for each of the pixels, i.e., 1-bit tag information and 1-bit image information that indicates whether the corresponding pixel is a black pixel or a white pixel. When the number of gradations is reduced to two (i.e., 1 bit), a pixel having "1" as the pixel value of the image information is a black pixel, for which light is emitted from the light source 200 to the photoconductor drum 30. When the number of gradations is reduced to two (i.e., 1 bit), a pixel having "0" as the pixel value of the image information is a white pixel, for which no light is emitted from the light source 200 to the photoconductor drum 30.

Each of the functional units of the image processing unit 320 illustrated in FIG. 8 is implemented by a hardware circuit, such as an ASIC or a field-programmable gate array (FPGA), for example.

The attribute separating unit 321, the color converting unit 322, the black generating unit 323, the gamma correcting unit 324, the tag generating unit 325, the position correcting unit 326, and the gradation processing unit 327 of the image processing unit 320 are conceptual functions, and the image processing unit 320 is not limited to the above-described configuration. For example, two or more of the functional units of the image processing unit 320 illustrated as separate functional units in FIG. 8 may be configured as one functional unit. Further, the function of one of the functional units of the image processing unit 320 illustrated in FIG. 8 may be divided into a plurality of functions, and a plurality of functional units corresponding to the plurality of functions may be configured.

With reference to FIG. 9, a configuration of functional blocks of the drive control unit 340 according to the first embodiment will be described.

FIG. 9 is a diagram illustrating a configuration example of the functional blocks of the drive control unit 340 in the light source control device 110 according to the first embodiment. As illustrated in FIG. 9, the drive control unit 340 includes a modulated signal generating unit 350, a clock generating unit 360, and a light source drive unit 370 (i.e., a light source driver).

The modulated signal generating unit 350 generates the modulated pulse signal for driving the light source 200. Specifically, in the process of generating the modulated pulse signal, the modulated signal generating unit 350 divides the image data of the first resolution received from the image processing unit 320 (i.e., 2400-dpi, 2-bit data in FIG. 9) in the main scanning direction and the sub-scanning direction to enhance the first resolution to a second resolution to obtain higher-resolution image data (i.e., 4800-dpi, 1-bit data in FIG. 9). The modulated signal generating unit 350 further determines the writing start time for each of the C, M, Y, and K stations based on the signal output from a synchronization sensor. Then, in synchronization with the writing start time, the modulated signal generating unit 350 superimposes dot data of each of the light emitting units of the light source 200 onto a clock signal transmitted from the clock generating unit 360, and generates a separate modulated pulse signal for each of the light emitting units based on information received from the image processing unit 320, for example. A specific configuration of functional blocks of the modulated signal generating unit 350 will be described later with reference to FIGS. 10 and 11. As described above, in the process of enhancing the resolution of the image data, the modulated signal generating unit 350 removes the tag information from the image data of the first resolution, and generates the image data of the second resolution formed of pixels each having the pixel value of the image information. Alternatively, the tag information may be retained in the image data of the second resolution.

The clock generating unit 360 generates the clock signal indicating the time of emitting the light from the light source 200. The clock signal allows the image data to be modulated at the second resolution of 4800 dpi. It is assumed in the following that the second resolution is twice the first resolution, and that the first resolution and the second resolution are 2400 dpi and 4800 dpi, respectively.

The light source drive unit 370 outputs the drive signal for each of the light emitting units of the light source 200 in accordance with the modulated pulse signal generated by the modulated signal generating unit 350. The light source 200 emits the light by the amount according to the drive signal of the light source drive unit 370.

The drive control unit 340 illustrated in FIG. 9 and the light source control device 110 including the drive control unit 340 are configured to drive a specific one of the light sources 200. The drive control unit 340 and the light source control device 110, however, are not limited to this configuration. For example, a single drive control unit 340 and a single light source control device 110 including the drive control unit 340 may control the driving of the four light sources 200 (i.e., the light sources 200a, 200b, 200c, and 200d). In the following, it is assumed that the drive control unit 340 controls a specific one of the light sources 200.

Figure 11:
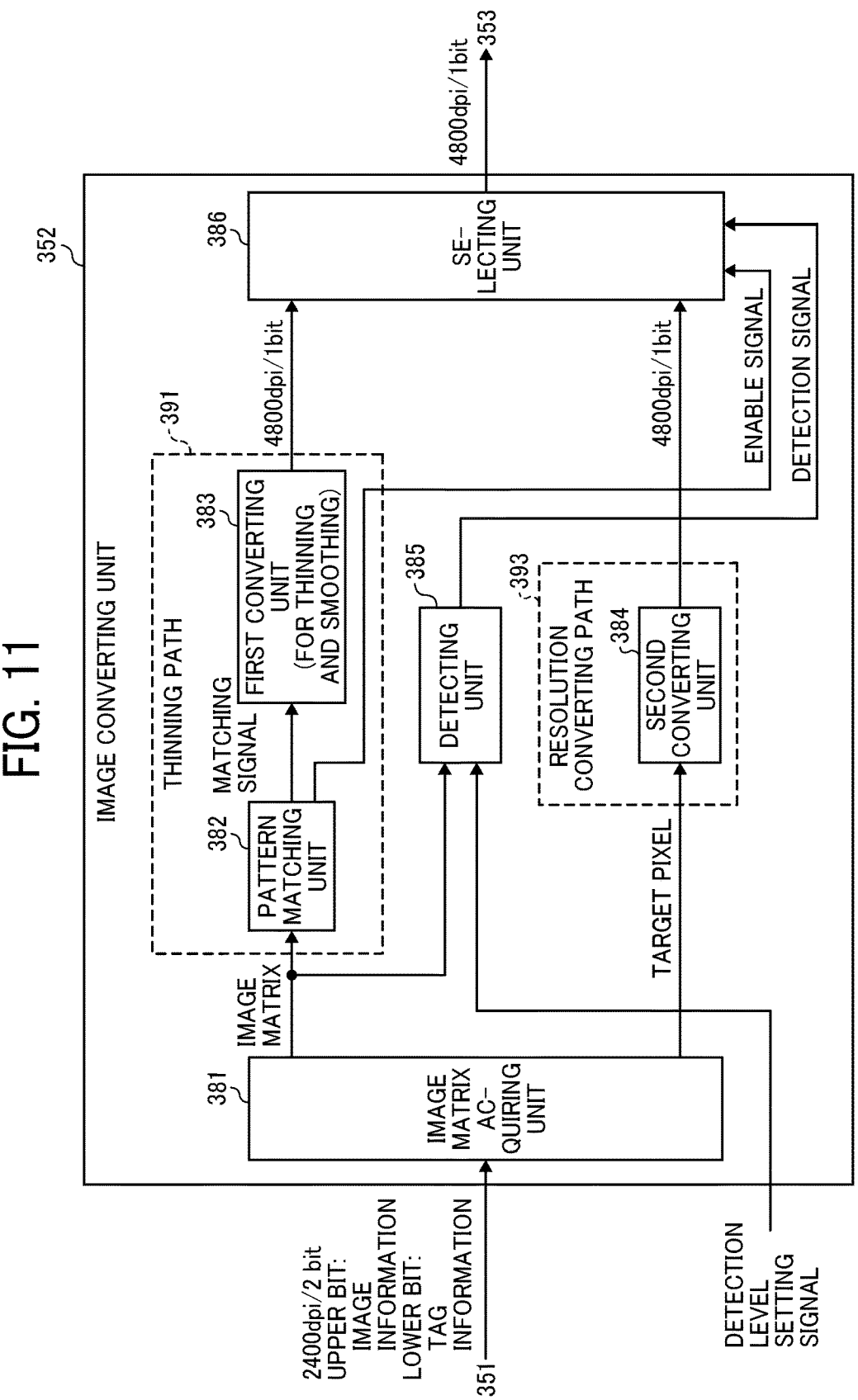
FIG. 11 is a diagram illustrating a configuration example of functional blocks of an image converting unit in the modulated signal generating unit according to the first embodiment in FIG. 10.

With reference to FIGS. 10 and 11, a description will be given of a configuration of functional blocks of the modulated signal generating unit 350 in the drive control unit 340 according to the first embodiment.

FIG. 10 is a diagram illustrating a configuration example of the functional blocks of the modulated signal generating unit 350 in the drive control unit 340 according to the first embodiment. FIG. 11 is a diagram illustrating a configuration example of functional blocks of an image converting unit in the modulated signal generating unit 350 according to the first embodiment.

As illustrated in FIG. 10, the modulated signal generating unit 350 of the drive control unit 340 includes a buffer memory 351, an image converting unit 352, and a gamma converting unit 353 (i.e., a pulse generator). The modulated signal generating unit 350 or the image converting unit 352, for example, corresponds to an image processing device according to an embodiment of the present invention.

The buffer memory 351 is a storage unit that stores the 2-bit image data (i.e., the data having the upper bit representing the image information and the lower bit representing the tag information) of the first resolution of 2400 dpi output from the image processing unit 320. In accordance with the reading by the subsequent image converting unit 352, the image data stored in the buffer memory 351 is transmitted to the image converting unit 352.

The image converting unit 352 performs the following processes. That is, the image converting unit 352 reads the image data of the first resolution from the buffer memory 351, and performs resolution enhancement (i.e., a resolution conversion process) on the image data of the first resolution to obtain the image data of the second resolution higher than the first resolution. Further, the image converting unit 352 sequentially selects target pixels from the image data of the first image data, and if any of the target pixels forms a stepped edge portion of a fine line, for example, the image converting unit 352 performs a thinning process on the target pixel. Herein, the edge portion is an end portion or an outline portion, for example, and the thinning process is image processing of thinning a black line image or image processing of thickening a white line image, for example. The image converting unit 352 transmits the image data of the second resolution subjected to the above-described image processing (i.e., 4800-dpi, 1-bit data in FIG. 10) to the gamma converting unit 353. Herein, the image data of the second resolution is 1-bit image data formed of pixels each having the pixel value of the image information. Further, the pixel forming a stepped edge portion is a pixel located near a stepped boundary portion between black pixels and white pixels. For example, when the boundary between black pixels and white pixels is stepped, the pixel forming a stepped edge portion is a pixel located within a predetermined range from the boundary.

The gamma converting unit 353 receives the image data of the second resolution from the image converting unit 352, modulates the image data of the second resolution onto the clock signal, and converts the image data of the second resolution to the level according to characteristics of the light source 200, to thereby generate the modulated pulse signal, which serves as an ON-OFF signal. Herein, the modulated pulse signal is a serial signal, the shift of which between a HIGH period and a LOW period corresponds to the shift between an ON state and an OFF state. The gamma converting unit 353 outputs the generated modulated pulse signal to the light source drive unit 370.

As illustrated in FIG. 11, the image converting unit 352 of the modulated signal generating unit 350 includes an image matrix acquiring unit 381, a pattern matching unit 382 (i.e., a first matching circuit), a first converting unit 383 (i.e., a first converting circuit), a second converting unit 384 (i.e., a second converting circuit) that serves as a resolution converting unit, a detecting unit 385 (i.e., a detecting circuit), and a selecting unit 386 (i.e., a selecting circuit). In these functional blocks, the pattern matching unit 382 and the first converting unit 383 form a thinning path 391 (i.e., a first thinning path) to perform predetermined image processing, and the second converting unit 384 forms a resolution converting path 393 to perform predetermined image processing.

Figure 13:
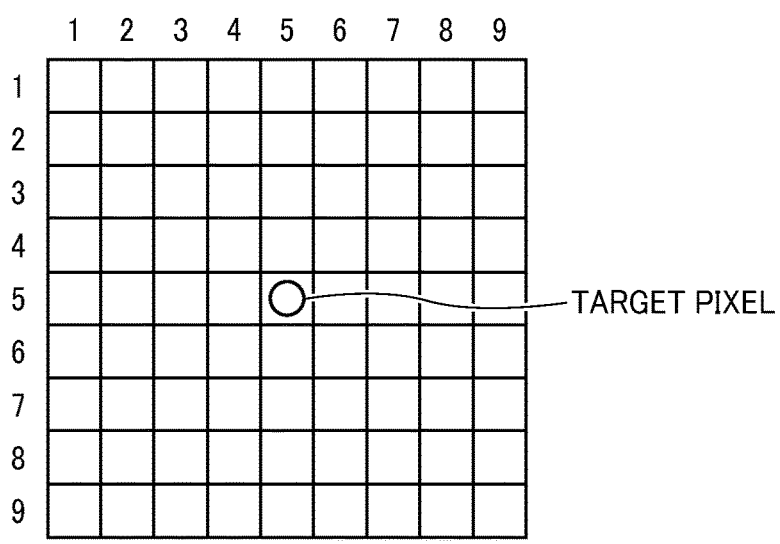
FIG. 13 is a diagram illustrating an example of an image matrix according to the first embodiment.

The image matrix acquiring unit 381 acquires an image matrix of each of the target pixels from the image data of the first resolution stored in the buffer memory 351. The image matrix is a partial image having a size of 9×9 pixels illustrated in FIG. 13, for example. The pixels forming the image matrix are 2-bit pixels each having a 1-bit pixel value of the image information and a 1-bit pixel value of the tag information. That is, the image matrix is a partial image of the first resolution in an area including the target pixel and peripheral pixels peripheral to the target pixel, such as the image of a rectangular area centering on the target pixel, as illustrated in FIG. 13, for example. The pixels forming the image matrix are 2-bit pixels each having the pixel value of the image information (i.e., a first pixel value) and the pixel value of the tag information (i.e., a second pixel value). The image matrix acquiring unit 381 transmits the acquired image matrix to the pattern matching unit 382, and transmits the target pixel of the image matrix to the second converting unit 384.

In the resolution converting path 393, the second converting unit 384 performs a resolution conversion process of converting the target pixel of the image matrix of the first resolution (i.e., 2400 dpi in the present example) received from the image matrix acquiring unit 381 into a pixel of the second resolution (i.e., 4800 dpi in the present example) higher than the first resolution having a 1-bit pixel value of the image information. The converted pixel of the second resolution is transmitted from the resolution converting path 393 to the selecting unit 386. The resolution conversion process will be described later with reference to FIGS. 12A and 12B.

In the thinning path 391, the pattern matching unit 382 determines whether or not the target pixel of the image matrix forms a stepped edge portion of a fine line, for example, based on the array and the pixel values of the pixels in the image matrix of the first resolution received from the image matrix acquiring unit 381. With the target pixels sequentially selected from the image data of the first resolution by the image matrix acquiring unit 381, therefore, the array of the pixels forming the acquired image matrix changes accordingly. The pattern matching unit 382 performs pattern matching between the acquired image matrix and each of a variety of first patterns stored in a buffer memory (e.g., first patterns A1 to Z1, AA1 to AZ1, BA1 to BZ1, and CA1 to CR1 illustrated in FIGS. 14A to 17D), to thereby determine whether or not the target pixel included in the image matrix forms a stepped edge portion of a fine line, for example. Herein, the size of the image matrix is determined based on the size of the first patterns used in the pattern matching. The pattern matching unit 382 further transmits the data of the target pixel of the image matrix subjected to the pattern matching and a matching signal to the first converting unit 383. The matching signal represents the determination result of the pattern matching, such as a failure of the image matrix to match any of the first patterns or the first pattern matching the image matrix if the image matrix matches any of the first patterns, for example. If it is determined in the pattern matching that the image matrix matches any of the first patterns, the pattern patching unit 382 outputs an enable signal to the selecting unit 386.

The buffer memory storing the above-described first patterns is included in a single one-chip integrated device implementing the drive control unit 340, for example, and is configured to allow an integrated circuit implementing the pattern matching unit 382 to refer to the data in the buffer memory. The pattern patching unit 382 may be configured not to transmit the matching signal to the first converting unit 383 if it is determined in the pattern matching that the image matrix fails to match any of the first patterns.

In the thinning path 391, the first converting unit 383 converts the target pixel in the image data of the first resolution (i.e., 2400-dpi, 2-bit in FIG. 11) into a specific first pixel pattern of the second resolution (i.e., 4800-dpi, 1-bit in FIG. 11) based on the matching signal received from the pattern matching unit 382. That is, the first converting unit 383 performs a resolution conversion process of enhancing the first resolution of the image data to obtain image data of the second resolution, and converts the target pixel into the first pixel pattern to perform a thinning processing of thin a black character or a black line and a smoothing process of smoothing steps. Specifically, if the matching signal indicates that the target pixel forms a stepped edge portion of a fine line, for example, the first converting unit 383 converts the target pixel in the image data of the first resolution into the first pixel pattern corresponding to the first pattern represented by the matching signal, to thereby perform the resolution enhancement, the thinning process, and the smoothing process. Each of the first patterns used in the pattern matching is thus associated with the first pixel pattern that replaces the target pixel, to thereby make the intensity of thinning and the intensity of smoothness adjustable. The first converting unit 383 transmits the first pixel pattern of the second resolution obtained by the conversion (i.e., output data from the thinning path 391 illustrated in FIG. 11) to the selecting unit 386.

The detecting unit 385 detects whether or not the target pixel of the image matrix received from the image matrix acquiring unit 381 is included in a fine line structure based on a detection level setting signal input from an external device, such as the CPU 400 illustrated in FIG. 7, for example. If the detecting unit 385 detects that the target pixel of the image matrix is included in the fine line structure, the detecting unit 385 outputs a detection signal to the selecting unit 386.

The selecting unit 386 selects the data to be output to the gamma converting unit 353 between the first pixel pattern of the second resolution output from the thinning path 391, i.e., output from the first converting unit 383, and the pixel of the second resolution output from the resolution converting path 393, i.e., output from the second converting unit 384.

Specifically, if the selecting unit 386 receives the input of the detection signal from the detecting unit 385, the selecting unit 386 determines that the fine line corresponding to the target pixel of the image matrix may be eliminated when printed on the recording sheet P, if the thinning process and the smoothing process are performed on the target pixel. Thus, the selecting unit 386 outputs the pixel of the second resolution subjected to the image processing of the resolution converting path 393, i.e., the resolution conversion process, but not to the thinning process and the smoothing process.

If the selecting unit 386 does not receive the input of the detection signal from the detecting unit 385 and receives the input of the enable signal from the pattern matching unit 382, the selecting unit 386 determines that the fine line corresponding to the target pixel of the image matrix would not be eliminated when printed on the recording sheet P, even if the thinning process and the smoothing process are performed on the target pixel. Thus, the selecting unit 386 outputs the first pixel pattern of the second resolution subjected to the image processing of the thinning path 391, which includes the thinning process and the smoothing process.

If the selecting unit 386 does not receive the input of the detection signal from the detecting unit 385 and the input of the enable signal from the pattern matching unit 382, the selecting unit 386 determines that the target pixel of the image matrix does not form a stepped edge portion. Thus, the selecting unit 386 outputs the pixel of the second resolution subjected to the image processing of resolution converting path 393, i.e., the resolution conversion process.

With reference to FIGS. 12A to 26B, the image processing by the image converting unit 352 of the modulated signal generating unit 350 in the drive control unit 340 according to the first embodiment will be described.

Figure 12A:
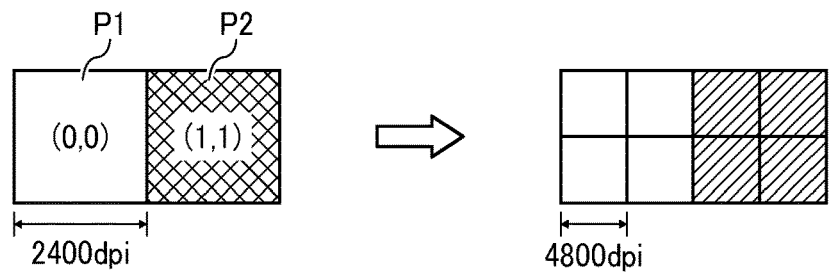
FIGS. 12A and 12B are diagrams illustrating a resolution conversion process performed by the image converting unit of the modulated signal generating unit according to the first embodiment.
Figure 12B:
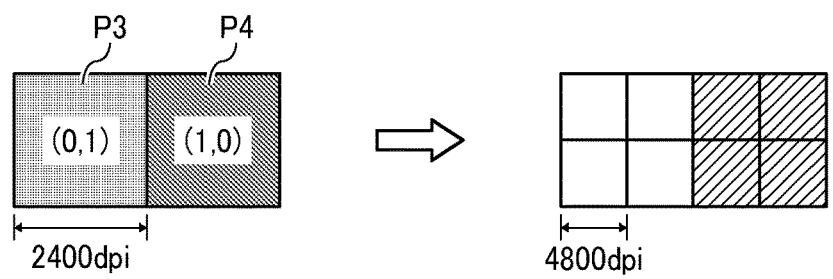

With reference to FIGS. 12A and 12B, a description will first be given of the resolution conversion process by the second converting unit 384 of the resolution converting path 393, which is included in the image processing by the image converting unit 352 of the modulated signal generating unit 350.

FIGS. 12A and 12B are diagrams illustrating the resolution conversion process by the image converting unit 352 of the modulated signal generating unit 350 according to the first embodiment.

In the resolution converting path 393, the second converting unit 384 performs the resolution conversion process of converting the target pixel in the image matrix of the first resolution of 2400 dpi received from the image matrix acquiring unit 381 into the pixel of the second resolution of 4800 dpi higher than the first resolution having the 1-bit pixel value of the image information, as described above.

Specifically, as illustrated in FIG. 12A, the second converting unit 384 divides a pixel P1 in the image data of the first resolution of 2400 dpi, in which the pixel value of the CMYK image information is "0" and the pixel value of the tag information is "0," into four pixels, i.e., two pixels in the longitudinal direction×two pixels in the lateral direction, to obtain the second resolution of 4800 dpi. The second converting unit 384 further removes the tag information from each of the four pixels to convert the pixels into pixels each only having the pixel value "0" of the image information.

Similarly, as illustrated in FIG. 12A, the second converting unit 384 divides a pixel P2 in the image data of the first resolution of 2400 dpi, in which the pixel value of the CMYK image information is "1" and the pixel value of the tag information is "1," into four pixels, i.e., two pixels in the longitudinal direction×two pixels in the lateral direction, to obtain the second resolution of 4800 dpi. The second converting unit 384 further removes the tag information from each of the four pixels to convert the pixels into pixels each only having the pixel value "1" of the image information.

Further, as illustrated in FIG. 12B, the second converting unit 384 divides a pixel P3 in the image data of the first resolution of 2400 dpi, in which the pixel value of the CMYK image information is "0" and the pixel value of the tag information is "1," into four pixels, i.e., two pixels in the longitudinal direction×two pixels in the lateral direction, to obtain the second resolution of 4800 dpi. The second converting unit 384 further removes the tag information from each of the four pixels to convert the pixels into pixels each only having the pixel value "0" of the image information.

Similarly, as illustrated in FIG. 12B, the second converting unit 384 divides a pixel P4 in the image data of the first resolution of 2400 dpi, in which the pixel value of the CMYK image information is "1" and the pixel value of the tag information is "0," into four pixels, i.e., two pixels in the longitudinal direction×two pixels in the lateral direction, to obtain the second resolution of 4800 dpi. The second converting unit 384 further removes the tag information from each of the four pixels to convert the pixels into pixels each only having the pixel value "1" of the image information.

The thinning process and the smoothing process will now be described.

With reference to FIGS. 13 to 19B, a description will be given of the image processing by the image converting unit 352 of the modulated signal generating unit 350, focusing on the image processing performed in the thinning path 391.

Figure 18A:
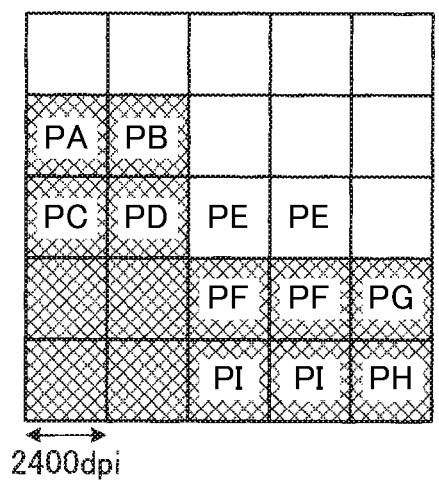
FIGS. 18A to 18C are diagrams illustrating a specific example of image processing performed in a thinning path according to the first embodiment.
Figure 18B:
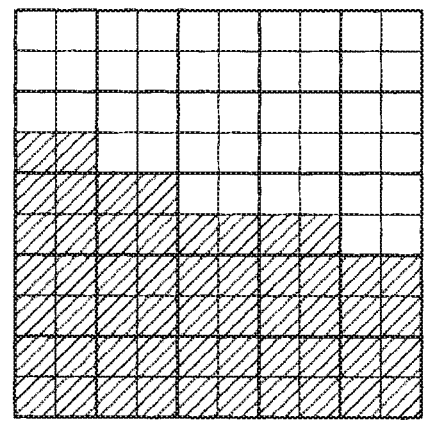
Figure 18C:
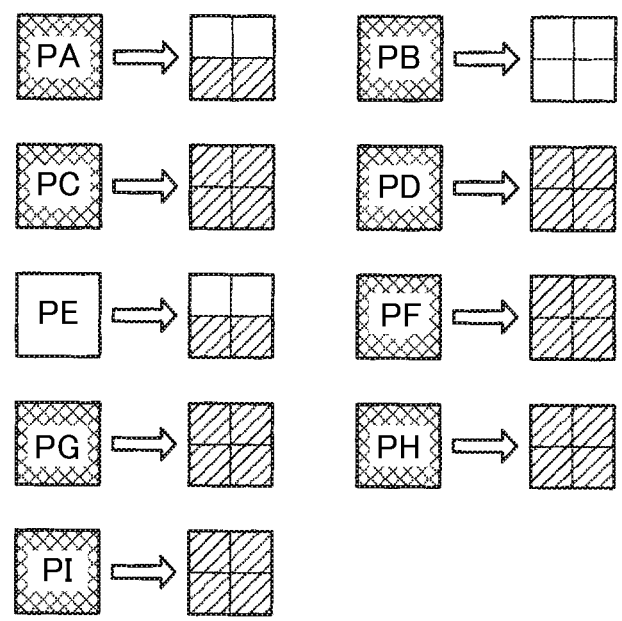

FIG. 13 is a diagram illustrating an example of the image matrix according to the first embodiment. FIGS. 14A to 17D are diagrams illustrating an example of the first patterns used in the pattern matching process according to the first embodiment. FIGS. 18A to 18C are diagrams illustrating a specific example of the image processing performed in the thinning path 391 according to the first embodiment. FIGS. 19A and 19B are diagrams illustrating an example of the image processing by the image converting unit 352 according to the first embodiment.

As described above, the pattern matching unit 382 of the thinning path 391 determines whether or not the target pixel of the image matrix forms a stepped edge portion based on the array and the pixel values of the pixels in the image matrix of the first resolution received from the image matrix acquiring unit 381 (e.g., the partial image having the size of 9×9 pixels illustrated in FIG. 13). Specifically, the pattern matching unit 382 performs pattern matching between the acquired image matrix and each of the variety of first patterns stored in the buffer memory (e.g., the first patterns A1 to Z1, AA1 to AZ1, BA1 to BZ1, and CA1 to CR1 illustrated in FIGS. 14A to 17D) to determine whether or not the target pixel included in the image matrix forms a stepped edge portion.

In the first patterns A1 to Z1, AA1 to AZ1, BA1 to BZ1, and CA1 to CR1 illustrated in FIGS. 14A to 17D, a cell with "x" represents a pixel with a pixel value left out of consideration. Further, a hatched cell represents a black pixel forming a character or a line, and a white cell represents a white pixel forming an object other than the character and the line.

Each of the pixels in the first patterns stored in the buffer memory has the pixel value "0" or "1" of the image information and the pixel value "0" or "1" of the tag information. The pattern matching unit 382 therefore performs the pattern matching between the image matrix and each of the first patterns on both the pixel value of the image information and the pixel value of the tag information. In the pattern matching, therefore, the pattern matching unit 382 determines the match between the image matrix and a first pattern if each of pixels of the first pattern having "0" or "1" as the pixel value of the image information matches the corresponding pixel of the image matrix on both the pixel value of the image information and the pixel value of the tag information. The pattern matching unit 382 further transmits the matching signal and the data of the target pixel subjected to the pattern matching to the first converting unit 383. The matching signal represents the determination result of the pattern matching, such as a failure of the image matrix to match any of the first patterns or the first pattern matching the image matrix if the image matrix matches any of the first patterns, for example.

As described above, based on the matching signal received from the pattern matching unit 382, the first converting unit 383 of the thinning path 391 converts the target pixel in the image data of the first resolution (i.e., 2400-dpi, 2-bit in the present example) into the specific first pixel pattern of the second resolution (i.e., 4800-dpi, 1-bit in the present example), such as one of first pixel patterns illustrated in FIG. 18C, for example. That is, the first converting unit 383 performs the resolution conversion process of enhancing the first resolution of the image data to obtain the image data of the second resolution, and converts the target pixel into the first pixel pattern to perform the thinning processing of thinning a black character or a black line and the smoothing process of smoothing steps. Specifically, if the matching signal indicates that the target pixel forms a stepped edge portion of a fine line, for example, the first converting unit 383 converts the target pixel in the image data of the first resolution into the first pixel pattern corresponding to the first pattern represented by the matching signal, to thereby perform the resolution enhancement, the thinning process, and the smoothing process.

For example, FIG. 18A illustrates a partial image of the first resolution, with an upper side of the partial image forming a stepped edge portion. It is assumed here that each of image matrices of pixels PA to PI matches a specific first pattern in the pattern matching. For example, the image matrix of the pixel PA matches the first pattern AX1 in FIG. 16A, and the image matrix of the pixel PG matches the first pattern CD1 in FIG. 17A. The first converting unit 383 replaces each of the pixels PA to PI having matched the specific first pattern with the first pixel pattern in FIG. 18C corresponding to the specific first pattern having matched the pixel, to thereby obtain the image data of the second resolution illustrated in FIG. 18B. In FIG. 18A, each of the remaining pixels other than the pixels PA to PI fails to match the specific first pattern, and the matching signal corresponding to the remaining pixel indicates that the remaining pixel does not form a stepped edge portion. Thus, the remaining pixel is subjected to the resolution conversion process by the second converting unit 384 of the resolution converting path 393. Thereby, the resolution of the remaining pixel is enhanced to the second resolution.

FIGS. 19A and 19B illustrate an example in which the thinning process and the smoothing process are performed on an edge portion at the second resolution. Image data 1000 illustrated in FIG. 19A corresponds to a partial image of the first resolution, with an upper side of the partial image forming a stepped edge portion. Each of pixels forming the stepped edge portion is replaced by the first pixel pattern corresponding to the first pattern matching the pixel, to thereby generate image data 1001 of the second resolution, as illustrated in FIG. 19B. FIGS. 19A and 19B illustrate an example of image data, the upper side of which forms a stepped edge portion. It is, however, possible to adjust the intensity of the thinning process and the intensity of the smoothing process both in the vertical direction and the horizontal direction by associating each of the first patterns used in the pattern matching with the first pixel pattern that replaces the target pixel.

With reference to FIGS. 20A to 21C, the detection process by the detecting unit 385 of the image converting unit 352 will be described.

FIGS. 20A to 20C are diagrams illustrating examples of setting a detection level in the lateral direction of a fine line. FIGS. 21A to 21C are diagrams illustrating examples of setting a detection level in the longitudinal direction of a fine line. FIGS. 20A to 21C illustrate pixels of the first resolution of 2400 dpi, in which each of black pixels indicated by hatching has the tag information indicating that the pixel forms a character or a line.

The detecting unit 385 detects whether or not the target pixel of the image matrix received from the image matrix acquiring unit 381 is included in the fine line structure based on the detection level setting signal input from the external device (e.g., the CPU 400 in FIG. 7). If the detecting unit 385 detects that the target pixel of the image matrix is included in the fine line structure, the detecting unit 385 outputs the detection signal to the selecting unit 386. The detection level setting signal sets the threshold of the width of the fine line structure for detecting whether or not the target pixel is included in the fine line structure. For example, it is assumed here that two pixels, three pixels, and four pixels of the resolution of 2400 dpi are assigned to a threshold "0," a threshold "1," and a threshold "2," respectively. The threshold may be set separately for each of the lateral direction and the longitudinal direction.

The threshold may be set at the design stage. The threshold may also be input by a user, for example, as desired. For instance, if information of the threshold is input by the user with a control panel, for example, the printer control device 90 may generate the detection level setting signal based on the value of the input information of the threshold. The generated detection level setting signal is input to the image converting unit 352, as illustrated in FIG. 11.

If the detection level setting signal indicates the threshold "0," and if the detecting unit 385 detects that the target pixel is included in each of the width of two pixels in FIG. 20A, the width of three pixels in FIG. 20B, and the width of four pixels in FIG. 20C, the detecting unit 385 determines that the target pixel is not included in the fine line structure, and does not output the detection signal.

If the detection level setting signal indicates the threshold "1," and if the detecting unit 385 detects that the target pixel is included in the width of two pixels in FIG. 20A (the target pixel corresponds to pixel 13 in this example), the detecting unit 385 determines that the target pixel is included in the fine line structure, and outputs the detection signal. If the detection level setting signal indicates the threshold "1," and if the detecting unit 385 detects that the target pixel is included in the width of three pixels in FIG. 20B or the width of four pixels in FIG. 20C (the target pixel corresponds to pixel 14, 15, or 16 in this example), the detecting unit 385 determines that the target pixel is not included in the fine line structure, and does not output the detection signal.

If the detection level setting signal indicates the threshold "2," and if the detecting unit 385 detects that the target pixel is included in the width of two pixels in FIG. 20A or the width of three pixels in FIG. 20B (the target pixel corresponds to pixel 13, 14, or 16 in this example), the detecting unit 385 determines that the target pixel is included in the fine line structure, and outputs the detection signal. If the detection level setting signal indicates the threshold "2," and if the detecting unit 385 detects that the target pixel is included in the width of four pixels in FIG. 20C (the target pixel corresponds to pixel 15 or 16 in this example), the detecting unit 385 determines that the target pixel is not included in the fine line structure, and does not output the detection signal.

The above description has been given of the detection process by the detecting unit 385 to detect whether or not the target pixel is included in the fine line structure in the lateral direction, as illustrated in FIGS. 20A to 20C. The detection process by the detecting unit 385 to detect whether or not the target pixel is included in the fine line structure in the longitudinal direction is performed in a similar manner, as illustrated in FIGS. 21A to 21C.

The setting of the detection level and the thinning process will now be described.

With reference to FIGS. 22A to 25, a description will be given of the relationship between the thinning process and the threshold of the width of the fine line structure indicated by the detection level setting signal input to the detecting unit 385 from the external device.

Figure 22A:
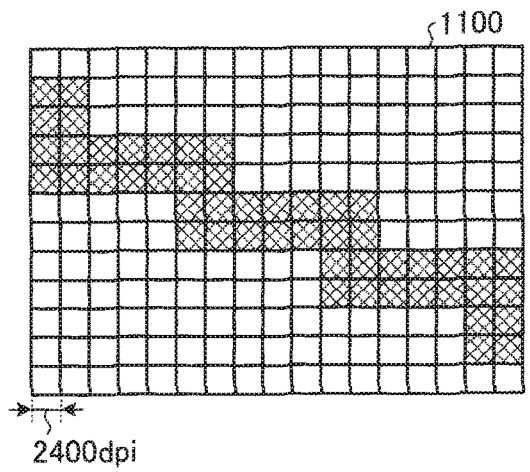
FIGS. 22A and 22B are diagrams illustrating an operation example in which a fine line is eliminated by a thinning process.
Figure 22B:
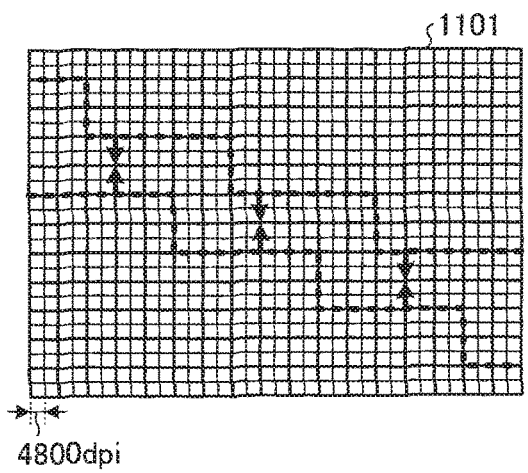
Figure 23A:
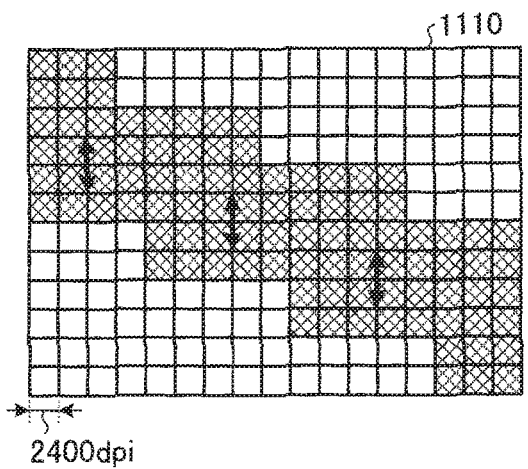
FIGS. 23A and 23B are diagrams illustrating an example of image processing performed when an image is not detected as a fine line.
Figure 23B:
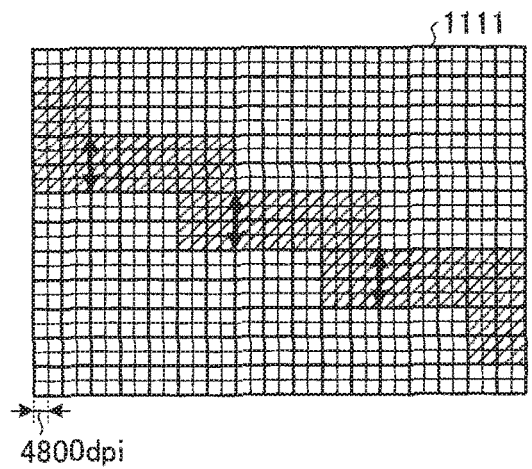
Figure 24A:
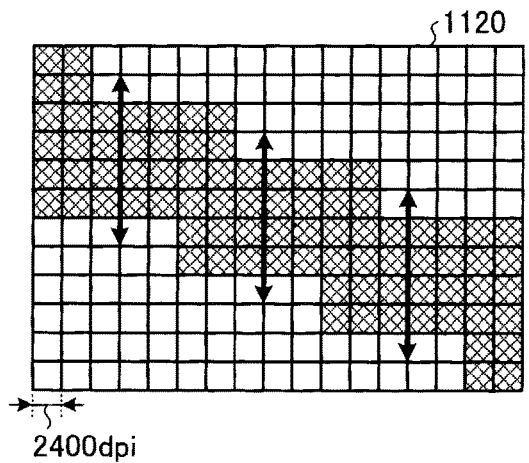
FIGS. 24A and 24B are diagrams illustrating an example of image processing performed when an image is detected as a fine line.
Figure 24B:
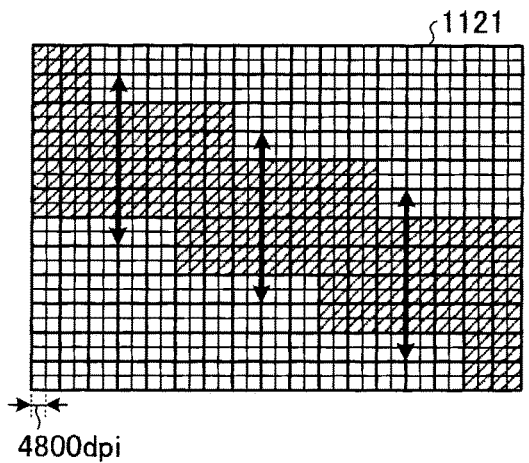
Figure 25:
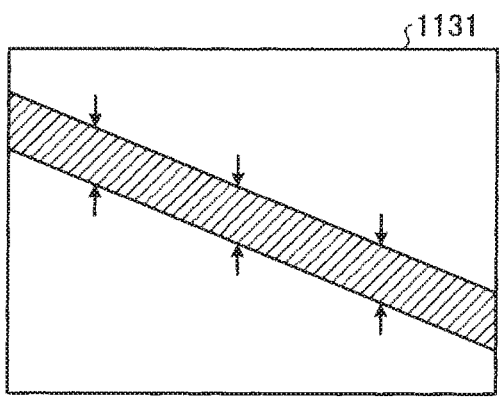
FIG. 25 is a diagram illustrating an example of a fine line printed on a recording sheet.

FIGS. 22A and 22B are diagrams illustrating an operation example in which a fine line is eliminated by the thinning process. FIGS. 23A and 23B are diagrams illustrating an example of image processing performed when an image is not detected as a fine line. FIGS. 24A and 24B are diagrams illustrating an example of image processing performed when an image is detected as a fine line. FIG. 25 is a diagram illustrating an example of a fine line printed on the recording sheet P.

As described above, if the pattern matching unit 382 determines that the target pixel in the image matrix of the first resolution forms a stepped edge portion, the first converting unit 383 performs the resolution conversion process of enhancing the first resolution of the image data to obtain the image data of the second resolution, and converts the target pixel into the first pixel pattern to perform the thinning process of thinning a black character or a black line and the smoothing process of smoothing steps. In this case, if image data 1100 of the first resolution illustrated in FIG. 22A includes a fine line, and if the first converting unit 383 performs the thinning process and the smoothing process, the fine line may be eliminated in image data 1101 of the second resolution illustrated in FIG. 22B. For simplicity of explanation, it is assumed in FIGS. 22A to 25 that the image data is subjected to the thinning process but not to the smoothing process. The pattern matching unit 382 in this case determines that the target pixel in the image data 1100 forms a stepped edge portion. Thus, the first converting unit 383 performs the image processing, and the enable signal is output to the selecting unit 386. It is, however, undesirable that the light source drive unit 370 control the light emission of the light source 200 based on the image data 1101, in which the fine line eliminated.

In the present embodiment, therefore, the detecting unit 385 detects whether or not the target pixel of the image matrix is included in the fine line structure based on the threshold indicated by the detection level setting signal. For example, in image data 1110 of the first resolution illustrated in FIG. 23A, the line width indicated by double-headed arrows corresponds to the threshold indicated by the detection level setting signal. If the width of the line in the image data 1110 is less than the threshold, the detecting unit 385 detects that the target pixel is included in the fine line structure, and the detecting unit 385 outputs the detection signal to the selecting unit 386. In the image data 1110 of FIG. 23A, the line formed of black pixels indicated by hatching has a width exceeding the threshold. Therefore, the line subjected to the thinning process remains with a reduced width, as illustrated in image data 1111 in FIG. 23B.

In image data 1120 of the first resolution in FIG. 24A, on the other hand, a line formed of black pixels indicated by hatching has a width less than the threshold indicated by double-headed arrows. Thus, the detecting unit 385 determines that the line may be eliminated by the thinning process of the first converting unit 383, and the detecting unit 385 outputs the detection signal to the selecting unit 386. The selecting unit 386 receives the input of the detection signal from the detecting unit 385, and outputs image data 1121 of the second resolution illustrated in FIG. 24B, which has been subjected to the resolution conversion process by the second converting unit 384 but not to the thinning process, to a subsequent unit.

As described above, the detecting unit 385 detects whether or not the target pixel of the image matrix is included in the fine line structure. Then, based on the detection signal from the detecting unit 385, the selecting unit 386 switches the image data to be output between the image data subjected to the resolution conversion process performed in the resolution converting path 393 and the image data subjected to the thinning process and the smoothing process performed in the thinning path 391.

Specifically, the selecting unit 386 performs the following operations, for example. If the selecting unit 386 receives the input of the detection signal from the detecting unit 385, the selecting unit 386 determines that the fine line corresponding to the target pixel of the image matrix may be eliminated when printed on the recording sheet P, if the thinning process and the smoothing process are performed on the target pixel. Thus, the selecting unit 386 outputs the pixel of the second resolution subjected to the image processing of the resolution converting path 393, i.e., the resolution conversion process, but not to the thinning process and the smoothing process.

If the selecting unit 386 does not receive the input of the detection signal from the detecting unit 385 and receives the input of the enable signal from the pattern patching unit 382, the selecting unit 386 determines that the fine line corresponding to the target pixel of the image matrix would not be eliminated when printed on the recording sheet P, even if the thinning process and the smoothing process are performed on the target pixel. Thus, the selecting unit 386 outputs the first pixel pattern of the second resolution subjected to the image processing of the thinning path 391, which includes the thinning process and the smoothing process.

If the selecting unit 386 does not receive the input of the detection signal from the detecting unit 385 and the input of the enable signal from the pattern patching unit 382, the selecting unit 386 determines that the target pixel of the image matrix does not form a stepped edge portion. Thus, the selecting unit 386 outputs the pixel of the second resolution subjected to the image processing of the resolution converting path 393, i.e., the resolution conversion process.

With the above-described operations, the line printed on the recording sheet P based on output image data subjected to the image processing by the image converting unit 352 is thinned and smoothed, as in an image 1131 illustrated in FIG. 25. That is, the reproducibility of fine line is improved. Consequently, the possibility of elimination of the fine line due to the thinning process is reduced. Even if the fine line exists in the image data, as illustrated in FIG. 23B or 24B, however, the fine line may be eliminated when printed on the recording sheet P based on the image data, depending on other factors such as physical features of the image forming apparatus 1. It is therefore desirable to set the threshold indicated by the detection level setting signal to an appropriate level to prevent the fine line from being eliminated when printed on the recording sheet P. For example, if the intensity of the thinning process is increased, the threshold indicated by the detection level setting signal may also be increased to detect whether or not the target pixel is included in the fine line structure based on the increased threshold, to thereby prevent the elimination of the fine line.

Figures 26A, 26B:
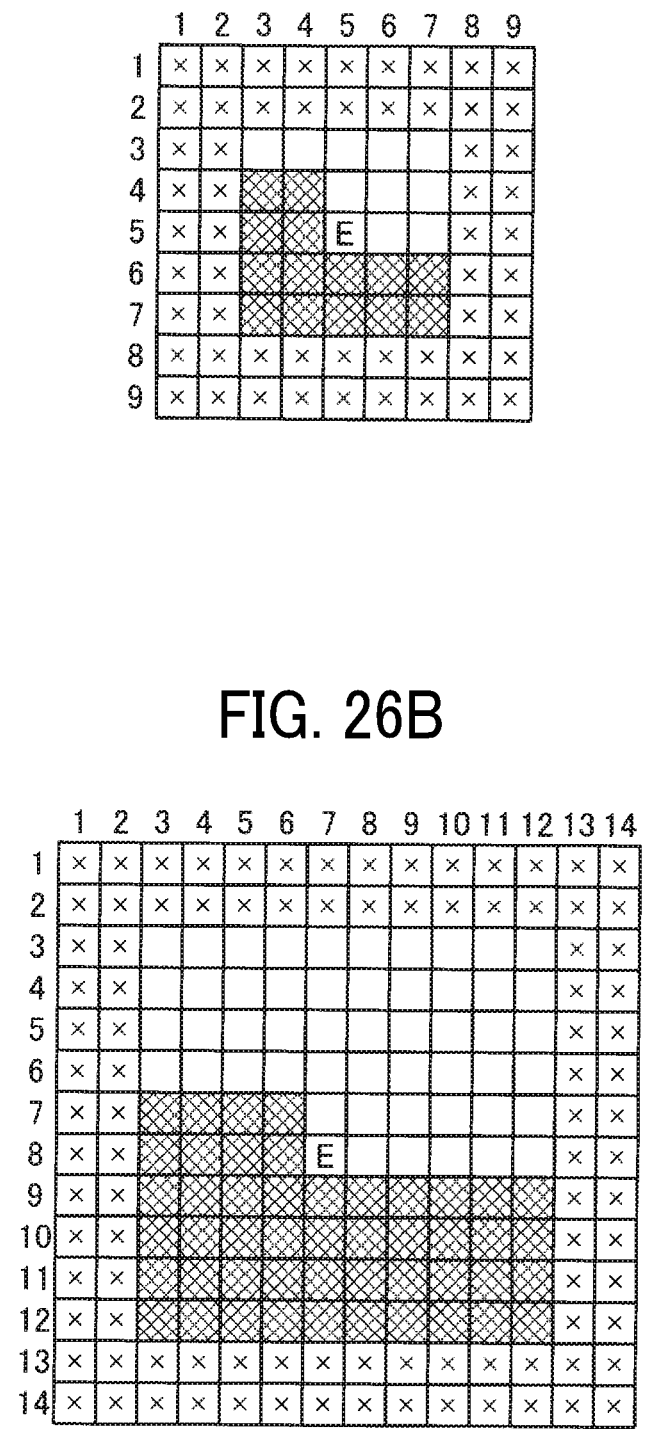

FIGS. 26A and 26B are diagrams illustrating that the first patterns used in the pattern matching process in the first embodiment are reducible in size. In the present embodiment, the pattern matching process is performed on the image matrix to perform not only the resolution conversion process but also the thinning process and the smoothing process on the target pixel of the image matrix matching the first pattern. If the size of the image matrix is increased, as illustrated in FIG. 26B, i.e., if the size of each of the first patterns used in the pattern matching process is increased, it is possible to not only determine whether or not the target pixel forms a stepped edge portion, but also determine whether or not the target pixel is included in the fine line structure. Such an increase in the size of the first patterns, however, increases the load of image processing and the size of an image processing circuit. The present embodiment therefore uses the detecting unit 385 to detect whether or not the target pixel of the image matrix is included in the fine line structure based on the detection level setting signal input from the external device. Thus, it suffices if the images used in the pattern matching process have a sufficient size allowing the pattern matching unit 382 to determine whether or not the target pixel is included in a stepped edge portion. Accordingly, it is possible to reduce the size of the first patterns to be smaller than the size of the pattern of FIG. 26B, as in the pattern illustrated in FIG. 26A. Consequently, the load of image processing is reduced, and the increase in size of the image processing circuit is prevented.

A second embodiment of the present invention will now be described. The following description will be given of the image forming apparatus 1 according to the second embodiment, focusing on differences thereof from the image forming apparatus 1 according to the first embodiment. The general arrangement of the image forming apparatus 1 and the configuration of the optical scanning device 10 according to the second embodiment are similar to those described above in the first embodiment.

The foregoing description of the first embodiment has been given of the image processing by the image converting unit 352, which includes the image processing performed in two paths, i.e., the image processing of the resolution converting path 393 and the image processing of the thinning path 391 including the thinning process and the smoothing process.

The following description of the second embodiment will be given of a configuration including a resolution converting path, a first thinning path for performing the thinning process and the smoothing process, and a second thinning path for performing the thinning process but not performing the smoothing process.

Figure 27:
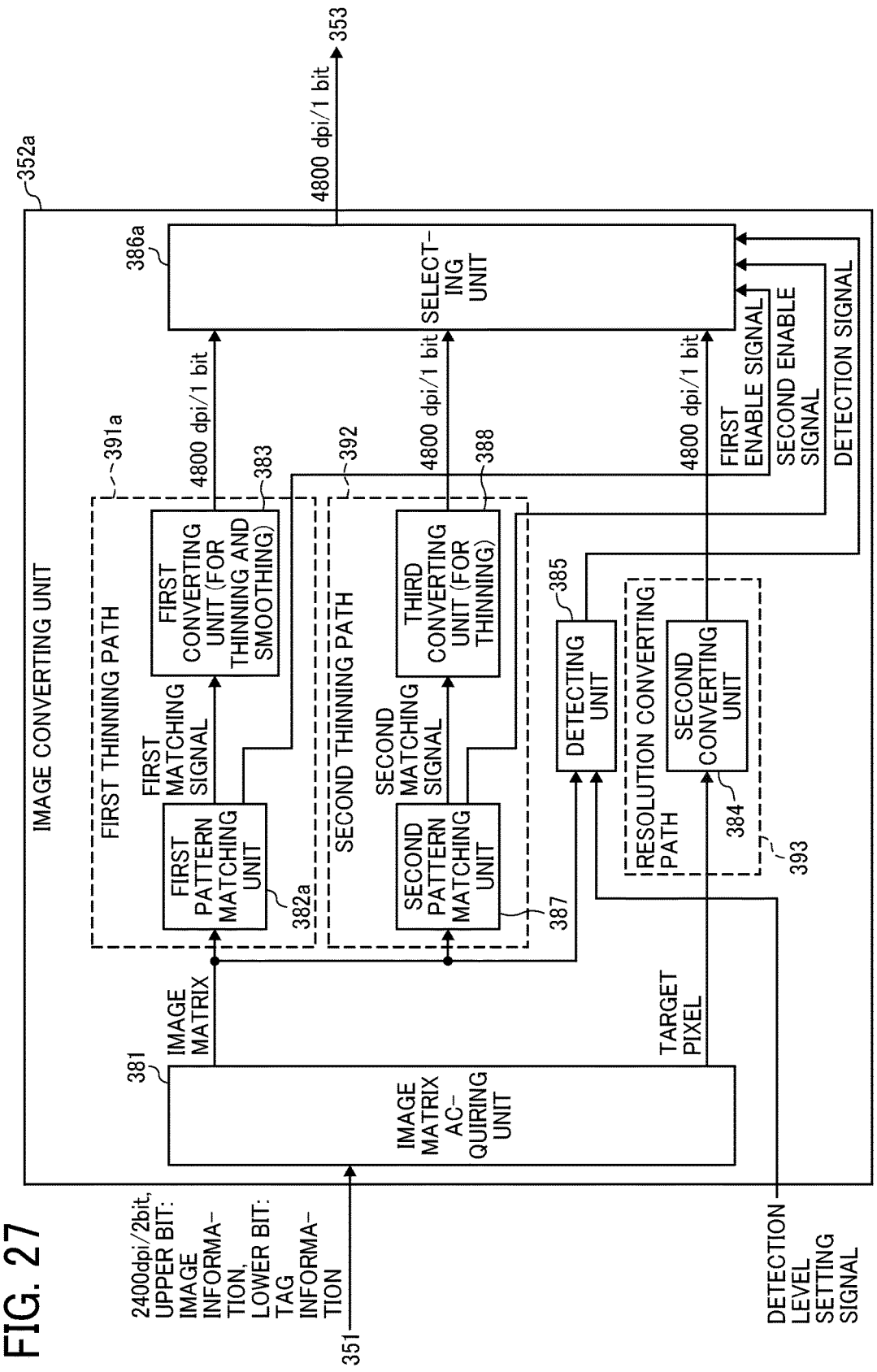
FIG. 27 is a diagram illustrating a configuration example of functional blocks of an image converting unit in the modulated signal generating unit according to a second embodiment of the present invention.

With reference to FIG. 27, a description will be given of a configuration of functional blocks of an image converting unit 352a of the modulated signal generating unit 350 according to the second embodiment.

FIG. 27 is a diagram illustrating a configuration example of the functional blocks of the image converting unit 352a in the modulated signal generating unit 350 according to the second embodiment. As illustrated in FIG. 27, the image converting unit 352a includes the image matrix acquiring unit 381, a first pattern matching unit 382a (i.e., the first matching circuit), the first converting unit 383 (i.e., the first converting circuit), the second converting unit 384 (i.e., the second converting circuit), the detecting unit 385 (i.e., the detecting circuit), a selecting unit 386a (i.e., the selecting circuit), a second pattern matching unit 387 (i.e., a second matching circuit), and a third converting unit 388 (i.e., a third converting circuit). In these functional blocks, the first pattern matching unit 382a and the first converting unit 383 form a first thinning path 391a to perform predetermined image processing. The second pattern matching unit 387 and the third converting unit 388 form a second thinning path 392 to perform predetermined image processing. The second converting unit 384 forms the resolution converting path 393 to perform predetermined image processing. The image matrix acquiring unit 381, the first pattern matching unit 382a, the first converting unit 383, the second converting unit 384, and the detecting unit 385 of the second embodiment are respectively similar in function to the image matrix acquiring unit 381, the pattern matching unit 382, the first converting unit 383, the second converting unit 384, and the detecting unit 385 of the first embodiment. That is, the image processing function of the first thinning path 391a of the second embodiment is similar to that of the thinning path 391 of the first embodiment, and the image processing function of the resolution converting path 393 of the second embodiment is similar to that of the resolution converting path 393 of the first embodiment. In the second embodiment, the first pattern matching unit 382a outputs a first matching signal and a first enable signal, and the second pattern matching unit 387 outputs a second matching signal and a second enable signal.

In the second thinning path 392, the second pattern matching unit 387 determines whether or not the target pixel of the image matrix forms an edge portion of a fine line, for example, based on the array and the pixel values of the pixels in the image matrix of the first resolution received from the image matrix acquiring unit 381. Herein, the edge portion is an end portion or an outline portion, for example. Specifically, the second pattern matching unit 387 performs pattern matching between the acquired image matrix and each of a variety of second patterns stored in a buffer memory (e.g., second patterns A2 to Z2 and AA2 to AJ2 illustrated in FIGS. 29A to 31B and second patterns BA2 to BX2 illustrated in FIGS. 38A to 39B), to thereby determine whether or not the target pixel included in the image matrix forms an edge portion of a fine line, for example.

Herein, the size of the image matrix is determined based on the size of the second patterns used in the pattern matching. The second pattern matching unit 387 further transmits the data of the target pixel of the image matrix subjected to the pattern matching and the second matching signal to the third converting unit 388. The second matching signal represents the determination result of the pattern matching, such as a failure of the image matrix to match any of the second patterns or the second pattern matching the image matrix if the image matrix matches any of the second patterns, for example. If it is determined in the pattern matching that the image matrix matches any of the second patterns, the second pattern patching unit 387 outputs the second enable signal to the selecting unit 386a.

The buffer memory storing the above-described second patterns is included in a single one-chip integrated device implementing the drive control unit 340, for example, and is configured to allow an integrated circuit implementing the second pattern matching unit 387 to refer to the data in the buffer memory. The second pattern patching unit 387 may be configured not to output the second matching signal to the third converting unit 388 if it is determined in the pattern matching that the image matrix fails to match any of the second patterns.

In the second thinning path 392, the third converting unit 388 converts the target pixel in the image data of the first resolution (i.e., 2400-dpi, 2-bit in FIG. 27) into a specific second pixel pattern of the second resolution (i.e., 4800-dpi, 1-bit in FIG. 27) based on the second matching signal received from the second pattern matching unit 387. That is, the third converting unit 388 performs the resolution conversion process of enhancing the first resolution of the image data to obtain image data of the second resolution, and converts the target pixel into the second pixel pattern to perform the thinning processing of thinning a black character or a black line. Specifically, if the second matching signal indicates that the target pixel forms an edge portion of a fine line, for example, the third converting unit 388 converts the target pixel in the image data of the first resolution into the second pixel pattern corresponding to the second pattern represented by the second matching signal, to thereby perform the resolution enhancement and the thinning process. Each of the second patterns used in the pattern matching is thus associated with the second pixel pattern that replaces the target pixel, to thereby make the intensity of thinning adjustable. The third converting unit 388 transmits the second pixel pattern of the second resolution obtained by the conversion (i.e., output data from the second thinning path 392 illustrated in FIG. 27) to the selecting unit 386a.

The selecting unit 386a selects the data to be output to the gamma converting unit 353 from the first pixel pattern of the second resolution output from the first thinning path 391a, i.e., output from the first converting unit 383, the second pixel pattern of the second resolution output from the second thinning path 392, i.e., output from the third converting unit 388, and the pixel of the second resolution output from the resolution converting path 393, i.e., output from the second converting unit 384. Specifically, the selecting unit 386a selects the path that outputs the data to the gamma converting unit 353 based on the combination of the detection signal, the first enable signal, and the second enable signal illustrated in TABLE 1 given below. In TABLE 1, "-" indicates both a case in which there is an input of the enable signal and a case in which there is no input of the enable signal.

TABLE 1

| detection signal | first enable signal | second enable signal | path to be selected |
|---|---|---|---|
| 1 | — | — | resolution converting path |
| 0 | 1 | — | first thinning path (thinning and smoothing) |
| 0 | 0 | 1 | second thinning path (thinning) |
| 0 | 0 | 0 | resolution converting path |

As illustrated in TABLE 1, if the selecting unit 386a receives the input of the detection signal from the detecting unit 385, the selecting unit 386a outputs the pixel of the second resolution subjected to the image processing of the resolution converting path 393, i.e., the resolution conversion process, irrespective of the value of the first enable signal and the value of the second enable signal. This is because the fine line corresponding to the target pixel of the image matrix may be eliminated when printed on the recording sheet P, if the thinning process and the smoothing process are performed on the target pixel.

If the selecting unit 386a does not receive the input of the detection signal from the detecting unit 385 and receives the input of the first enable signal from the first pattern matching unit 382a, the selecting unit 386a outputs the first pixel pattern of the second resolution subjected to the image processing of the first thinning path 391a, which includes the thinning process and the smoothing process, irrespective of the value of second enable signal. That is, the selecting unit 386a determines that the fine line corresponding to the target pixel of the image matrix would not be eliminated when printed on the recording sheet P, even if the thinning process and the smoothing process are performed on the target pixel.

If the selecting unit 386a does not receive the input of the detection signal from the detecting unit 385 and the input of the first enable signal from the first pattern matching unit 382a and receives the input of the second enable signal from the second pattern matching unit 387, the selecting unit 386a outputs the second pixel pattern of the second resolution subjected to the thinning processing of the second thinning path 392. That is, the selecting unit 386a determines that the target pixel is not included in a step portion, and that the fine line corresponding to the target pixel of the image matrix would not be eliminated when printed on the recording sheet P, even if the thinning process is performed on the target pixel.

If the selecting unit 386a does not receive the input of the detection signal from the detecting unit 385, the input of the first enable signal from the first pattern matching unit 382a, and the input of the second enable signal from the second pattern matching unit 387, the selecting unit 386a outputs the pixel of the second resolution subjected to the image processing of the resolution converting path 393, i.e., the resolution conversion process. That is, the selecting unit 386a determines that the target pixel of the image matrix does not form a stepped edge portion or an edge portion.

The image processing by the image converting unit 352a of the modulated signal generating unit 350 according to the second embodiment will be described with reference to FIGS. 28 to 41B. The following description will focus on the image processing of the second thinning path 392 in the image processing by the image converting unit 352a, on the assumption that the first resolution and the second resolution are 2400 dpi and 4800 dpi, respectively, in FIGS. 28 to 41B.

With reference to FIGS. 28 to 36B, a description will be given of the thinning process included in the image processing of the second thinning path 392 in the image processing by the image converting unit 352a of the modulated signal generating unit 350.

Figure 28:
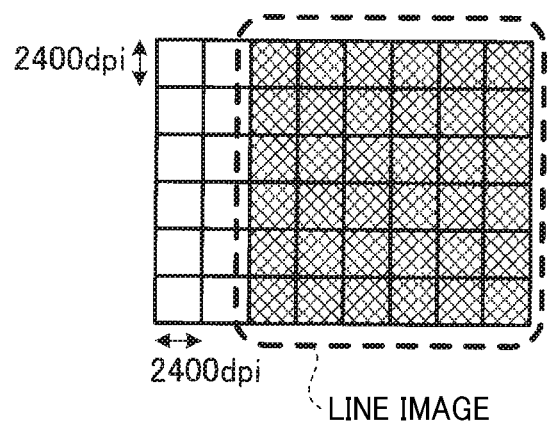
FIG. 28 is a diagram illustrating an example of a line image formed of black pixels.
Figure 29B:
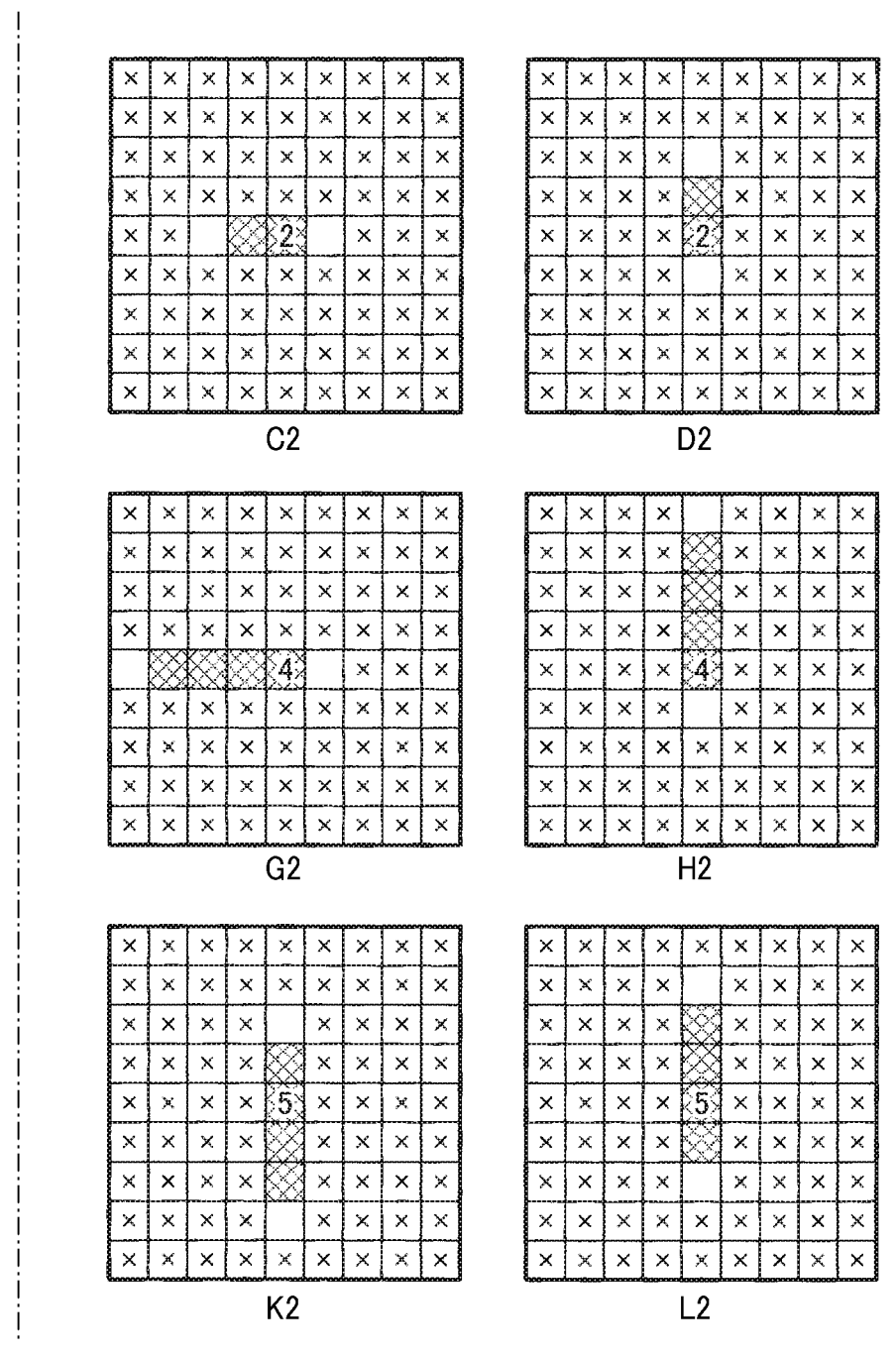
Figure 32:
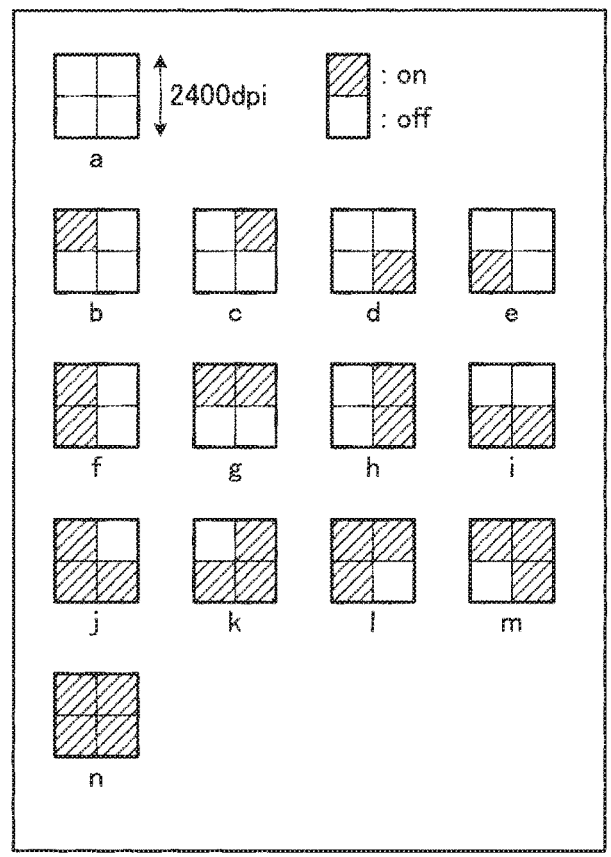
FIG. 32 is a diagram illustrating an example of second pixel patterns of a black pixel used in the thinning process.
Figure 33:
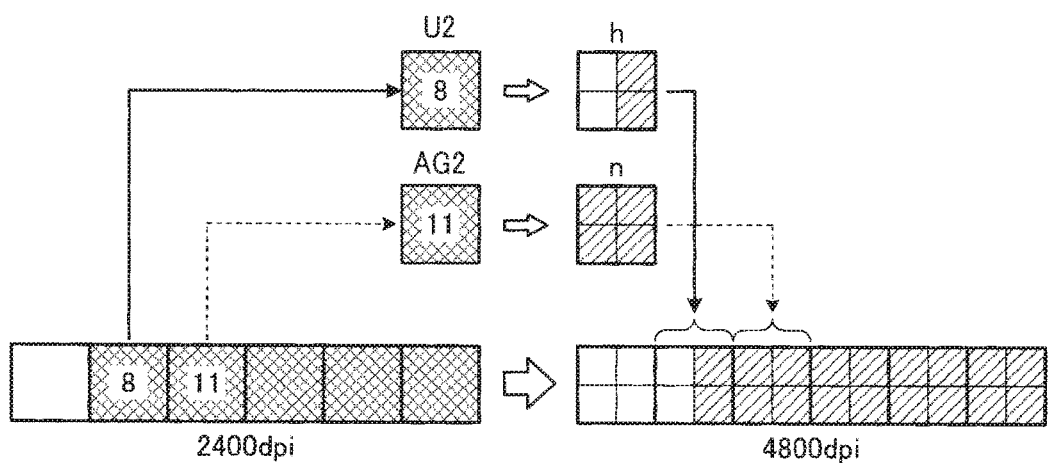
FIGS. 33 to 35 are diagrams illustrating examples of the operation performed in a second thinning path according to the second embodiment.
Figure 34:
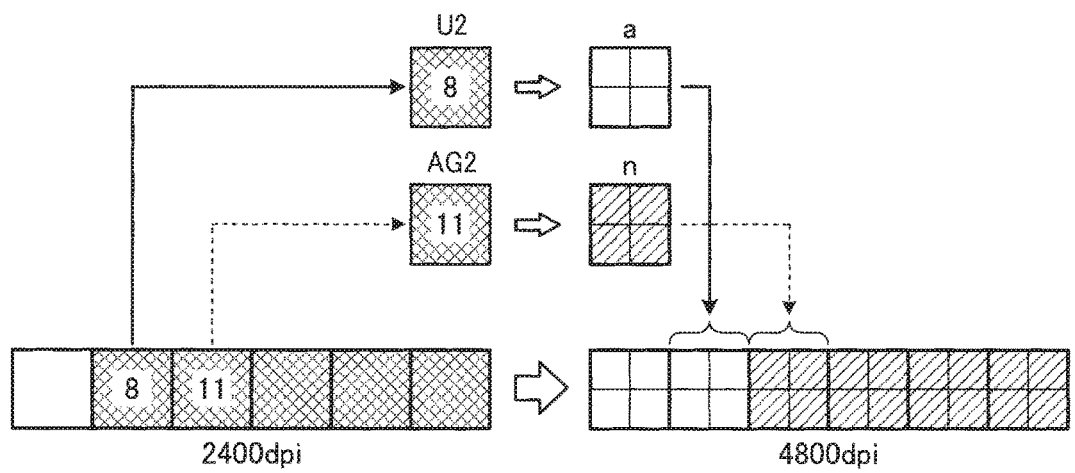
Figure 35:
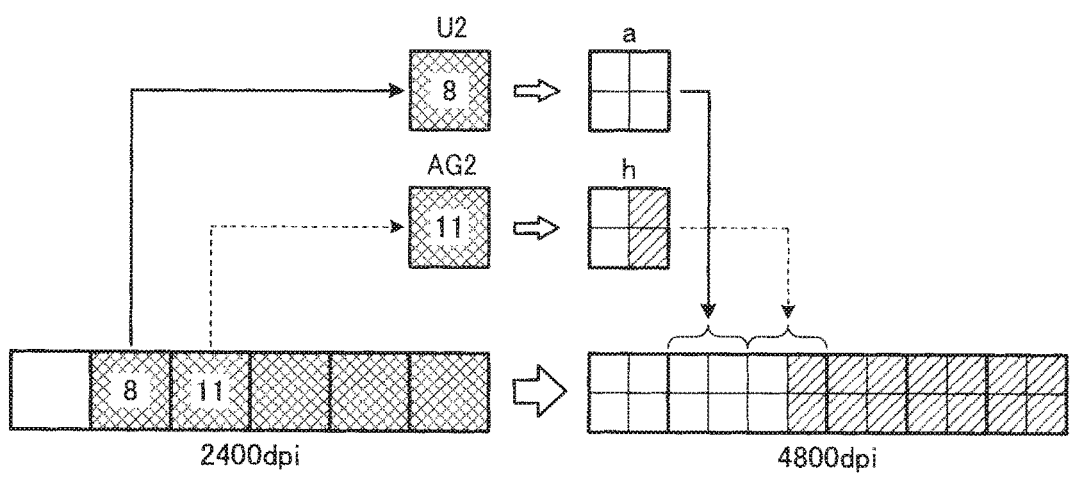
Figure 36A:
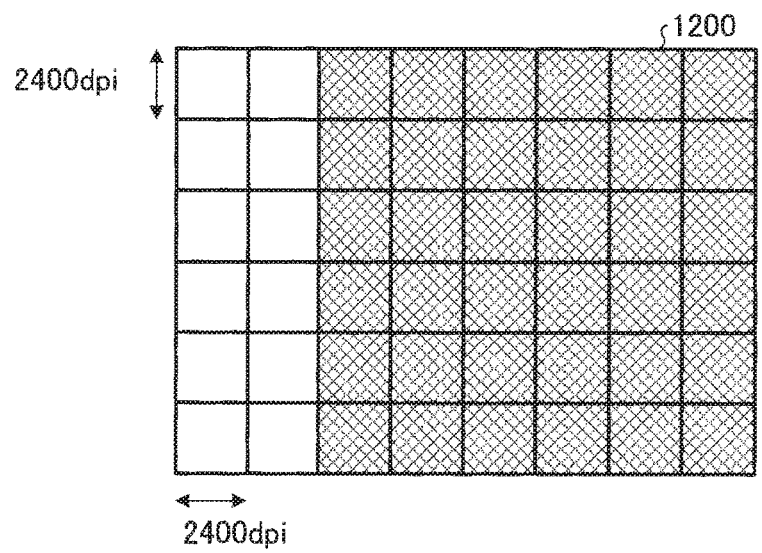
FIGS. 36A and 36B are diagrams illustrating an example of the thinning process on image data according to the second embodiment.
Figure 36B:
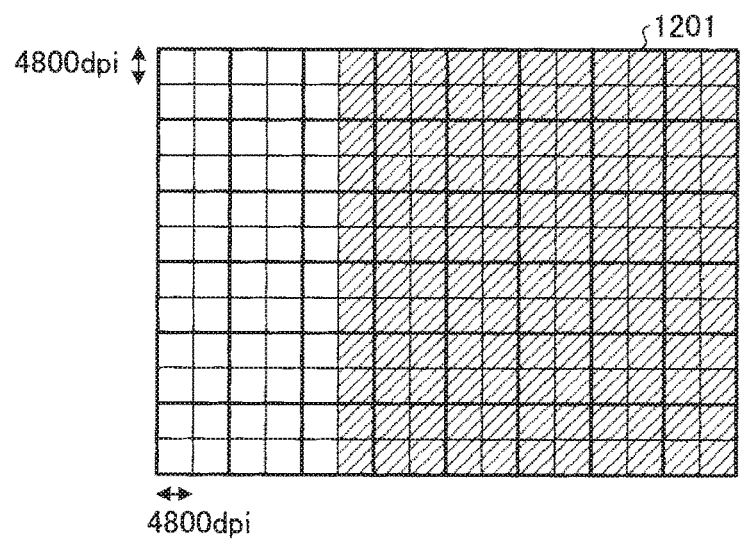

FIG. 28 is a diagram illustrating an example of a line image formed of black pixels. FIGS. 29A to 31B are diagrams illustrating an example of the second patterns used in the pattern matching process according to the second embodiment performed before the thinning process on a black character, for example. FIG. 32 is a diagram illustrating an example of the second pixel patterns of the black pixel used in the thinning process. FIGS. 33 to 35 are diagrams illustrating examples of the operation performed in the second thinning path 392 according to the second embodiment. FIGS. 36A and 36B are diagrams illustrating an example of the thinning process on image data according to the second embodiment.

FIG. 28 illustrates a part of image data of the first resolution, specifically an edge portion of a line image formed of black pixels indicated by hatching. In the pixels forming the image data of FIG. 28, each of the black pixels has pixel values (1, 1) including tag information indicating that the pixel forms a character or a line, and each of white pixels has pixel values (0, 0) including tag information indicating that the pixel forms an object other than the character and the line. If such image data as that illustrated in FIG. 28 is input to the second thinning path 392, the image data is subjected to the resolution enhancement and the thinning process.

As described above, the second pattern matching unit 387 of the second thinning path 392 determines whether or not the target pixel of the image matrix forms an edge portion of a fine line, for example, based on the array of the pixels in the image matrix of the first resolution received from the image matrix acquiring unit 381. Specifically, the second pattern matching unit 387 acquires the image matrix, which is a partial image centering on the target pixel (e.g., the partial image having the size of 9×9 pixels illustrated in FIG. 13), from the image data of the first resolution. The second pattern matching unit 387 then performs pattern matching between the acquired image matrix and each of the variety of second patterns stored in the buffer memory (e.g., the second patterns A2 to Z2 and AA2 to AJ2 illustrated in FIGS. 29A to 31B) to determine whether or not the target pixel included in the image matrix forms an edge portion of a fine line, for example.

In the second patterns A2 to Z2 and AA2 to AJ2 in FIGS. 29A to 31B, a cell with "x" represents a pixel with a pixel value left out of consideration. Further, a hatched cell represents a black pixel forming a character or a line, and a white cell represents a white pixel forming an object other than the character and the line.

Each of the pixels in the second patterns stored in the buffer memory has the pixel value "0" or "1" of the image information and the pixel value "0" or "1" of the tag information. The second pattern matching unit 387 therefore performs the pattern matching between the image matrix and each of the second patterns on both the pixel value of the image information and the pixel value of the tag information. In the pattern matching, therefore, the second pattern matching unit 387 determines the match between the image matrix and a second pattern if each of pixels of the second pattern having 0 or 1 as the pixel value of the image information matches the corresponding pixel of the image matrix on both the pixel value of the image information and the pixel value of the tag information.

The second pattern matching unit 387 further transmits the second matching signal and the data of the target pixel subjected to the pattern matching to the third converting unit 388. The second matching signal represents the determination result of the pattern matching, such as a failure of the image matrix to match any of the second patterns or the second pattern matching the image matrix if the image matrix matches any of the second patterns, for example.

Based on the second matching signal received from the second pattern matching unit 387, the third converting unit 388 of the second thinning path 392 converts the target pixel in the image data of the first resolution (i.e., 2400-dpi, 2-bit in FIG. 27) into a second pixel pattern of the second resolution (i.e., 4800-dpi, 1-bit in FIG. 27), such as one of second pixel patterns a to n illustrated in FIG. 32, for example. That is, the third converting unit 388 performs the resolution conversion process of enhancing the first resolution of the image data to obtain image data of the second resolution, and converts the target pixel into the second pixel pattern to perform the thinning process of thinning a black character or a black line. Specifically, if the second matching signal indicates that the target pixel forms an edge portion of a fine line, for example, the third converting unit 388 converts the target pixel in the image data of the first resolution into the second pixel pattern corresponding to the second pattern represented by the second matching signal, to thereby perform the resolution enhancement and the thinning process.

For example, FIG. 33 illustrates a partial image of the first resolution, with a left side of the partial image forming an edge portion. It is assumed that each of the second and third leftmost pixels of the six pixels in FIG. 33 matches a specific second pattern in the pattern matching, i.e., the second leftmost pixel and the third leftmost pixel match the second pattern U2 in FIG. 30A and the second pattern AG2 in FIG. 31A, respectively. The third converting unit 388 replaces the left one of the two pixels (i.e., the second and third leftmost pixels in FIG. 33) with the second pixel pattern corresponding to the second pattern U2, i.e., with the second pixel pattern h illustrated in FIG. 32, and replaces the right one of the two pixels with the second pixel pattern corresponding to the second pattern AG2, i.e., with the second pixel pattern n illustrated in FIG. 32.

In FIG. 33, the edge portion is thus thinned, with two black pixels of the second resolution removed from the edge portion, i.e., converted into white pixels.

Figure 30B:
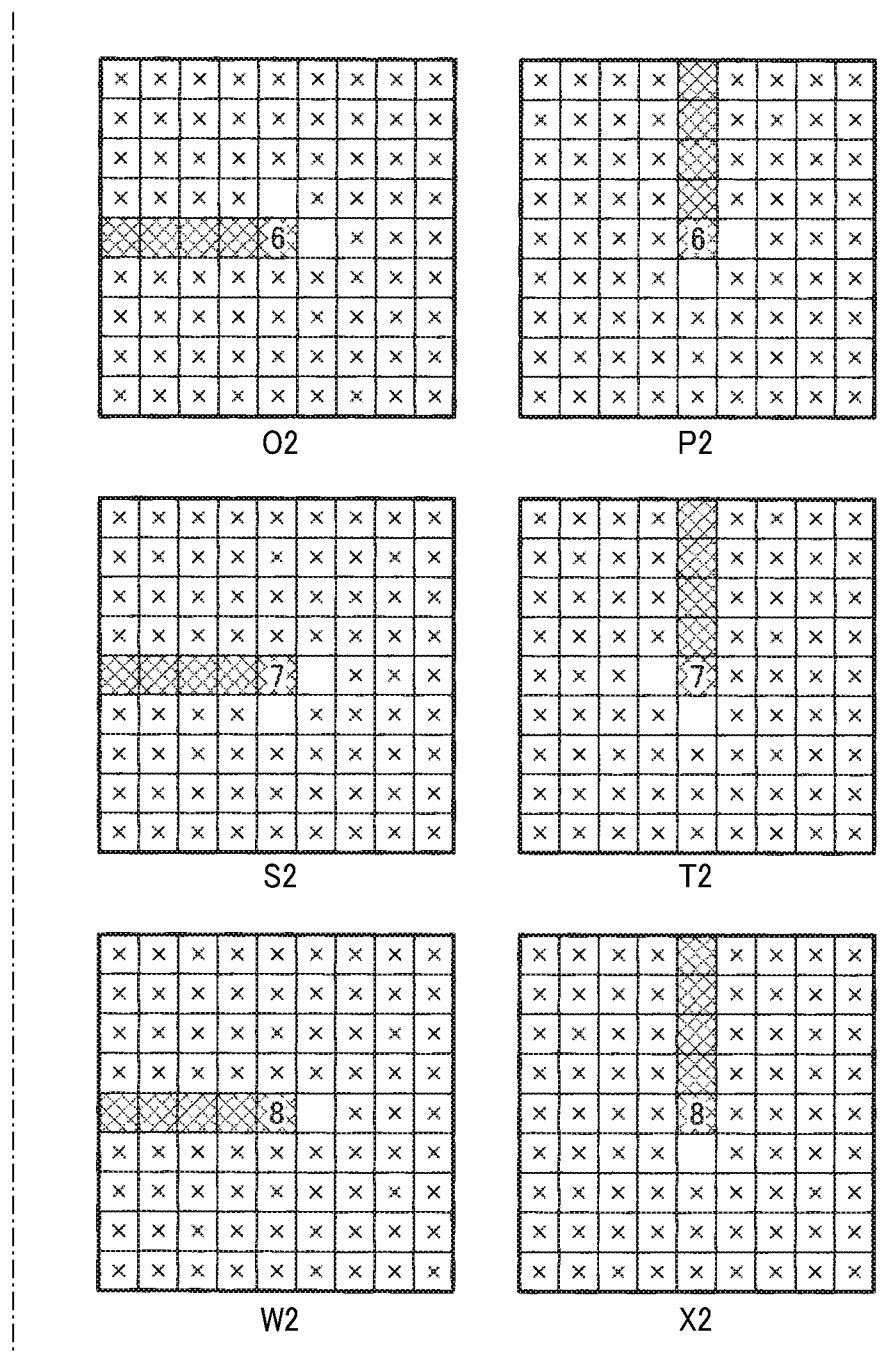

Similarly to FIG. 33, FIG. 34 illustrates the partial image of the first resolution, with the left side of the partial image forming an edge portion, and it is assumed that each of the second and third leftmost pixels of the six pixels in FIG. 34 matches a specific second pattern in the pattern matching, i.e., the second leftmost pixel and the third leftmost pixel match the second pattern U2 in FIG. 30A and the second pattern AG2 in FIG. 31A, respectively. The third converting unit 388 replaces the left one of the two pixels (i.e., the second and third leftmost pixels in FIG. 34) with the second pixel pattern corresponding to the second pattern U2, i.e., with the second pixel pattern a illustrated in FIG. 32, and replaces the right one of the two pixels with the second pixel pattern corresponding to the second pattern AG2, i.e., with the second pixel pattern n illustrated in FIG. 32.

In FIG. 34, the edge portion is thus thinned, with four black pixels of the second resolution removed from the edge portion, i.e., converted into white pixels.

Similarly to FIGS. 33 and 34, FIG. 35 illustrates the partial image of the first resolution, with the left side of the partial image forming an edge portion, and it is assumed that each of the second and third leftmost pixels of the six pixels in FIG. 35 matches a specific second pattern in the pattern matching, i.e., the second leftmost pixel and the third leftmost pixel match the second pattern U2 in FIG. 30A and the second pattern AG2 in FIG. 31A, respectively. The third converting unit 388 replaces the left one of the two pixels (i.e., the second and third leftmost pixels in FIG. 35) with the second pixel pattern corresponding to the second pattern U2, i.e., with the second pixel pattern a illustrated in FIG. 32, and replaces the right one of the two pixels with the second pixel pattern corresponding to the second pattern AG2, i.e., with the second pixel pattern h illustrated in FIG. 32.

In FIG. 35, the edge portion is thus thinned, with six black pixels of the second resolution removed from the edge portion, i.e., converted into white pixels.

In FIGS. 33 to 35, each of the remaining pixels other than the second and third leftmost pixels fails to match the specific second pattern, and the second matching signal corresponding to the remaining pixel indicates that the remaining pixel does not form an edge portion. Thus, the remaining pixel is subjected to the resolution conversion process by the second converting unit 384 of the resolution converting path 393. Thereby, the resolution of the remaining pixel is enhanced to the second resolution.

FIGS. 36A and 36B illustrate an example of the thinning process performed on an edge portion at the second resolution. FIG. 36A illustrates image data 1200 corresponding to a partial image of the first resolution, with a left side of the partial image forming an edge portion. Each of pixels forming the edge portion is replaced by the second pixel pattern corresponding to the second pattern matching the pixel, to thereby generate image data 1201 of the second resolution, as illustrated in FIG. 36B. FIGS. 36A and 36B illustrate an example of image data, the left side of which forms an edge portion. It is, however, possible to adjust the intensity of the thinning process both in the vertical direction and the horizontal direction by associating each of the second patterns used in the pattern matching with the second pixel pattern that replaces the target pixel.

With reference to FIGS. 37 to 41B, a description will be given of thickening of a white line image (e.g., a white line or a white character) performed in the thinning process of the second thinning path 392 in the image converting unit 352a.

Figure 37:
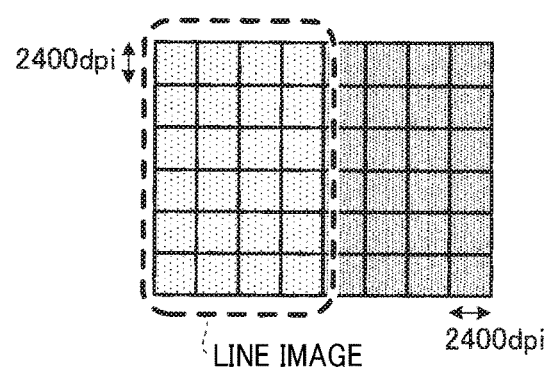
FIG. 37 is a diagram illustrating an example of a line image formed of white pixels.
Figure 39B:
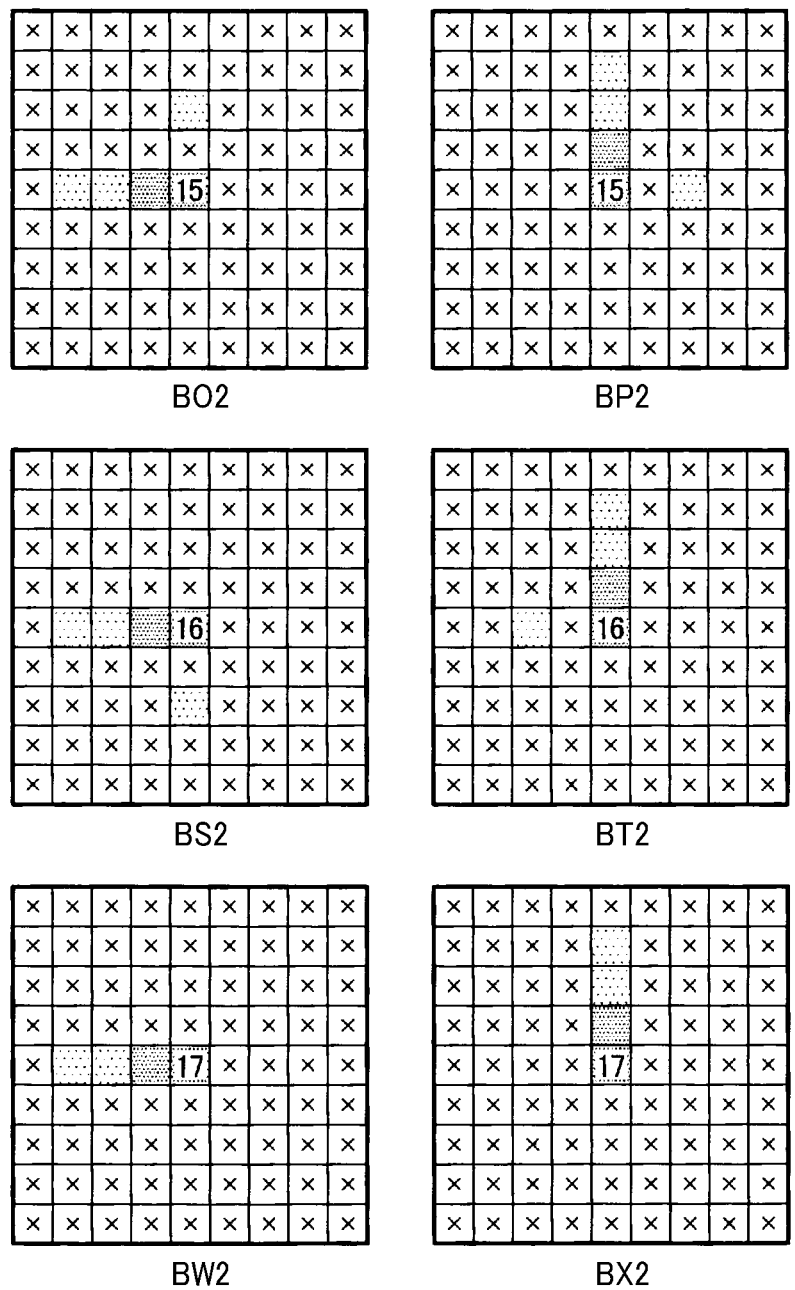
Figure 40:
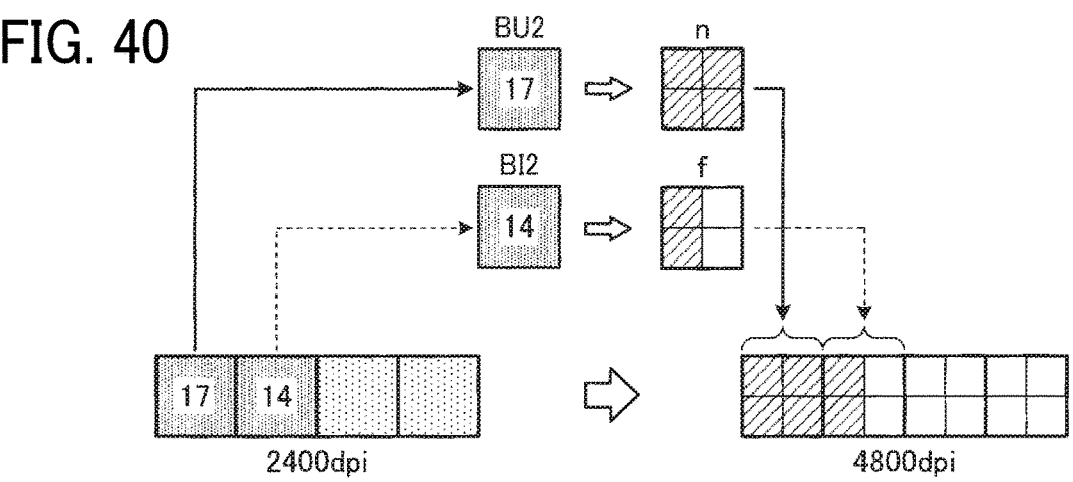
FIG. 40 is a diagram illustrating an example of a thickening process performed in the second thinning path according to the second embodiment.
Figure 41A:
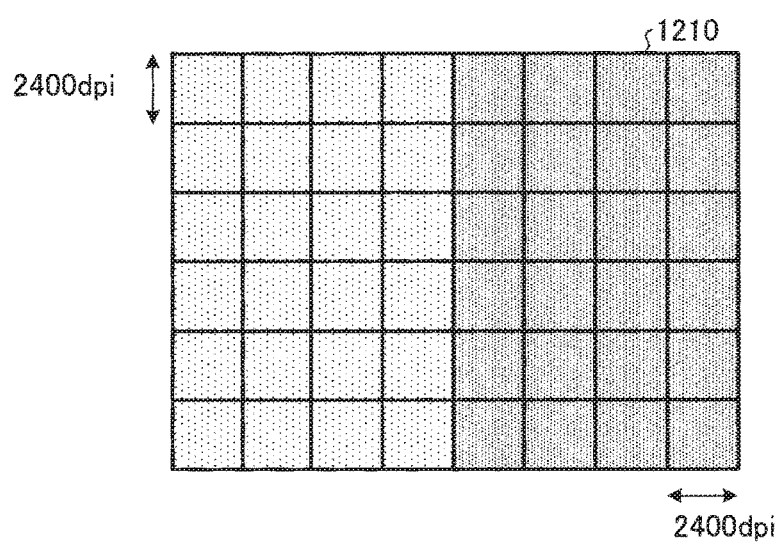
FIGS. 41A and 41B are diagrams illustrating an example of the thickening process performed in the thinning process on image data according to the second embodiment.
Figure 41B:
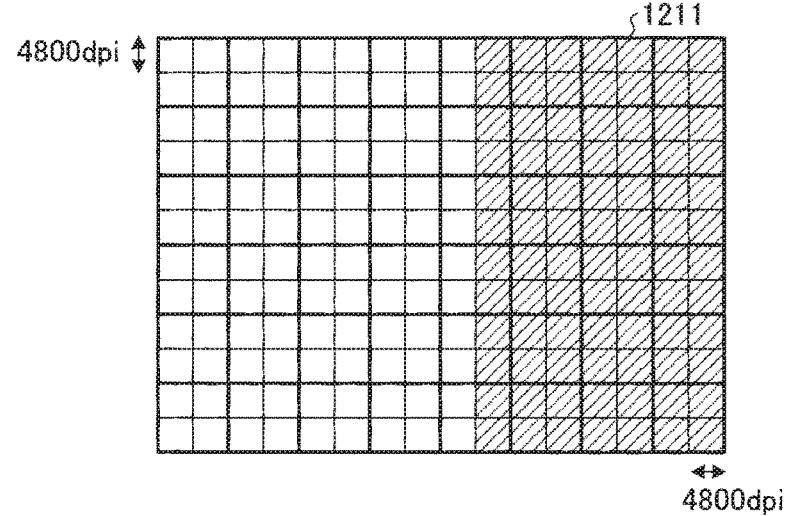

FIG. 37 is a diagram illustrating an example of a line image formed of white pixels. FIGS. 38A to 39B are diagrams illustrating an example of the second patterns used in the pattern matching process according to the second embodiment performed before the thinning process on a white character, for example. FIG. 40 is a diagram illustrating an example of the thickening process performed in the second thinning path 392 according to the second embodiment. FIGS. 41A and 41B are diagrams illustrating an example of the thickening process performed in the thinning process on image data according to the second embodiment.

FIG. 37 illustrates a part of image data of the first resolution, specifically an edge portion of a line image formed of white pixels. That is, in the pixels forming the image data illustrated in FIG. 37, each of the white pixels indicated by lighter hatching has pixel values (0, 1) including the tag information indicating that the pixel forms a character or a line, and each of black pixels indicated by darker hatching has pixel values (1, 0) including the tag information indicating that the pixel forms an object other than the character and the line. If such image data as that illustrated in FIG. 37 is input to the second thinning path 392, the image data is subjected to the resolution enhancement and a thinning process involving the thickening of the white line image.

As described above, the second pattern matching unit 387 of the second thinning path 392 determines whether or not the target pixel of the image matrix forms an edge portion of a fine line, for example, based on the array of the pixels in the image matrix of the first resolution received from the image matrix acquiring unit 381. Specifically, the second pattern matching unit 387 acquires the image matrix, which is a partial image centering on the target pixel (e.g., the partial image having the size of 9×9 pixels illustrated in FIG. 13), from the image data of the first resolution. The second pattern matching unit 387 then performs pattern matching between the acquired image matrix and each of the variety of second patterns stored in the buffer memory (e.g., the second patterns BA2 to BX2 illustrated in FIGS. 38A to 39B) to determine whether or not the target pixel included in the image matrix forms an edge portion of a fine line, for example, of a white line image.

In the second patterns BA2 to BX2 illustrated in FIGS. 38A to 39B, a cell with "x" represents a pixel with a pixel value left out of consideration. Further, a cell indicated by lighter hatching represents a white pixel forming a character or a line, and a cell indicated by darker hatching represents a black pixel forming an object other than the character and the line.

Each of the pixels in the second patterns stored in the buffer memory has the pixel value "0" or "1" of the image information and the pixel value "0" or "1" of the tag information. The second pattern matching unit 387 therefore performs the pattern matching between the image matrix and each of the second patterns on both the pixel value of the image information and the pixel value of the tag information. In the pattern matching, therefore, the second pattern matching unit 387 determines the match between the image matrix and a second pattern if each of pixels of the second pattern having 0 or 1 as the pixel value of the image information matches the corresponding pixel of the image matrix on both the pixel value of the image information and the pixel value of the tag information.

The second pattern matching unit 387 further transmits the second matching signal and the data of the target pixel subjected to the pattern matching to the third converting unit 388. The second matching signal represents the determination result of the pattern matching, such as a failure of the image matrix to match any of the second patterns or the second pattern matching the image matrix if the image matrix matches any of the second patterns, for example.

Based on the second matching signal received from the second pattern matching unit 387, the third converting unit 388 of the second thinning path 392 converts the target pixel in the image data of the first resolution (i.e., 2400-dpi, 2-bit in FIG. 27) into the second pixel pattern of the second resolution (i.e., 4800-dpi, 1-bit in FIG. 27), such as one of the second pixel patterns a to n illustrated in FIG. 32, for example. That is, the third converting unit 388 performs the resolution conversion process of enhancing the first resolution of the image data to obtain image data of the second resolution, and converts the target pixel into the second pixel pattern to perform the thinning process of practically thickening a white character or a white line. Specifically, if the second matching signal indicates that the target pixel forms an edge portion of a fine line, for example, of a white line image, the third converting unit 388 converts the target pixel in the image data of the first resolution into the second pixel pattern corresponding to the second pattern represented by the second matching signal, to thereby perform the resolution enhancement and the thinning process involving the thickening of the white line image.

For example, FIG. 40 illustrates a partial image of the first resolution, which includes a white line image with a left side thereof forming an edge portion. It is assumed that each of the first and second leftmost pixels of the four pixels in FIG. 40 matches a specific second pattern in the pattern matching, i.e., the first leftmost pixel and the second leftmost pixel match the second pattern BU2 in FIG. 39A and the second pattern BI2 in FIG. 38A, respectively. The third converting unit 388 replaces the left one of the two pixels (i.e., the first and second leftmost pixels in FIG. 40) with the second pixel pattern corresponding to the second pattern BU2, i.e., with the second pixel pattern n illustrated in FIG. 32, and replaces the right one of the two pixels with the second pixel pattern corresponding to the second pattern BI2, i.e., with the second pixel pattern f illustrated in FIG. 32.

In FIG. 40, the edge portion is thus thickened, with two white pixels of the second resolution added to the edge portion, i.e., converted from black pixels.

In FIG. 40, each of the two remaining pixels other than the first and second leftmost pixels fails to match the specific second pattern, and the second matching signal corresponding to the remaining pixel indicates that the remaining pixel does not form an edge portion. Thus, the remaining pixel is subjected to the resolution conversion process by the second converting unit 384 of the resolution converting path 393. Thereby, the resolution of the remaining pixel is enhanced to the second resolution.

FIGS. 41A and 41B illustrate an example of the thickening process performed on an edge portion of a white line image at the second resolution in the thinning process. FIG. 41A illustrates image data 1210 corresponding to a partial image of the first resolution. The partial image includes a white line image indicated by lighter hatching, with a right side of the white line image forming an edge portion. Each of pixels forming the edge portion is replaced by the second pixel pattern corresponding to the second pattern matching the pixel, to thereby generate image data 1211 of the second resolution, as illustrated in FIG. 41B. FIGS. 41A and 41B illustrate an example of image data including a white line, the right side of which forms an edge portion. It is, however, possible to adjust the intensity of the thinning process, i.e., the intensity of the thickening of the white line image, both in the vertical direction and the horizontal direction by associating each of the second patterns used in the pattern matching with the second pixel pattern that replaces the target pixel.

As described above, the configuration of the image converting unit 352 according to the first embodiment is added with the second thinning path 392 for performing the above-described thinning process, to thereby configure the image converting unit 352a according to the second embodiment. With the second thinning path 392, the thinning process is performed on an edge portion of a line image not forming steps, thereby improving the reproducibility of fine lines and enhancing the degree of freedom of reproducibility.

Further, with the thinning process performed on the pixels of a white line image (e.g., a white line or a white character) having the pixel value "0" of the image information and the pixel value "1" of the tag information, the white line or the white character is practically thickened, thereby improving the reproducibility of the white line or the white character.

The thickening of a white line image in the thinning process of the second thinning path 392 is also applicable to the thinning process in the image processing of the first thinning path 391a and to the thinning process in the image processing of the thinning path 391 according to the first embodiment.

In the foregoing description, the image data of the first resolution input to the image converting unit 352 of the first embodiment or the image converting unit 352a of the second embodiment is the 2-bit image data including the pixel value of the image information and the pixel value of the tag information. The image data of the first resolution input to the image converting unit 352 or 352a, however, is not limited thereto, and may be 1-bit image data including the pixel value of the image information but not including the pixel value of the tag information.

Figure 42:
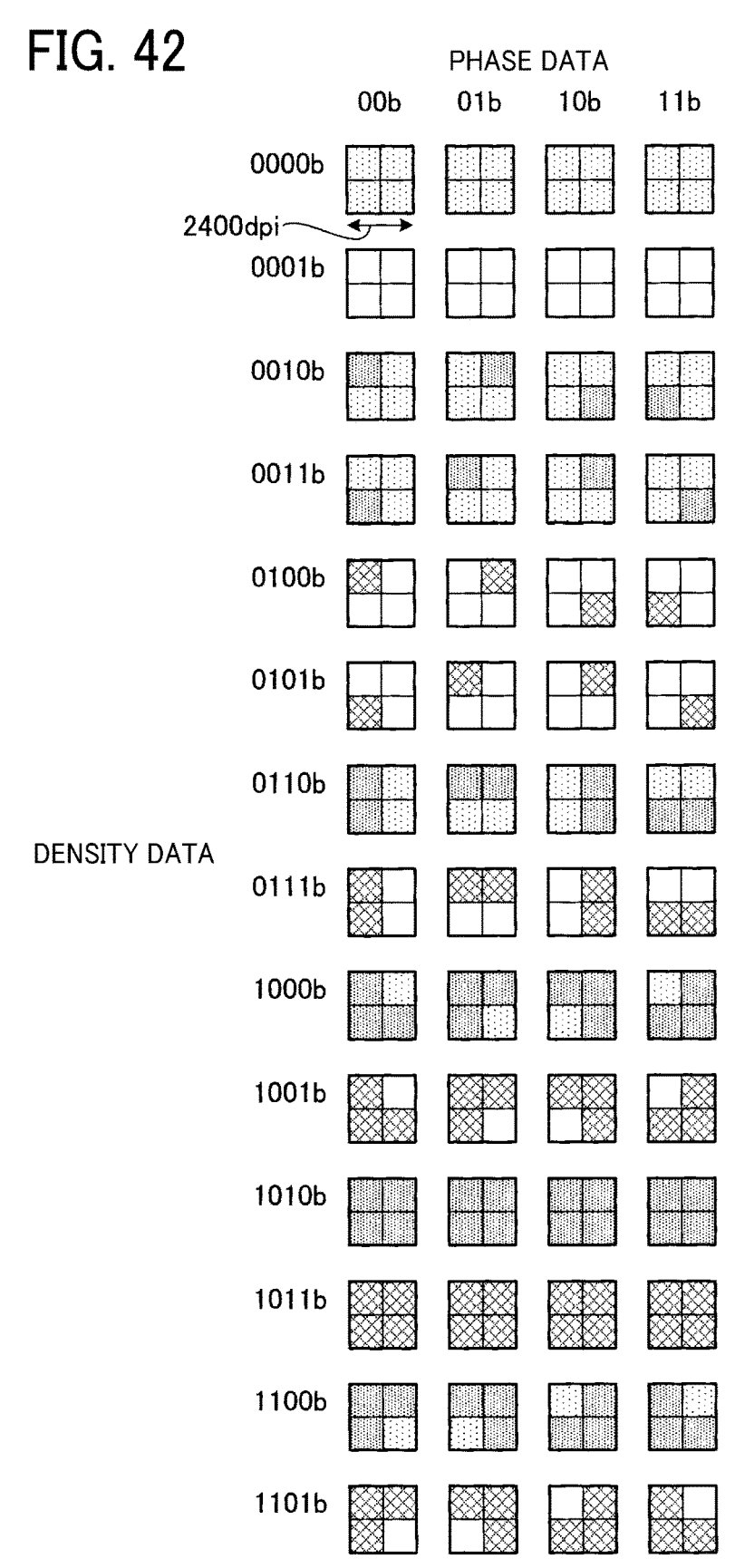

FIG. 42 is a diagram illustrating an example of assignment of the tag information. In FIG. 42, a cell indicated by grid-hatching represents a black pixel forming a character or a line, and a cell indicated by darker dot-hatching represents a black pixel forming an object other than the character and the line. Further, a cell indicated by lighter dot-hatching represents a white pixel forming a character or a line, and a white cell represents a white pixel forming an object other than the character and the line.

As described above, the tag generating unit 325 generates the tag information indicating whether or not each of the pixels of the 1200-dpi image data forms one of a character and a line. The tag information generated by the tag generating unit 325 is transmitted to the drive control unit 340 via the position correcting unit 326 and the gradation processing unit 327. The position correcting unit 326 may change the assignment of the tag information in accordance with the direction of the edge portion and the data of the density of the corresponding pixel of the 1200-dpi image data.

For example, the position correcting unit 326 may divide the density of the pixel of the 1200-dpi image data into 14 levels and divide the direction of the edge portion into four directions, as illustrated in FIG. 42, and may change the image information (i.e., information on whether the pixel is the black pixel or the white pixel) and the tag information (i.e., information on the presence or absence of a tag) in accordance with the density and the phase. This configuration allows the image converting unit 352 or 352a to detect an area meeting more detailed conditions from the image data of the first resolution.

In each of the foregoing embodiments, if at least any of the functional units of the light source control device 110 in the image forming apparatus 1 is implemented by the execution of a program, the program is provided as preinstalled in a read-only memory (ROM), for example. Further, a program executed by the image forming apparatus 1 according to any of the foregoing embodiments may be provided as recorded in a computer-readable recording medium, such as a compact disc-read-only memory (CD-ROM), a flexible disc (FD), a compact disc-recordable (CD-R), or a digital versatile disc (DVD), in an installable format file or in an executable format file. Further, the program executed by the image forming apparatus 1 according to any of the foregoing embodiments may be stored in a computer connected to a network, such as the Internet, and provided as downloaded via the network. Further, the program executed by the image forming apparatus 1 according to any of the foregoing embodiments may be provided or distributed via a network, such as the Internet. Further, the program executed by the image forming apparatus 1 according to any of the foregoing embodiments is divided into modules each corresponding to at least one of the foregoing functional units. In actual hardware, a CPU reads and executes the program from the above-described ROM, to thereby load and generate the functional units in a main storage device of the image forming apparatus 1.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image processing device comprising:
processing circuitry configured to,
   determine whether an image matrix of image data of a first resolution matches any of at least one first pattern of a stepped edge portion, and output a result as a first determination result;
   if the image matrix of the image data of the first resolution matches any of the at least one first pattern,
      replace a target pixel of the first resolution in the image matrix with a first pixel pattern of a second resolution corresponding to the any of the at least one first pattern to perform a thinning process and a smoothing process on the image data, and
      output the image data subjected to the thinning process and the smoothing process as first image data of the second resolution, the second resolution being higher than the first resolution;
   convert the image data of the first resolution into converted image data of the second resolution, and output the converted image data as second image data of the second resolution;
   detect whether the target pixel is included in a fine line structure based on a level setting signal; and
   select and output one of the first image data of the second resolution subjected to the thinning process and the smoothing process and the second image data of the second resolution not subjected to the thinning process and the smoothing process based on the first determination result and whether the target pixel is included in the fine line structure such that the processing circuitry is configured to select and output the second image data of the second resolution not subjected to the thinning process and the smoothing process in response to the target pixel being included in the fine line structure irrespective of whether the image matrix of the image data of the first resolution matches any of the at least one first pattern.

2. The image processing device of claim 1, wherein processing circuitry is configured to,
   determine whether the image matrix of the image data of the first resolution matches any of at least one second pattern of an edge portion, and output a result as a second determination result;
   if the image matrix of the image data of the first resolution matches any of the at least one second pattern,
      replace the target pixel of the first resolution in the image matrix with a second pixel pattern of the second resolution corresponding to the any of the at least one second pattern to perform the thinning process on the image data, and
      output the image data subjected to the thinning process as third image data of the second resolution; and
   select and output one of the first image data, the second image data, and the third image data based on the first determination result, the second determination result, and whether the target pixel is included in the fine line structure.

3. The image processing device of claim 2, wherein the processing circuitry is configured to,
   select and output the first image data rather than the third image data, if the processing circuitry determines that the image matrix of the image data of the first resolution matches any of the at least one first pattern and the image matrix of the image data of the first resolution matches any of the least one second pattern.

4. The image processing device of claim 2, wherein the processing circuitry is configured to change an intensity of the thinning process in accordance with a direction of the edge portion.

5. The image processing device of claim 2, wherein
   the image data of the first resolution includes a first pixel value and a second pixel value, the first pixel value representing image information, and the second pixel value representing tag information according to attribute information of the image data, and
   the at least one second pattern includes the first pixel value and the second pixel value.

6. The image processing device of claim 1, wherein if the target pixel is included in the fine line structure, the processing circuitry is configured to,
   select and output the second image data.

7. The image processing device of claim 1, wherein the level setting signal indicates a threshold that is set in accordance with an intensity of the thinning process.

8. The image processing device of claim 7, wherein the processing circuitry is configured to receive the level setting signal.

9. The image processing device of claim 1, wherein the processing circuitry is configured to change an intensity of the thinning process and an intensity of the smoothing process in accordance with a direction of the stepped edge portion.

10. The image processing device of claim 1, wherein
   the image data of the first resolution includes a first pixel value and a second pixel value, the first pixel value representing image information, and the second pixel value representing tag information according to attribute information of the image data, and
   the at least one first pattern includes the first pixel value and the second pixel value.

11. A drive control device comprising:
   the image processing device of claim 1 to output image data of the second resolution;
   a pulse generator to generate a modulated pulse signal from the image data of the second resolution output from the image processing device to control on and off of a light source; and
   a light source driver to drive the light source in accordance with the modulated pulse signal generated by the pulse generator.

12. The drive control device of claim 11, wherein the image processing device, the pulse generator, and the light source driver are included in a single integrated device.

13. A light source control device comprising:
   an interface to acquire image data;

a processor to perform image processing on the image data acquired by the interface to obtain image data of a first resolution; and the drive control device of claim 11 to receive the image data of the first resolution subjected to the image processing by the processor.

14. An image forming apparatus comprising:

a light source to emit light;

the light source control device of claim 13 to control driving of the light source;

a photoconductor to be irradiated with the light emitted by the light source; and a latent image forming device to irradiate the photoconductor with the light emitted by the light source to form on the photoconductor a latent image corresponding to the image data of the second resolution.

15. The image processing device of claim 1, wherein the level setting signal indicates a minimum pixel width of a group of pixels that constitute the fine line structure.

16. The image processing device of claim 15, wherein the processing circuitry is configured to is configured to detect whether the target pixel is included in the fine line structure based on the level setting signal such that the level setting signal is set based on a threshold input from a user via a control panel of the image processing device.

17. An image processing device comprising:

a first matching means for determining whether an image matrix of image data of a first resolution matches any of at least one first pattern of a stepped edge portion to output a result as a first determination result;

a first converting means for, if the first matching means determines that the image matrix of the image data of the first resolution matches any of the at least one first pattern, replacing a target pixel of the first resolution in the image matrix with a first pixel pattern of a second resolution corresponding to the any of the at least one first pattern to perform a thinning process and a smoothing process on the image data to output the image data subjected to the thinning process and the smoothing process as first image data of the second resolution, the second resolution being higher than the first resolution;

a second converting means for converting the image data of the first resolution into converted image data of the second resolution to output the converted image data as second image data of the second resolution;

a detecting means for detecting whether the target pixel is included in a fine line structure based on a level setting signal to output a result of the detection; and a selecting means for selecting one of the first image data of the second resolution subjected to the thinning process and the smoothing process and the second image data of the second resolution not subjected to the thinning process and the smoothing process for output based on the first determination result and the result of the detection such that the selecting means selects and outputs the second image data of the second resolution not subjected to the thinning process and the smoothing process in response to the target pixel being included in the fine line structure irrespective of whether the image matrix of the image data of the first resolution matches any of the at least one first pattern.

18. An image processing method comprising:

determining whether an image matrix of image data of a first resolution matches any of at least one first pattern of a stepped edge portion to output a result of the determination as a first determination result;

replacing, if the determining determines that the image matrix of the image data of the first resolution matches any of the at least one first pattern, a target pixel of the first resolution in the image matrix with a first pixel pattern of a second resolution corresponding to the any of the at least one first pattern to perform a thinning process and a smoothing process on the image data to output the image data subjected to the thinning process and the smoothing process as first image data of the second resolution, the second resolution being higher than the first resolution;

converting the image data of the first resolution into converted image data of the second resolution to output the converted image data as second image data of the second resolution;

detecting whether the target pixel is included in a fine line structure based on a level setting signal to output a result of the detecting; and selecting one of the first image data of the second resolution subjected to the thinning process and the smoothing process and the second image data of the second resolution not subjected to the thinning process and the smoothing process for output based on the first determination result and the result of the detecting such that the selecting selects and outputs the second image data of the second resolution not subjected to the thinning process and the smoothing process in response to the target pixel being included in the fine line structure irrespective of whether the image matrix of the image data of the first resolution matches any of the at least one first pattern.

19. The image processing method of claim 18, wherein the level setting signal indicates a minimum pixel width of a group of pixels that constitute the fine line structure.

20. The image processing method of claim 19, wherein the detecting detects whether the target pixel is included in the fine line structure based on the level setting signal such that the level setting signal is set based on a threshold input from a user via a control panel.

* * * * *